(12) United States Patent
Martherus et al.

(10) Patent No.: US 9,521,167 B2
(45) Date of Patent: Dec. 13, 2016

(54) GENERALIZED SECURITY POLICY USER INTERFACE

(71) Applicant: Cisco Technology, Inc., San Jose, CA (US)

(72) Inventors: Robin Martherus, Gilbert, AZ (US);
Guy Telner, Newton, MA (US);
Yedidya Dotan, Cambridge, MA (US);
Denis Knjazihhin, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 14/600,548

(22) Filed: Jan. 20, 2015

(65) Prior Publication Data

US 2016/0212170 A1 Jul. 21, 2016

(51) Int. Cl.
*H04L 29/06* (2006.01)

(52) U.S. Cl.
CPC .................................. *H04L 63/20* (2013.01)

(58) Field of Classification Search
CPC ....................................................... H04L 63/20
USPC ............................................................. 726/1
See application file for complete search history.

(56) References Cited

U.S. PATENT DOCUMENTS

| | | | |
|---|---|---|---|
| 5,764,911 A * | 6/1998 | Tezuka | H04L 41/042 709/223 |
| 6,021,376 A * | 2/2000 | Wilson | G01C 15/00 342/357.57 |
| 6,219,053 B1 * | 4/2001 | Tachibana | G06F 3/0481 345/440 |
| 6,738,908 B1 | 5/2004 | Bonn et al. | |
| 7,231,661 B1 | 6/2007 | Villavicencio et al. | |
| 7,263,719 B2 | 8/2007 | Jemes et al. | |
| 7,444,395 B2 | 10/2008 | Sanghvi et al. | |
| 7,484,237 B2 | 1/2009 | Joly et al. | |
| 7,653,930 B2 | 1/2010 | Griffin et al. | |
| 7,774,830 B2 | 8/2010 | Dillaway et al. | |
| 7,912,983 B1 | 3/2011 | Ward et al. | |
| 8,140,664 B2 | 3/2012 | Huang et al. | |
| 8,234,387 B2 | 7/2012 | Bradley et al. | |
| 8,424,053 B2 | 4/2013 | Gottimukkala et al. | |
| 8,429,255 B1 | 4/2013 | Khan et al. | |
| 8,452,876 B1 | 5/2013 | Williams et al. | |
| 8,490,163 B1 | 7/2013 | Harsell et al. | |
| 8,719,919 B2 | 5/2014 | Rice et al. | |
| 8,793,763 B2 | 7/2014 | Williams et al. | |
| 8,844,041 B1 | 9/2014 | Kienzle et al. | |

(Continued)

OTHER PUBLICATIONS

Michael Teger, "Developer's Guide for Oracle Entitlements Server", Oracle® Fusion Middleware, 11g Release 1 (11.1.2), E27154-01, Jul. 2012, 132 Pages.

(Continued)

*Primary Examiner* — Hadi Armouche
*Assistant Examiner* — Shahriar Zarrineh
(74) *Attorney, Agent, or Firm* — Edell, Shapiro & Finnan, LLC

(57) ABSTRACT

A management entity displays a plurality of icons, each icon representing an actor or a resource in a networking environment. The management entity defines security policy by receiving user input in the form of lines drawn between icons representing actors and resources to control abilities between actors and resources.

19 Claims, 41 Drawing Sheets

(56) References Cited

U.S. PATENT DOCUMENTS

| | | | |
|---|---|---|---|
| 8,955,148 B1* | 2/2015 | Biegala | H04L 63/10 726/27 |
| 2001/0032248 A1* | 10/2001 | Krafchin | G06Q 10/107 709/206 |
| 2002/0112043 A1* | 8/2002 | Kagami | G06F 3/0605 709/223 |
| 2002/0169957 A1 | 11/2002 | Hale et al. | |
| 2004/0025016 A1 | 2/2004 | Focke et al. | |
| 2006/0129933 A1* | 6/2006 | Land | G11B 27/034 715/723 |
| 2006/0161879 A1 | 7/2006 | Lubrecht et al. | |
| 2008/0034401 A1 | 2/2008 | Wang | |
| 2008/0126963 A1* | 5/2008 | Kim | G06F 9/4411 715/764 |
| 2008/0183603 A1 | 7/2008 | Kothari et al. | |
| 2008/0209505 A1 | 8/2008 | Ghai et al. | |
| 2008/0216148 A1 | 9/2008 | Bienek et al. | |
| 2009/0193363 A1* | 7/2009 | Atherton | G06F 3/04817 715/835 |
| 2010/0082513 A1 | 4/2010 | Liu | |
| 2010/0122208 A1* | 5/2010 | Herr | G06F 3/04845 715/799 |
| 2010/0231790 A1* | 9/2010 | Ansari | G06Q 30/04 348/552 |
| 2013/0246334 A1 | 9/2013 | Ahuja | |
| 2013/0275574 A1 | 10/2013 | Hugard, IV et al. | |
| 2014/0029039 A1 | 1/2014 | Deter et al. | |
| 2014/0109190 A1 | 4/2014 | Cam-Winget et al. | |
| 2014/0165128 A1 | 6/2014 | Auvenshine et al. | |
| 2014/0282823 A1 | 9/2014 | Rash et al. | |

OTHER PUBLICATIONS

Anonymous: "Creating Firewall Rules (reference)", wiki.ipfire.org, Mar. 29, 2014, pp. 1-5, XP055258932, retrieved from the internet: https://web.archive.org/web/20140329122433/http://wiki.ipfire.org/en/configuration/firewall/rules/start [retrieved on Mar. 16, 2016].

Invitation to Pay Additional Fees and Partial Search Report in corresponding International Application No. PCT/US2016/013850, mailed Mar. 29, 2016, 8 pages.

Benson et al., "CloudNaaS: A Cloud Networking Platform for Enterprise Applications", SOCC'11, Oct. 27, 2011, 13 Pages.

\* cited by examiner

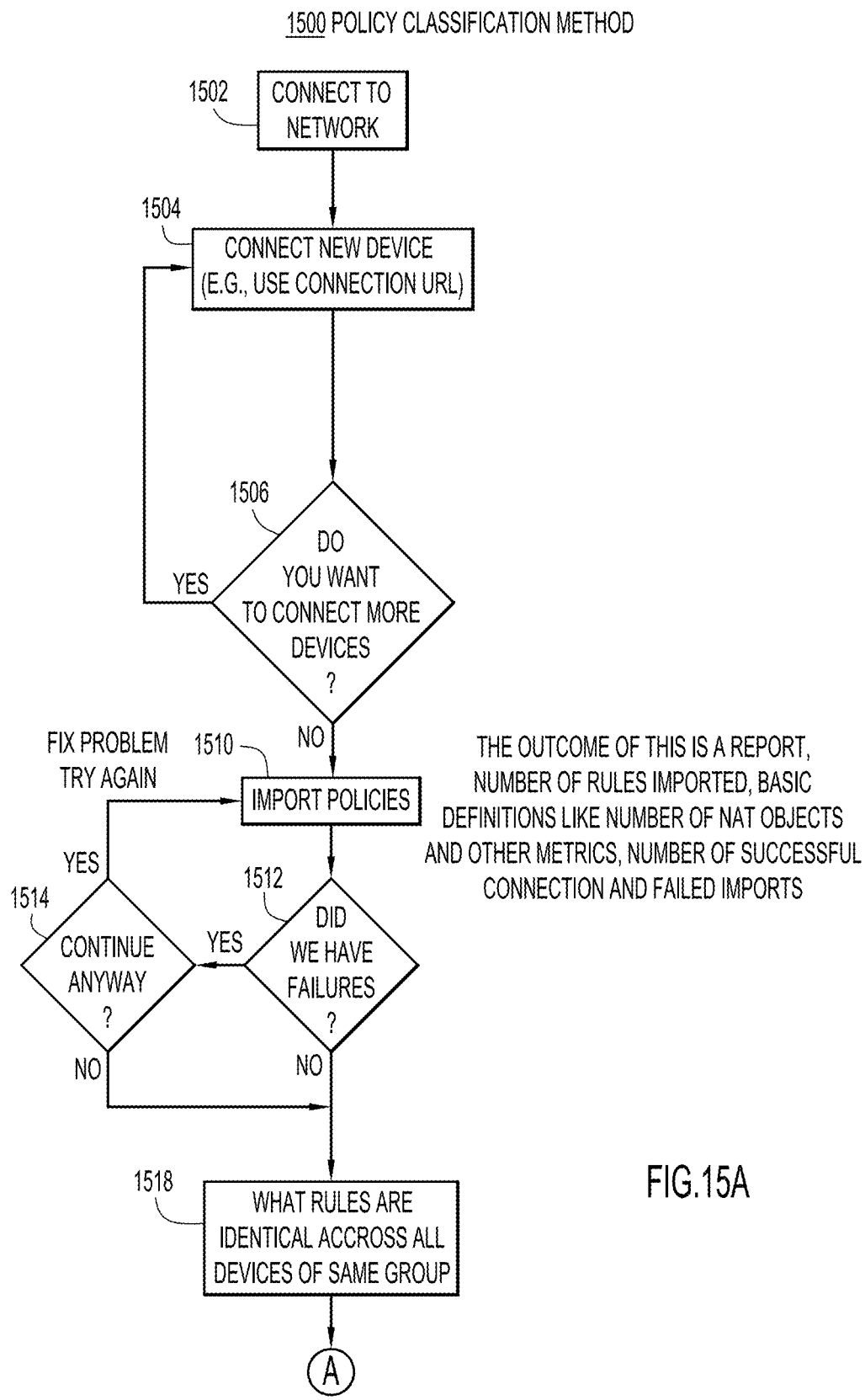

2500 POLICY MODEL BRIDGE EXAMPLE

WSA Model Bridge

2505
└─ header
   name:    WSA, version: 1, service definitions: live, mock

2510
└─ policies
   type:    WSA_Access_Policy preferences: readonly rule mapper:

principals:    value = native param; (e.g., principal ◄── 172.16.1.10 source)

actions:    value = native param; (e.g., action ◄── implied anything)

resources:    value = native param; (e.g., resources ◄── 192.168.1.100 dest)

contexts:  value = native param; (e.g., context ◄── IP protocol)

results:    value = native param; (e.g., results ◄── permit)

2515
└─ entities time_range rule mapper:

resources:value = native param; (e.g., resource ◄── defined time range)

URL_category rule mapper:

resources:       value = native param.

FIG.25

| Source | Destination | Application | Action | Count | Install On | Comments |
|---|---|---|---|---|---|---|
| Branch Employees | HQ | Any | Allow | 10 | All Branches | Allow Access to HQ |
| Branch Employees | Internet | Social Media | Deny | 25 | All Branches | No Access to Social Media |
| Finance Group | HQ | Oracle | Allow | 5 | All Branches | Allow Business Apps |
| Any | Any | Any | Deny | 4 | All Branches | Deny Rest |

FIG.31

GENERALIZED SECURITY POLICY USER INTERFACE

TECHNICAL FIELD

The present disclosure relates to security systems for networks, applications, content, and authentication.

BACKGROUND

Administering and maintaining security of an enterprise network is critical task to ensure business efficiency and productivity. Security involves numerous tasks, including (without limitation) monitoring for unauthorized operations (intrusions, external accesses, application security, content security, authentication compliance, etc.) which can, among other things, put sensitive data at risk. This can be complicated by the fact that the enterprise network may span numerous geographical regions, nationally an internationally.

In a typical enterprise network, there are numerous security devices of various types as well as numerous management applications. This can make enforcement of requirements challenging. Each device or type of device has its own set of complex policy definitions. A network administrator needs to be an expert on numerous security products in order to define policies and maintain security.

BRIEF DESCRIPTION OF THE DRAWINGS

FIGS. 15A and 15B collectively represent a flowchart of an overview method of importing and classifying network policies from different security devices, according to an example embodiment.

FIG. 25 is a policy model bridge that may be used to map a simplified Web Security Appliance (WSA) access policy to the PARCR model, according to an example embodiment.

FIG. 31 is an illustration of a user interface screen displayed by the management system in response to a user selection of a "Validate" icon in the user interface screen of FIG. 30, according to an example embodiment.

DESCRIPTION OF EXAMPLE EMBODIMENTS

Overview

Figure 1:
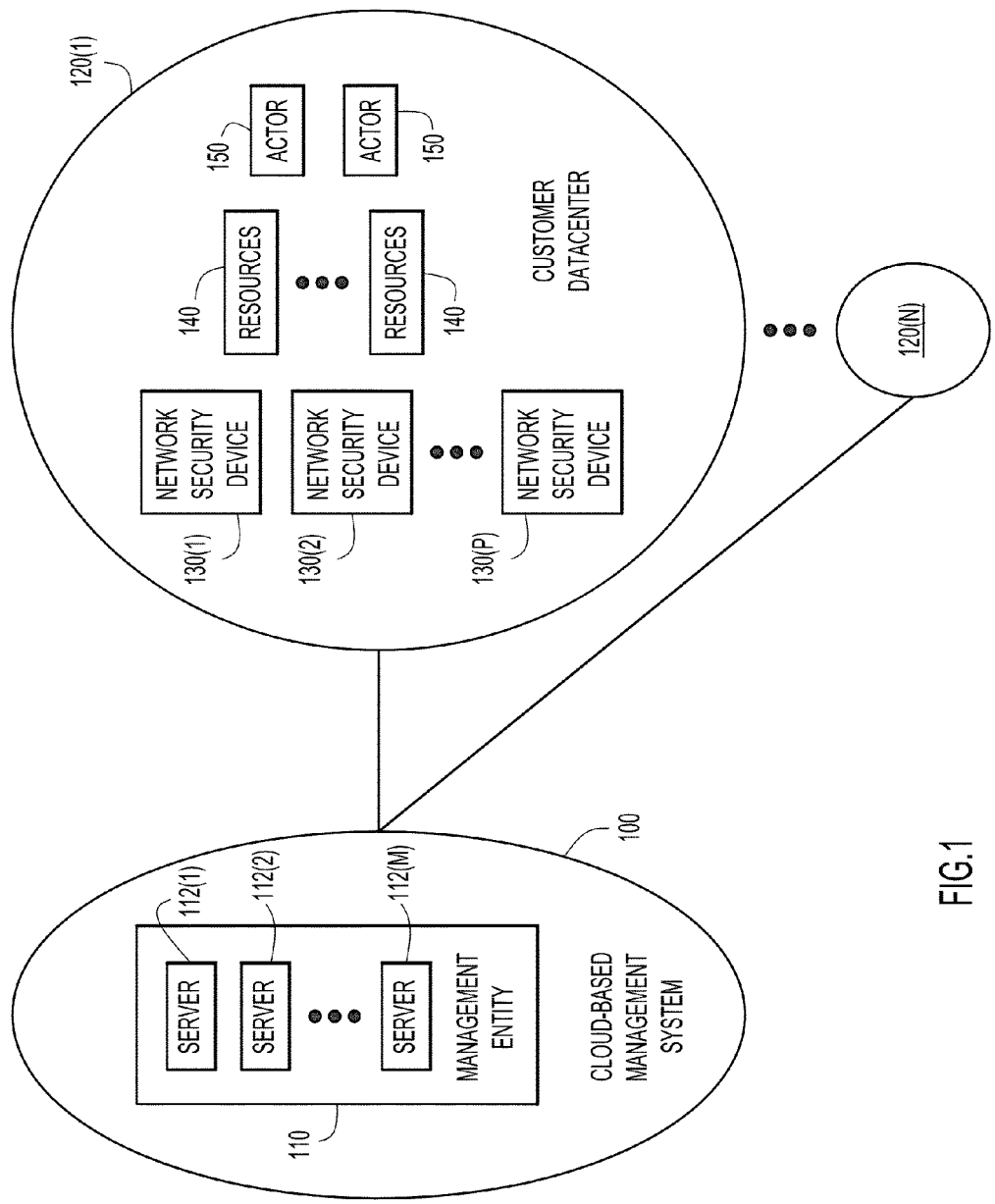
FIG. 1 is a diagram of a system including a cloud-based management entity that manages a plurality of security devices in a customer datacenter, according to an example embodiment.

A management entity displays a plurality of icons, each icon representing an actor or a resource in a networking environment. The management entity defines security policy by receiving user input in the form of a line drawn between a first icon representing an actor and a second icon representing a resource to control abilities between the actor and the resource.

Example Embodiments

Presented herein are a system and methods which simplify, unify and enhance policy management for network security products. A centralized management entity, that may take the form of a cloud-based application, communicates with the network security products (e.g., devices, applications, etc., but generally referred to as "security devices" herein) in a given network environment (e.g., a customer datacenter or customer enterprise network, etc.). The system can perform analytics and obey shared best practices to provide enhanced insight into network security threats in order to make prompt mitigation. The system presented herein can achieve real-time integration between threats and policy enforcement in a way not heretofore possible.

Examples of network security devices/products that may be integrated into the system presented herein include, but are not limited to including, firewalls, intrusion prevention systems (IPSs), Next Generation firewalls (NGFWs), Next Generation IPSs (NGIPSs), web security appliances (WSAs), identity services engines (ISEs), application security appliances (ASAs), cloud web security (CWS) products, security manager products, content security management appliances, cloud firewalls, intrusion detection systems (IDSs), etc.

As used herein, a security policy is a set of (one or more) rules that governs what is and what is not allowed through security devices/products. Security policies include network security policies, application security policies, and authentication security policies. A policy typically includes multiple attributes, such as source, destination, applications, port, universal resource locator (URL), on which to take a network security operation or action (e.g., permit or deny). The embodiments presented below are directed to network security policies for illustrative purposes only, and may be used for application security policies and authentication security polices, as would be appreciated by one of ordinary skill in the relevant arts with access to present description.

Thus, the term "network security device" as used herein is not meant to be limited to network devices, and may include other security devices and applications, such as application security, content security, authentication, etc. Thus, more generally these devices are referred to as "security devices" and are meant to include physical devices as well as applications or tools. Likewise, the term "network security policy" is not limited to network policies, and may include other security policies, such as application security policies, content security policies, authentication policies, etc., and thus, more generally these policies are referred to as "security policies."

A business policy is typically a statement in writing of how a company plans to protect the company's physical and information technology (IT) assets. A role of a security architect or security operator is to apply the business policy into enforceable security policy(ies), monitor the enforcement, and make changes as needed.

Overall System

Referring now to FIG. 1, a cloud-based management system 100 is shown that connects to and communicates with network security devices in a customer datacenter. FIG. 1 shows the details of customer datacenter 120(1), but it should be understood that the cloud-based management system 100 may connect and communicate with multiple customer datacenters 120(1)-120(N) as shown in FIG. 1.

The cloud-based management system 100 includes a management entity 110 that consists of one or more computer servers 112(1)-112(M) that execute software to perform the operations described throughout this disclosure. An example of a hardware configuration for the management entity 110 is described in more detail below in connection with FIG. 13.

The customer datacenters 120(1)-120(N) each includes a plurality of network security devices or products, shown at reference numerals 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to policies, i.e., a set of one or more rules configured on the respective network security devices.

As explained above, the network security devices 130(1)-130(P) may be of different types from the same or different vendors of network security products. The management entity 110 centralizes and unifies the management of network security policies across the plurality of network security devices 130(1)-130(P) to greatly simplify network security management in a customer datacenter.

Figure 2:
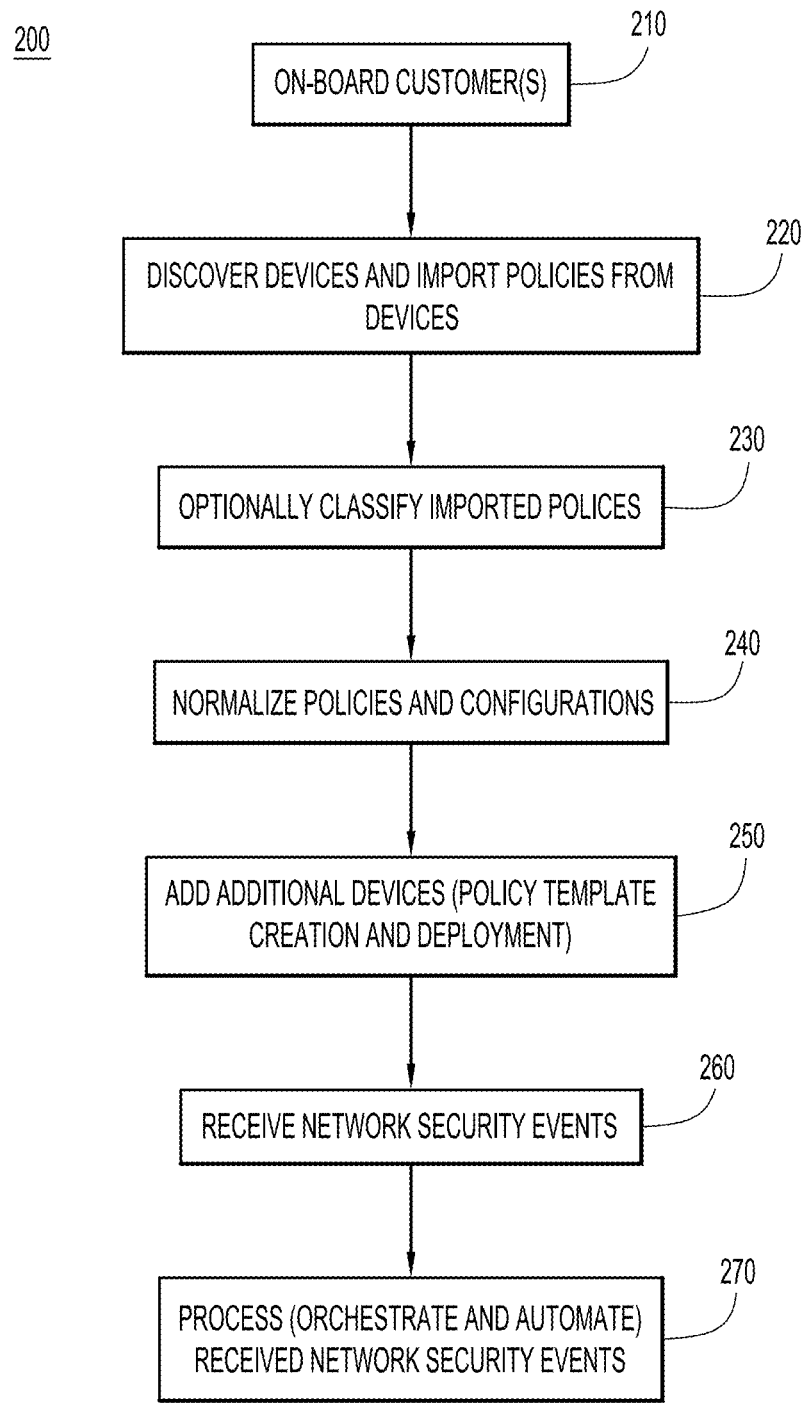
FIG. 2 is a flow chart depicting a method for managing a plurality of security devices in a customer datacenter, according to an example embodiment.
Figure 3:
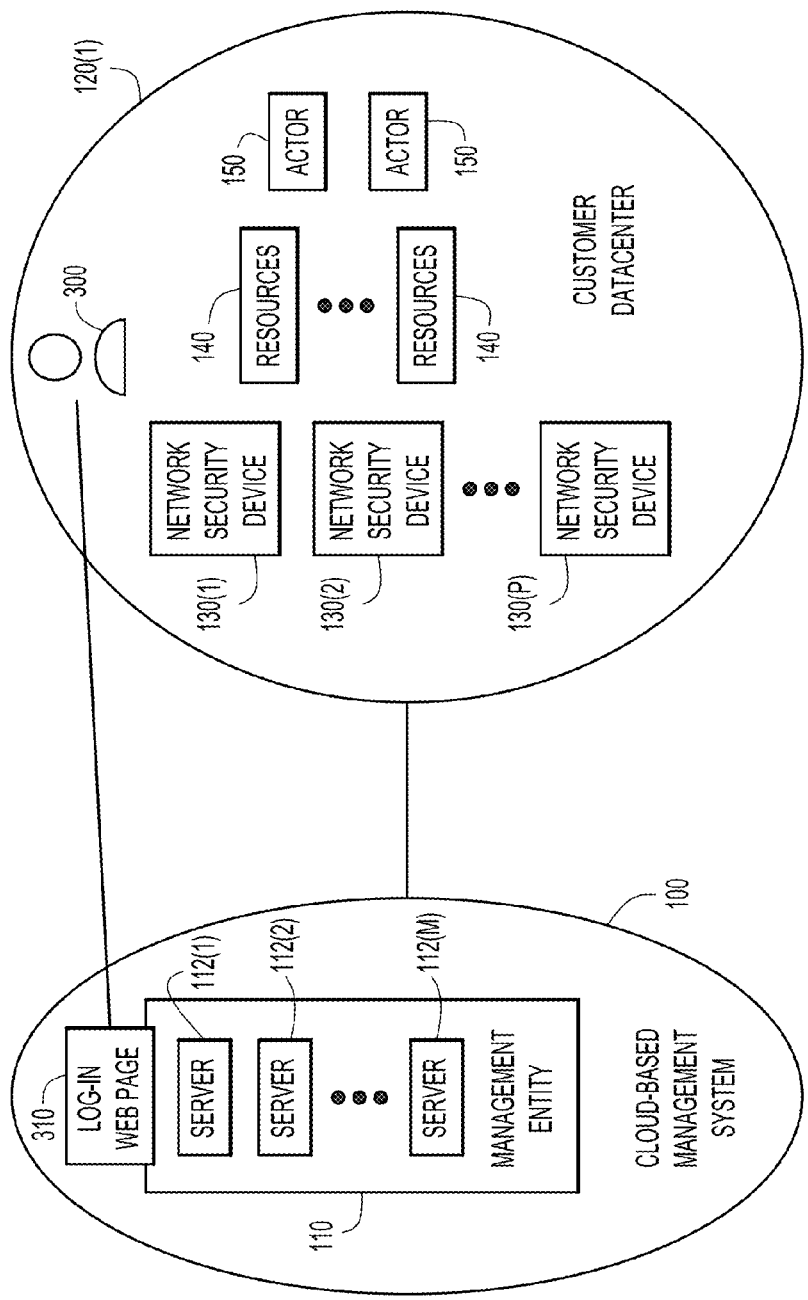
FIGS. 3-8 are diagrams illustrating operations of the various steps in the flow chart of FIG. 2.

Turning now to FIG. 2, a flow chart is shown for a process 200 according to an example embodiment. This process 200 is described in connection with FIGS. 3-8. The process 200 begins at step 210 where a customer (e.g., a business or enterprise) is on-boarded to a cloud-based management system. This on-board operation is shown in FIG. 3. This involves a network administrator shown at reference numeral 300 logging on to a log-on web page 310 served by one of the servers 112(1)-112(M) of the management entity 110. The log-on web page 310 allows the network administrator to set up privileges to permit the management entity to communicate, over the Internet, into the customer datacenter 120(1) in order to connect to the network security devices 130(1)-130(P). In addition, during the initial log-in and setup phase, the network administrator provides names and address (e.g., Internet Protocol (IP) addresses) for each of the network security devices in the customer datacenter. Other types of set-up processes may be used other than use of a log-on web page.

Figure 4:
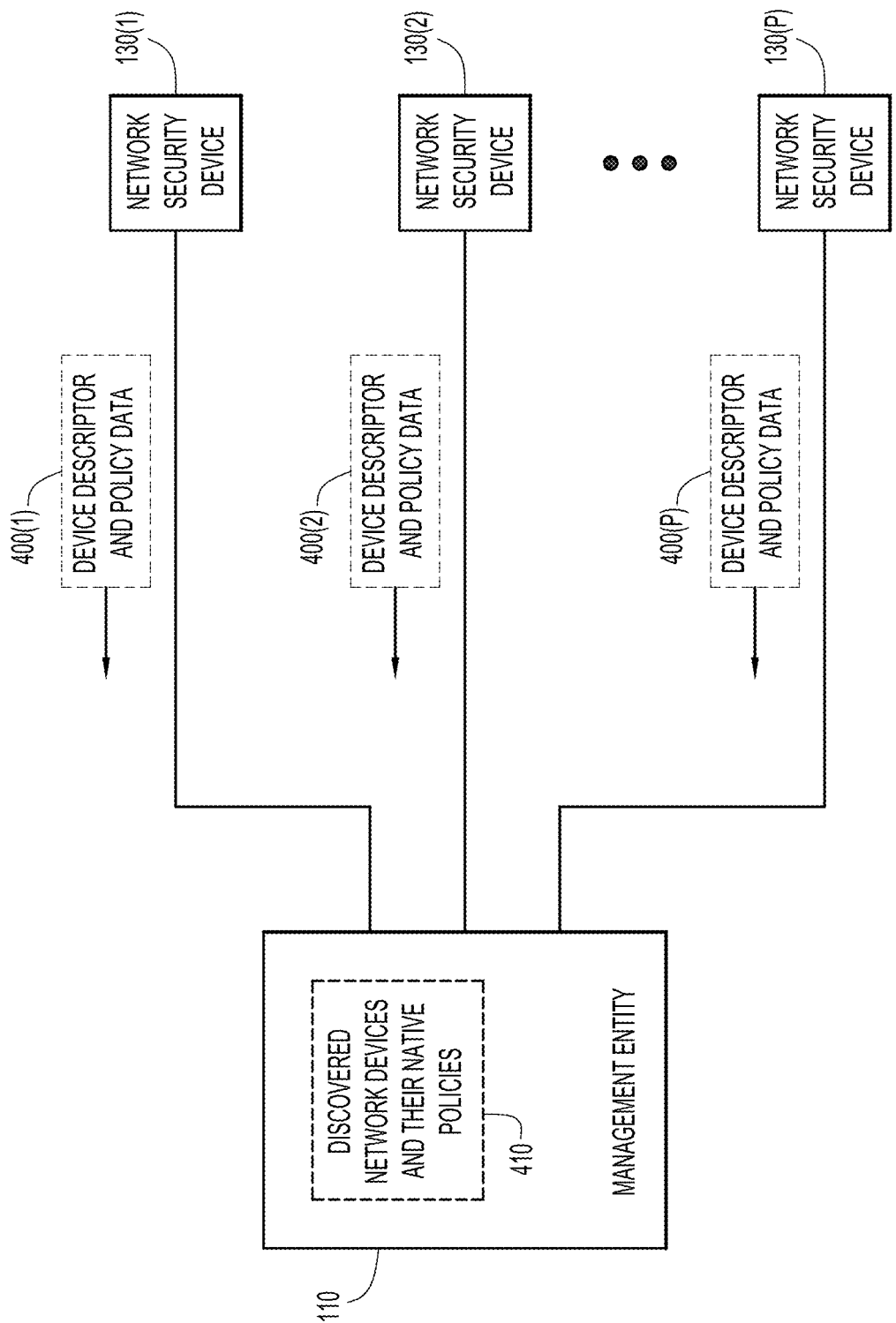
Figure 5:
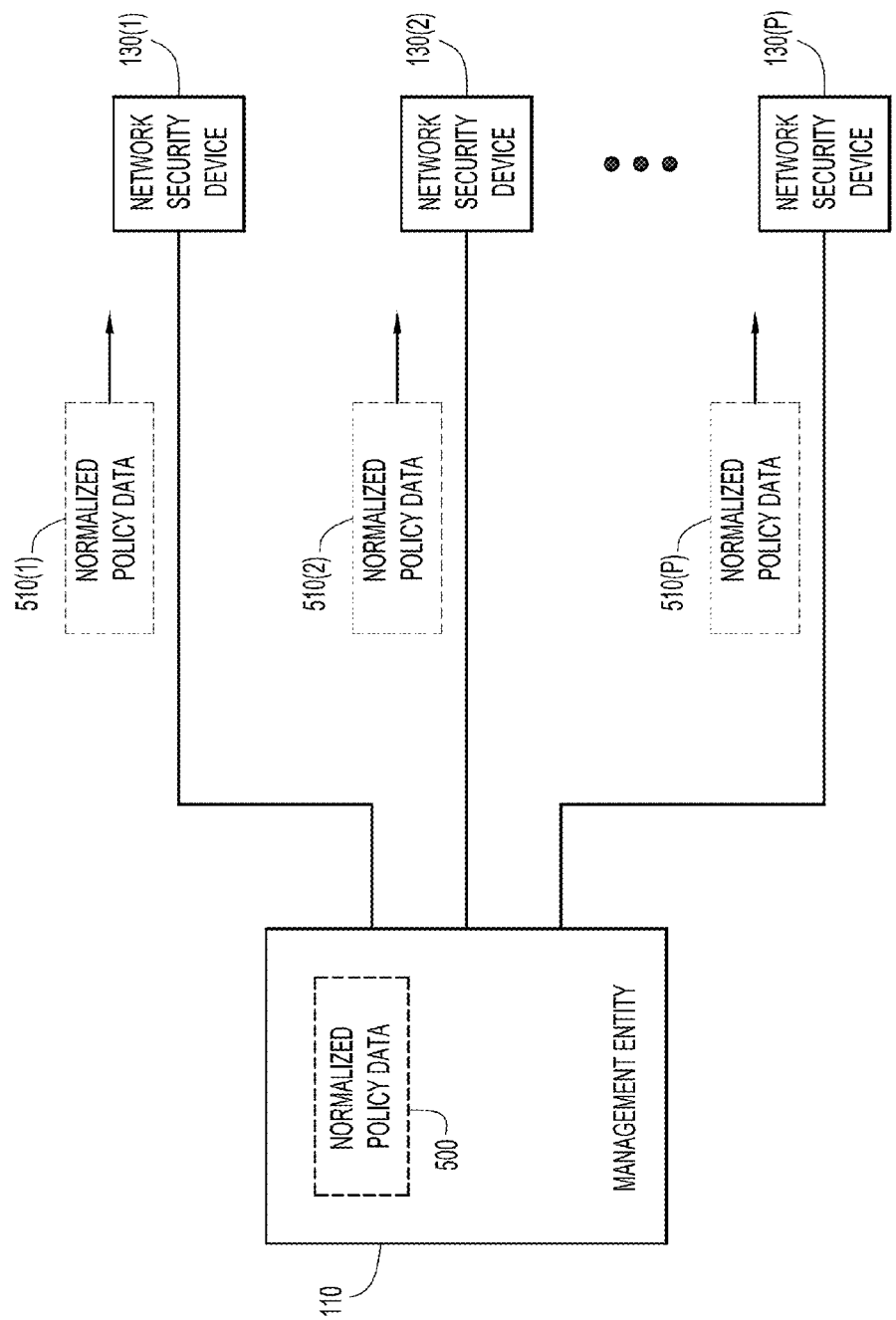

Next, at step 220, the management entity 110 discovers the network security devices and imports the policies from each network security device. This operation is depicted in FIG. 4. The discovery step is described in more detail hereinafter. Briefly, this involves sending a connection string and device type tag to each network security device. Each network security device responds with device descriptor and policy data for each network security rule configured on the respective network security device. This data is shown at reference numerals 400(1)-400(P) from network security devices 130(1)-130(P), respectively. An example of the policy data imported form a security device may be:
Protocol: HTTPS
Network: All
Destination: 132.180.0.0/24
Description: Web
Policy: On
Logging: On The management entity 110 stores the discovered data describing the discovered security devices and their native policies, as shown at reference numeral 410. Each native network security policy may be one or more native network security rules associated with a named network security device and formatted according to a corresponding native policy model for a network security device. Each native network security rule may in turn include a set of rule parameters to permit or deny network access for the named network security device based on a network protocol, source and destination addresses, and a device port.

Next, at step 230, and as an optional step, the imported policies are classified. Specifically, the imported policies are compared against each other to determine whether they can be grouped into one of several categories. These categories include, but are not limited to including: (1) identical, (2) similar, (3) unique and (4) further investigation required. The classification step 230 is described in further detail below in under the heading "Security Policy Classification." Generally speaking, classifying may involve classifying imported native network security policies into network security policy classifications each including one or more of the imported native network security policies based on commonality between security rules included in the native network security policies across the multiple network security devices. Thus, classifying may involve automatically classifying the network security policies into the classifications based on commonality between the network security rules across the named devices associated with the network security policies.

Next, at step 240, data describing the native network security policies received from each of the network security devices is normalized in accordance with a generic policy model to produce normalized policy data. The normalized policy data is shown at reference numeral 500 in FIG. 5. Corresponding normalized policy data 510(1)-510(P) is sent to each of the network security devices, and as explained further hereinafter in the section under the heading "Security Policy Unification", a translation is made from the normalized policy data 500 in accordance with the generic policy model to rules in accordance with the native rule set for the respective network security devices. Generally, each native network security policy imported from a network security device may be a set of one or more native network security rules, each native network security rule including native rule parameters expressed according to the corresponding native model. The imported native network security policies are normalized by, for each imported native network security policy, mapping the native rule parameters expressed according to the corresponding native model to corresponding components of a generic rule defined according to the generic policy model. The mapping may include mapping the native rule parameters to the corresponding components {a principal or actor}, {action}, {a resource}, {a context}, and {perform a result} as used in the generic rule: "if {a principal or actor} tries to perform an {action) on {a resource} within {a context} then {perform a result}."

Figure 6:
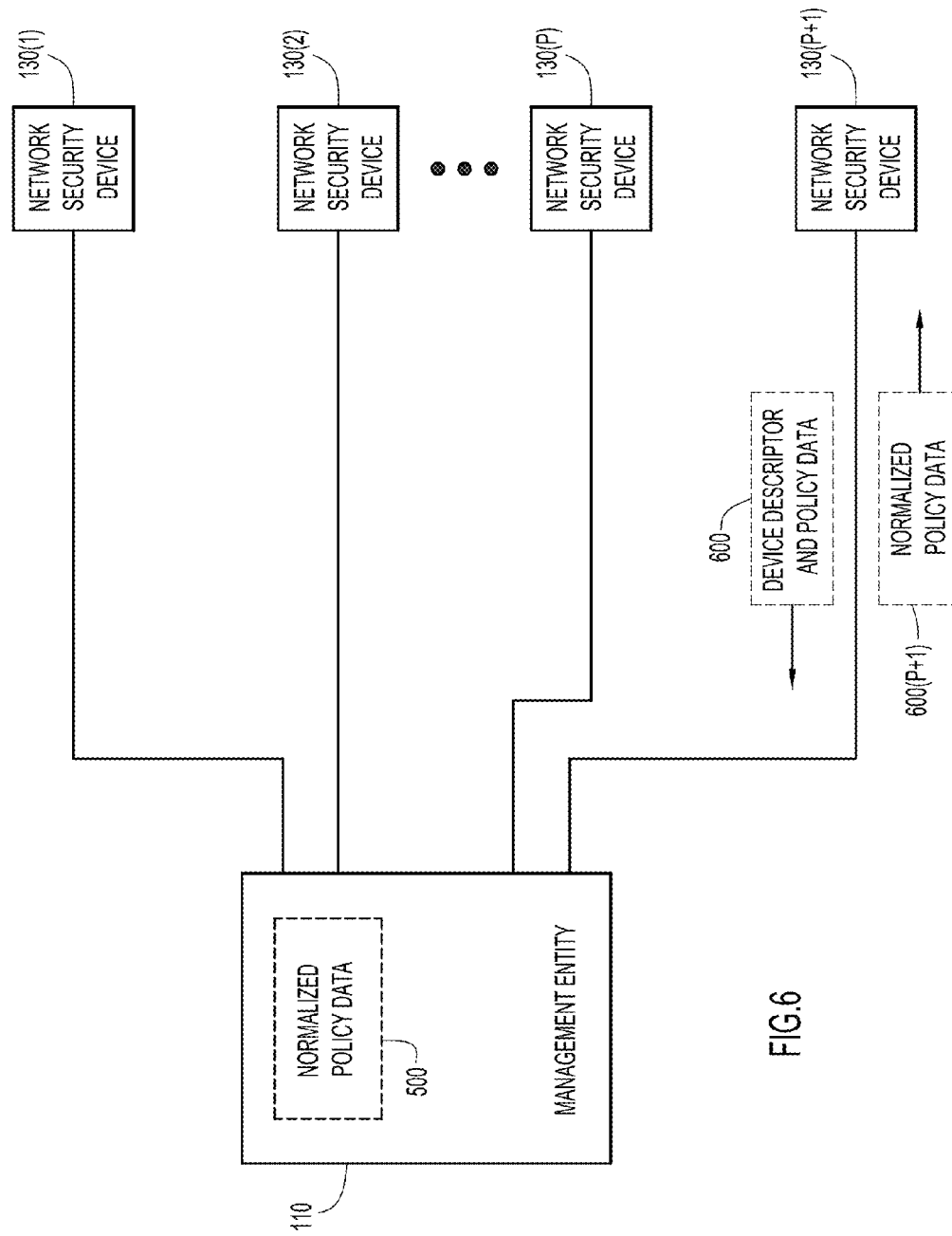
Figure 7:
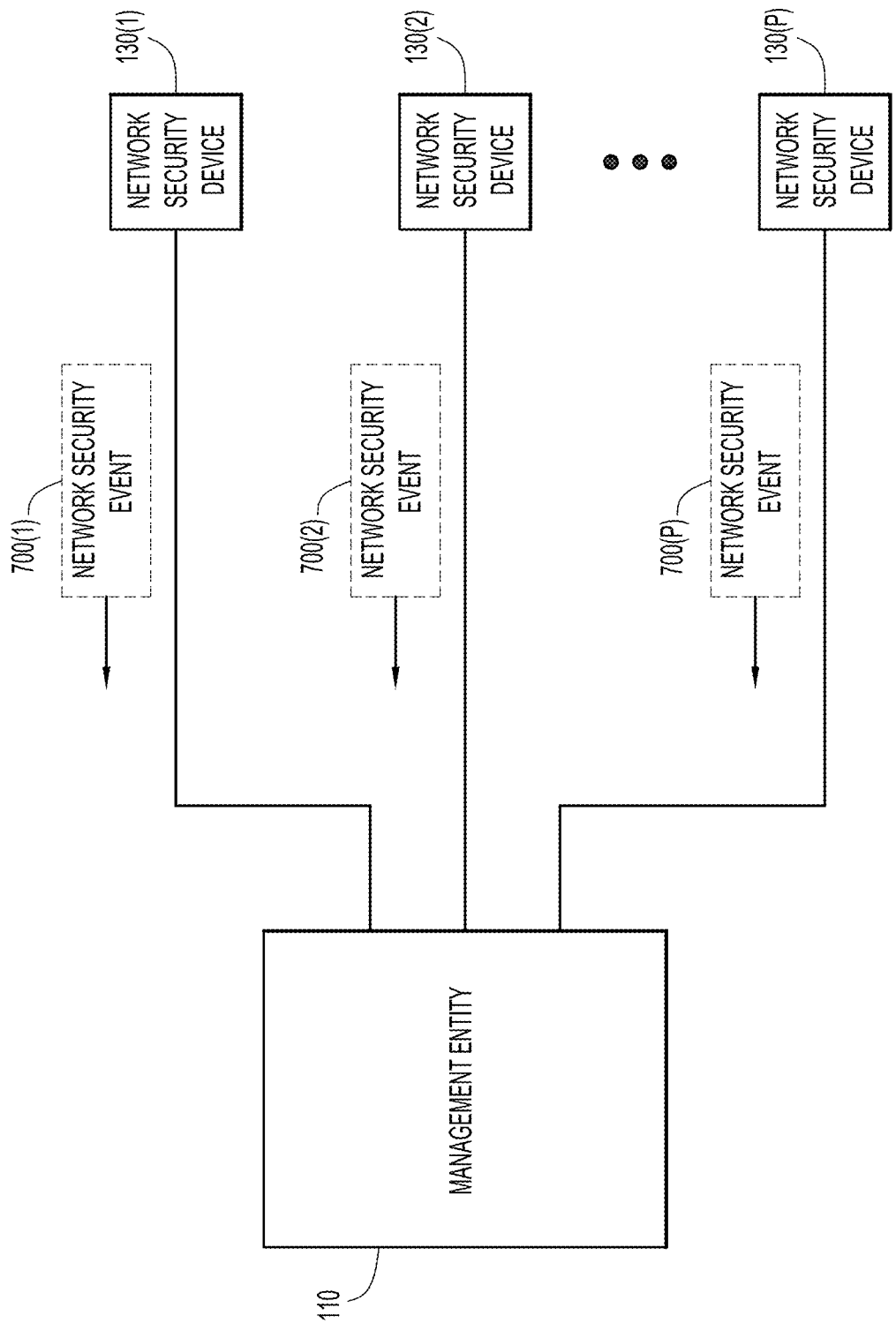

Next, at step 250, additional network security devices may be added and in so doing a network policy template may be created that is deployed to any additional network devices. FIG. 6 illustrates the additional network security device at reference numeral 130(P+1). When a new network security device is added, its device descriptor and native security policy data is imported as shown at reference numeral 600. This policy data is normalized against the generic policy model, as described above in connection with FIG. 5, and normalized policy data 610(P+1) is sent to the network security device 130(P+1). Creating a network security policy template (from one or more existing normalized network security policies) and deploying it to a network security device is described in more detail hereinafter under the heading "Network Security Policy Template Creation and Deployment."

Next, at step 260, the management entity 110 receives network security events from the network security devices 130(1)-130(P) in the customer datacenter. Data describing network security events from respective network security devices is shown at reference numerals 700(1)-700(P) in FIG. 7. Examples of network security events include, but are not limited to including, how many times a device wants to access a range of Internet Protocol (IP) addresses (that may or may not the addresses are allowed in a WSA device, for example), how many times an outside device is trying to get through a firewall over a certain range IP addresses, access attempts to certain destination IP addresses beyond a firewall, etc. As explained above, these security events include application security, content security, authentication related, etc., and thus they are "security events" in general.

Figure 8:
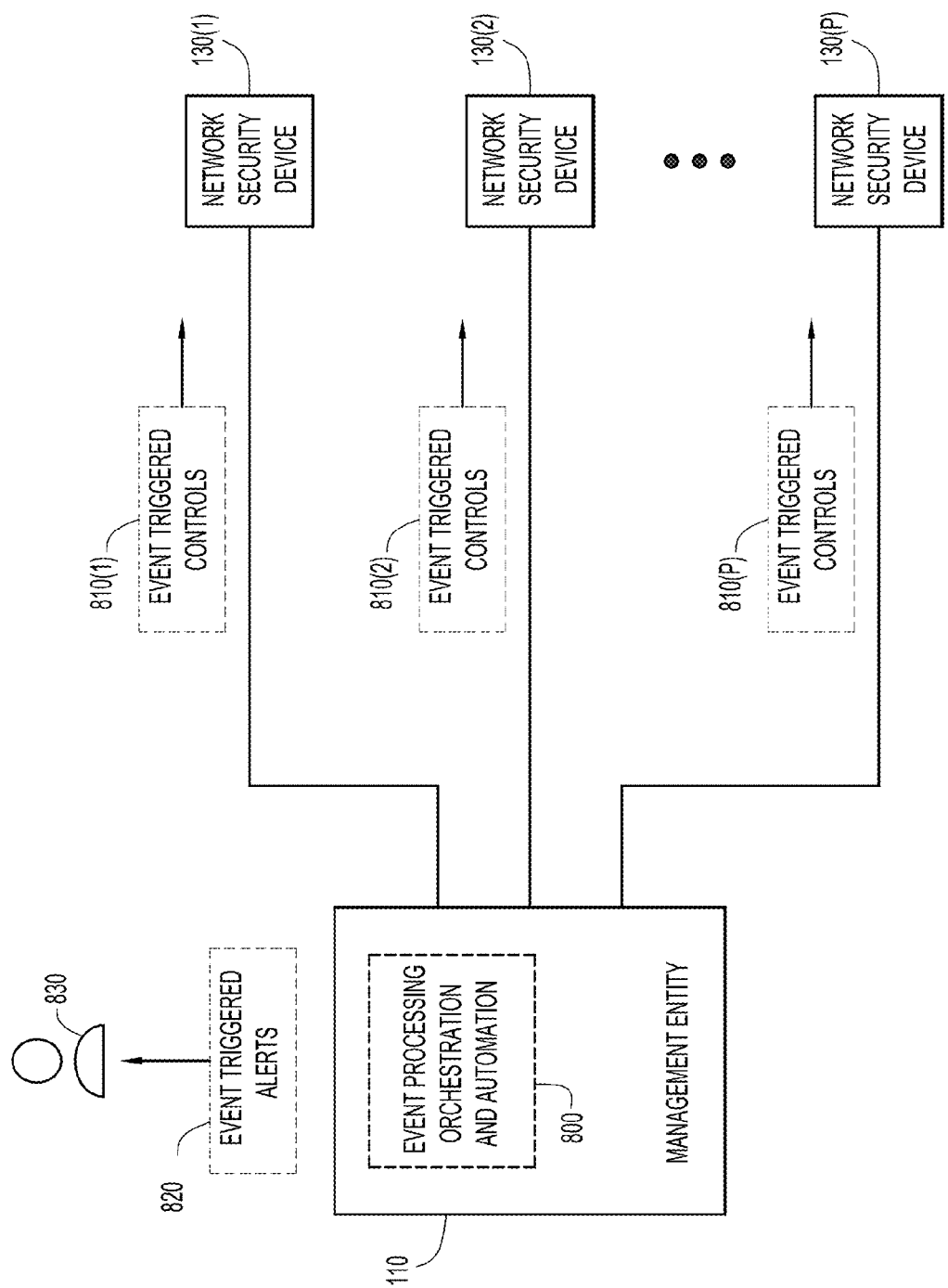

Next, at step 270, the management entity processes (orchestrates and automates) the received network security events. As shown in FIG. 8, the management entity 110 performs event processing at 800. This is important because it may be necessary to make changes to rules to permit certain activity that is revealed by numerous attempts to certain IP addresses outside the customer datacenter from within the customer datacenter as described herein, or to prevent certain activity that appears to be malicious. Thus, as shown in FIG. 8, the management entity 110 may generate one or more event triggered controls 810(1)-810(P) to one or more of the network security devices 130(1)-130(P), causing a change to the native rules applied by respective ones of the network security devices 130(1)-130(P). In addition, the management entity may send event triggered alerts, shown at 820, to a network administrator 830 or some specified destination associated with the customer datacenter.

To summarize, at a system level, a method is provided comprising: at a management entity, discovering multiple security devices connected to a network, each security network device to control network access by devices associated therewith according to a corresponding native security policy that is based on a corresponding native policy model associated with the security device; importing the native security policies from the corresponding security devices over the network; normalizing the imported native security policies across the security devices based on a generic policy model, to produce normalized security policies that are based on the generic policy model and representative of the native security polices; and processing (orchestrating and automating) received network security events among the security devices based on the normalized security policies. Processing may involve reporting the received network security events to a desired destination (e.g., a network administrator), and making changes to security policies as needed based on the received network security events.

Figure 9:
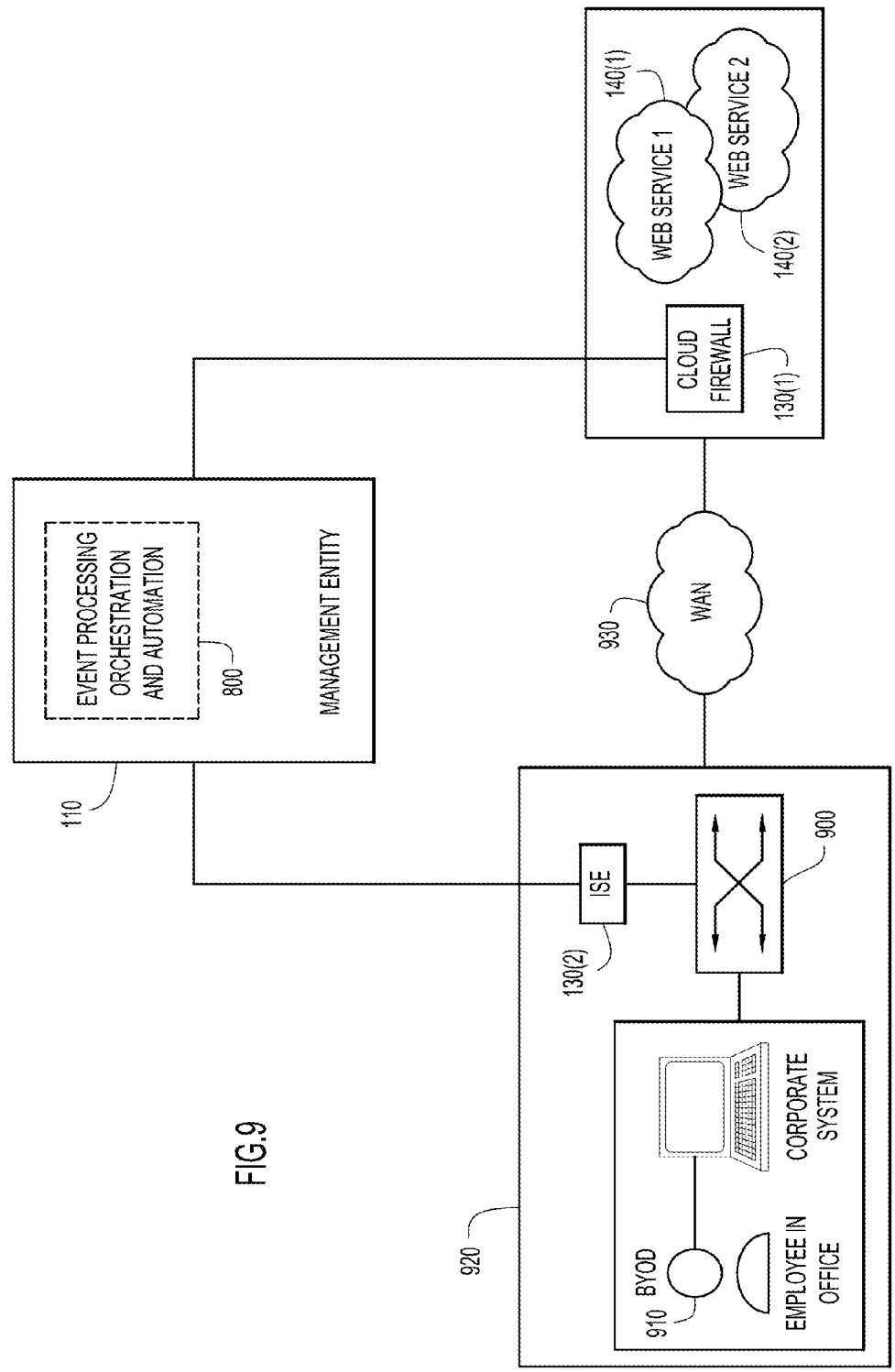
FIG. 9 is a block diagram illustrating an example application of the system of FIG. 1, according to an example embodiment.

Reference is now made to FIG. 9 for an example of a business policy and a network security policy. FIG. 9 depicts a use case on how security policy may need to run on multiple devices to be complete, from the gateway controlling access of Bring Your Own Devices (BYODs) to a cloud firewall requiring a policy that is synchronized across multiple devices by definition. In this example, there a network security device 130(1) in the form of cloud firewall, which may reside outside of the physical premises of a customer facility. There is another network security device 130(2) in the form of an identity services engine (ISE). The network security device 130(1) is useful to control access to certain web services, such as Web Service 1 at reference numeral 140(1) and Web Service 2 at reference number 1402(2). Network security device 130(2) connects to a router 900. A user, such as an employee in a corporation, is shown at 910, who may be using a Bring Your Own Device (BYOD), such as a tablet computer on the corporate network 920. The corporate network connects to the outside world via WAN 930.

There is a business policy set by the corporation that says access to Web Service 1 is to be denied, but Web Service 2 is to have access to employees in the corporate network. The rules on the network security devices 130(1) and 130(2) are as follows.

Network Security Device 130(1):
Src=Any User=Employees Dst=Any Application=Web Service 1 Action=Deny
Src=Internal_network User=Mktg Dst=Any Application=Web Service 2 Action=Allow
Network Security Device (ISE) 130(2):
Rule Name: Employee
Identity Group: Any
Other Condition: AD1:ExternalGroups EQUALS corporate.com
/Users/Domain Users AND Session: Posture Status EQUALS Compliant
Permissions: Allow The management entity 110 receives network security events from the network security devices 130(1) and 130(2) which indicate that a desired business goal is not being met with currently running security policies. The management entity 110 thus makes a change of those security policies with a single normalized policy as described above in connection with FIG. 8, to return operations of the network security devices 130(1) and 130(2) so that the business policy is achieved.

Figure 10:
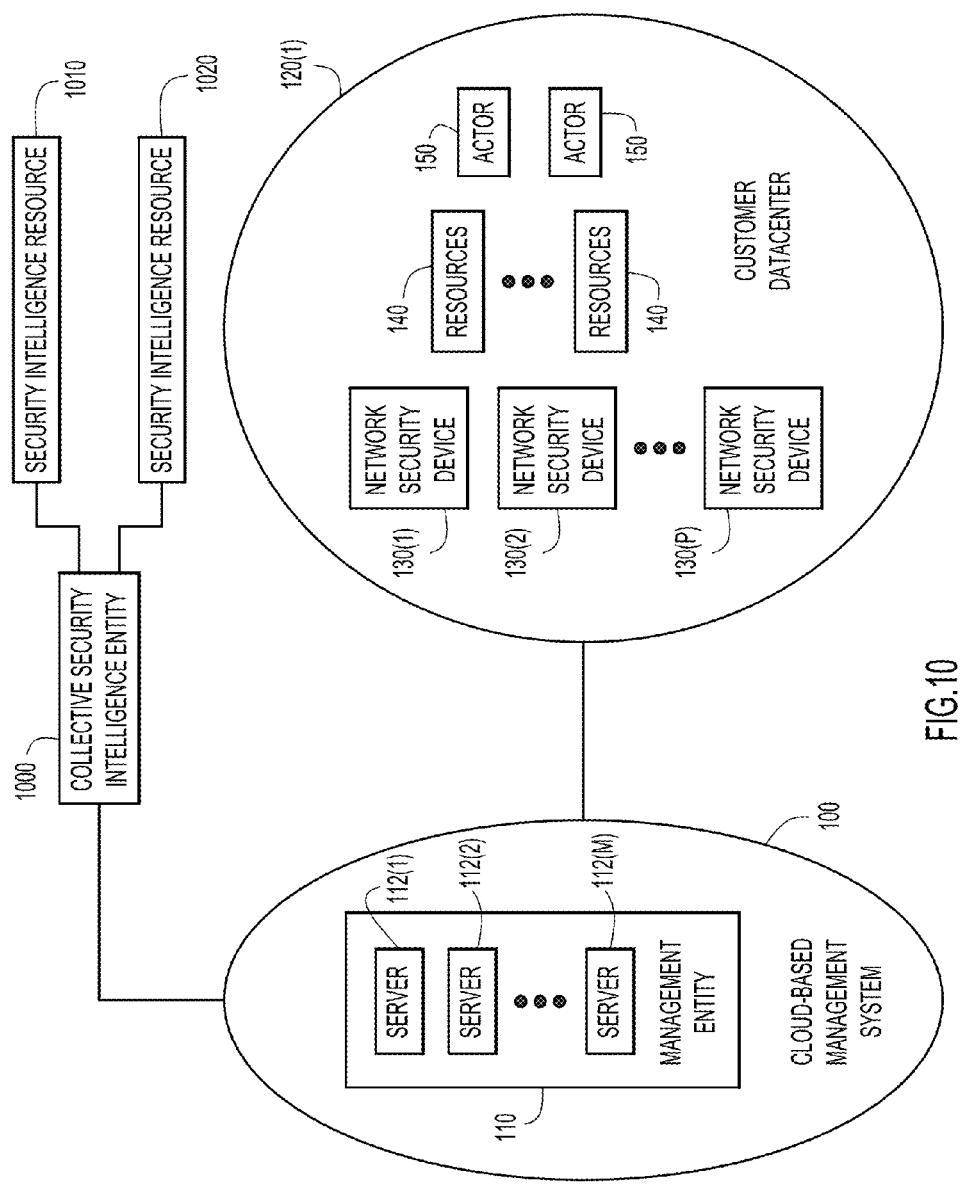
FIG. 10 is a block diagram illustrating another example application of the system of FIG. 1 involving use of collective security intelligence, according to an example embodiment.

Reference is now made to FIG. 10. FIG. 10 illustrates a further capability of the cloud-based management system 100. The system 100 can be integrated with various security intelligence feeds. For example, a collective security intelligence entity 1000 receives events from the customer data center via the cloud-based management system 100, and receives security intelligence feeds from multiple security intelligence resources 1010 and 1020. This allows the collective security intelligence entity 1000 to correlate security intelligence data and events from a customer datacenter's security devices to determine threats. The collective security intelligence entity 1000 can generate reports provide insight into a security state of a customer's network. The data in these reports may be linked with the policy generation capabilities in the management entity 110 to quickly create business policy rules that will mitigate risks.

Figure 11:
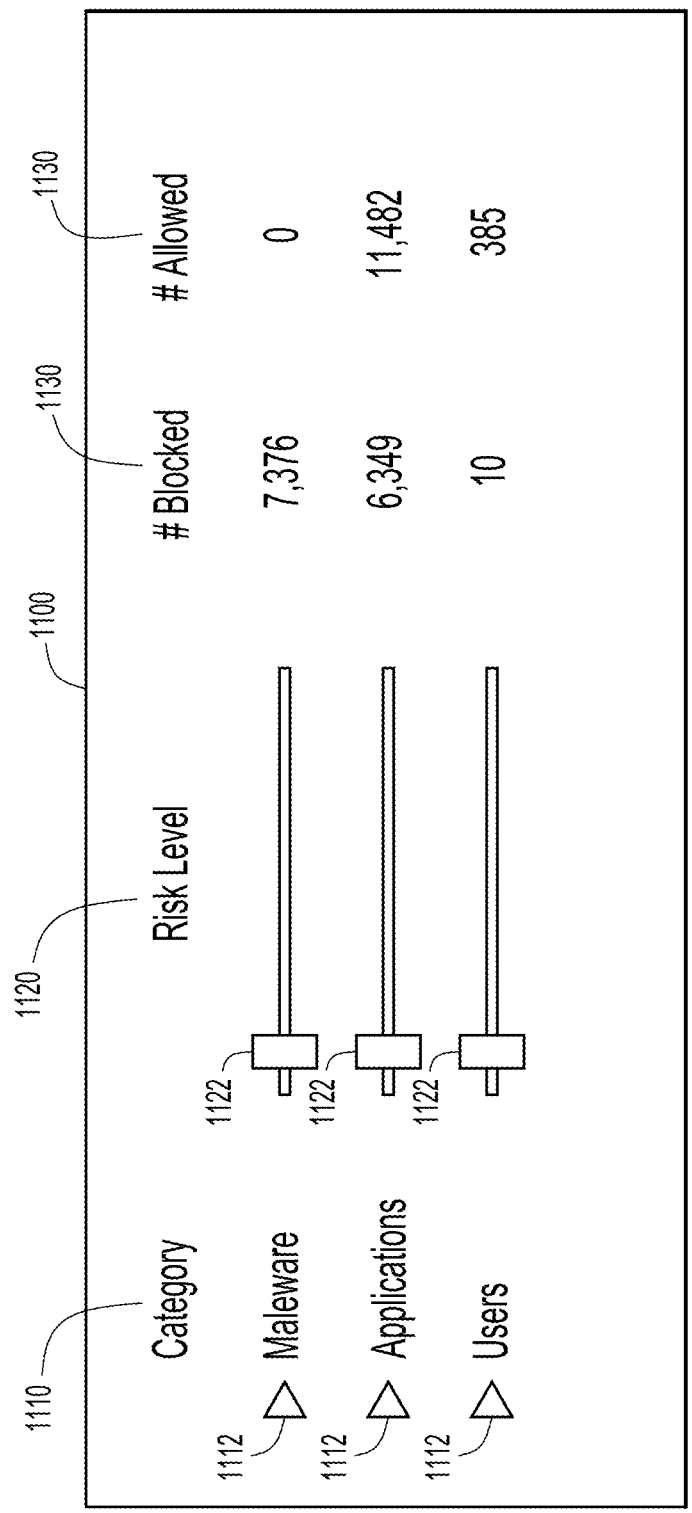
FIGS. 11, 12A and 12B are diagrams illustrating a user interface through monitored security activity is presented to a user and from which a user may invoke policy changes across multiple security devices, according to an example embodiment.

FIG. 11 illustrates an example graphical user interface 1100 for a threat summary report that the management entity 110 may generate and present to a network administrator for a customer datacenter. The report includes a column for different categories of risks (Malware, Applications, Users) as shown at 1110. Next to each category type name there is a expand icon 1112. There is also a column for risk level shown at 1120 and a graphical element, such as a slider bar 1122, may be used to indicate risk level for each category. Columns 1130 indicates the number of block packets for each category, and column 1140 indicates the number of allowed packets for each category. The slider bars 1122 represent accepted levels of risk and changes can be made by a user by moving a slider bar 1122, which will result on change in network security policies and updates across devices.

Figure 12A:
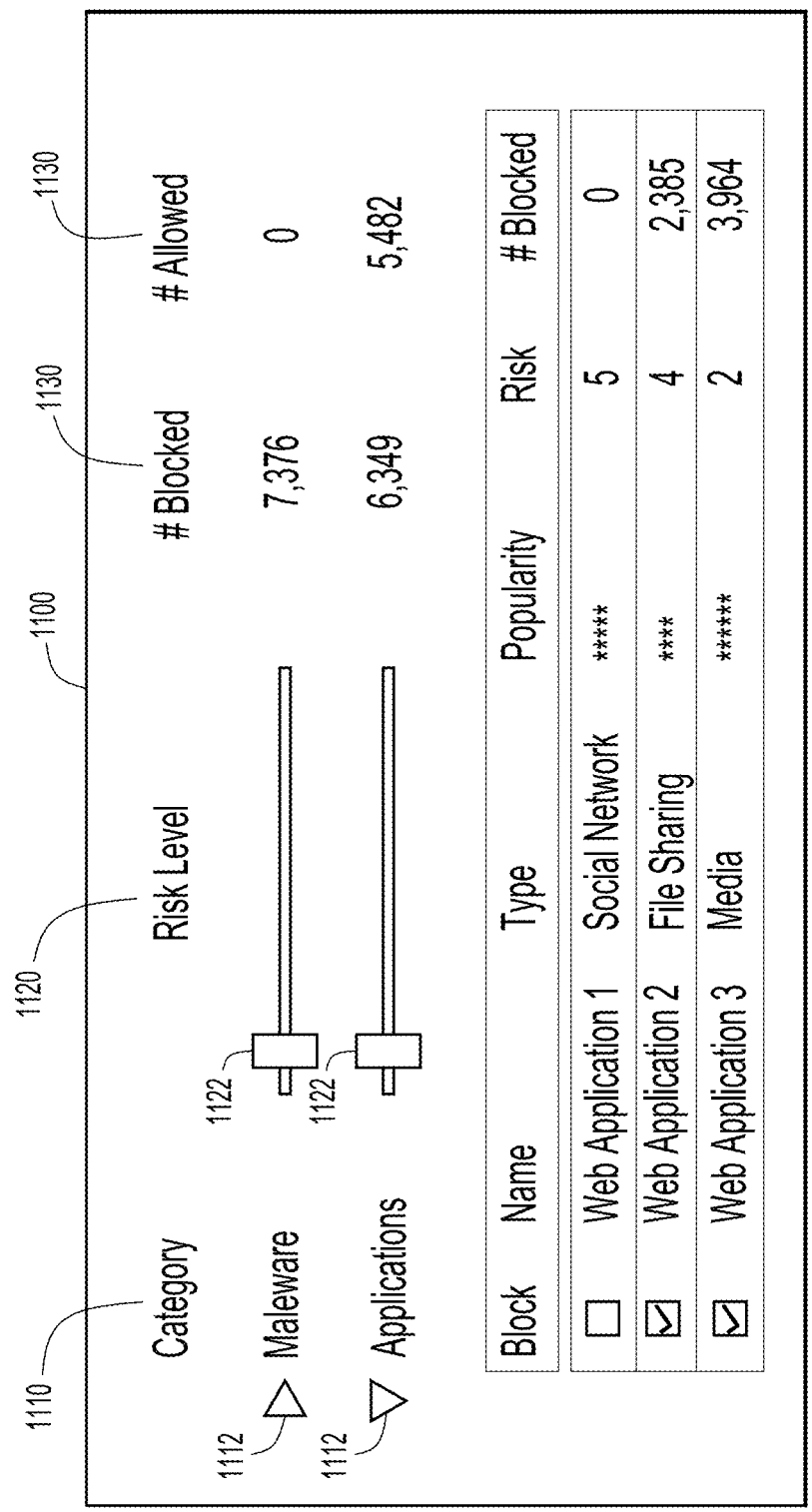
Figure 12B:
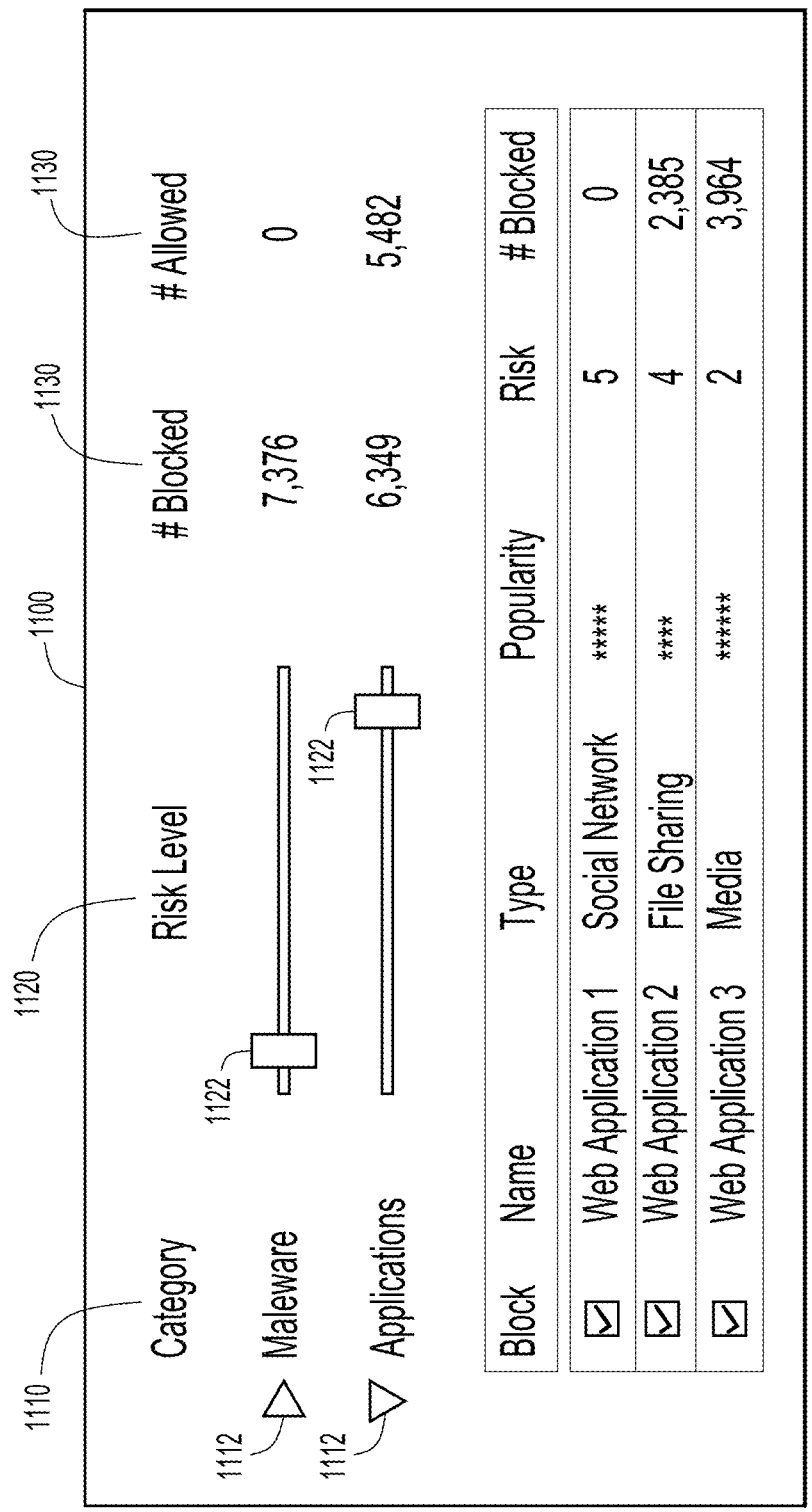

FIGS. 12A and 12B illustrate further details of the summary report user interface 1100. In particular, if a user selects the expand element 1112 for the Applications category as shown in FIG. 12A, additional details are displayed for types of applications. Specifically, a table 1200 is displayed contains a column for Block, Name, Type, Popularity, Risk and # Blocked. In this example, there are three web applications ongoing, Web Application 1, Web Application 2 and Web Application 3. The Blocked column indicates whether a policy has been set to block traffic for that application. Thus, FIG. 12A shows that policies have already been set to block/deny traffic for Web Application 2 and for Web Application 3, and the number of packets that have been blocked (the box in the Block column has been checked as shown at reference numerals 1210 and 1220) for those two applications are indicated in the column # Blocked. At this point in time, traffic for Web Application 1 has not been blocked because the box in the Block column has not been checked as shown at reference numeral 1230.

FIG. 12B shows the user interface 1100 similar to that shown in FIG. 12A, now as shown at 1210, a new policy is set by clocking the box in the Block column for Web Application 1 as shown at reference numeral 1240, which will start blocking traffic for Web Application 1. Up to this point, traffic for Web Application 1 has not been blocked so the field in # Blocked for Web Application 1 is still "0" but over time that number will increment upwards.

Figure 13:
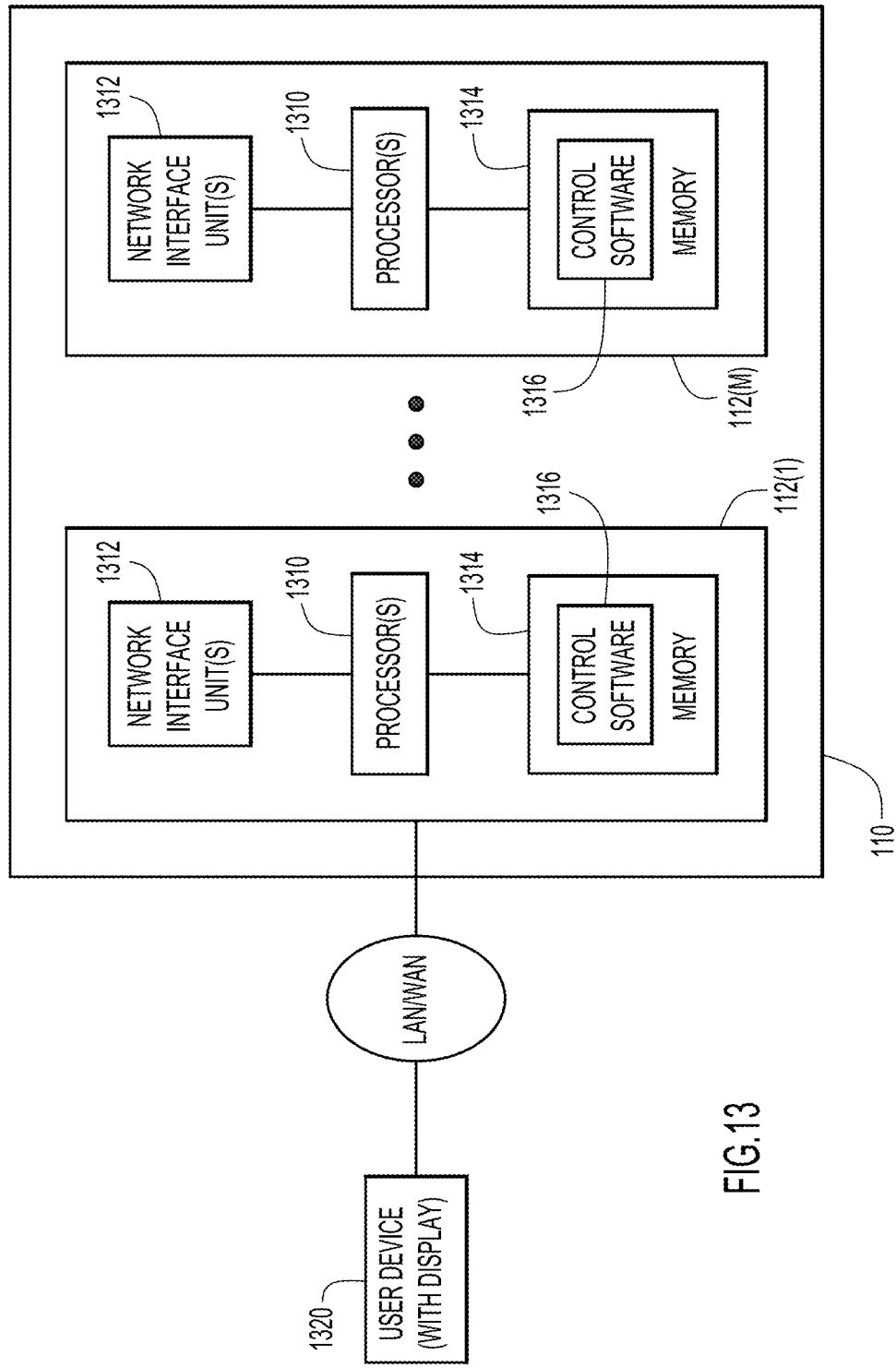
FIG. 13 is a block diagram illustrating a hardware configuration for the cloud-based management entity, according to an example embodiment.

Turning now to FIG. 13, a block diagram is shown of an example hardware implementation for the management entity 110. In one example, the management entity 110 includes one or more servers 112(1)-112(M). Each server includes one or more processors 1310, one or more network interface units 1312 and memory 1314. The memory 1314 stores control software 1316, that when executed by the processor(s) 1310, cause the server to perform the various operations described herein for the management entity 110.

The processor(s) 1310 may be a microprocessor or microcontroller (or multiple instances of such components). The network interface unit(s) 1312 may include one or more network interface cards that enable network connectivity.

The memory 1314 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1314 may comprise one or more tangible (non-transitory) computer readable storage media (e.g., memory device(s)) encoded with software or firmware that comprises computer executable instructions. For example, control software 1316 includes logic to implement (i) network security classification, (ii) network policy unification, (iii) network policy template creation and deployment, (iii) a generalized network policy user interface, as described below, and (iv) processing (orchestration and automation) of network policy management functions in connection with collections of reported network security events. Such logic also includes logic to implement Graphical User Interfaces (GUIs) as necessary in connection with the classification, unification, template creation and deployment, network policy user interface, and orchestration and automation.

A user, such as a network administrator, may interact with the management entity 110, to receive reports, change policy, etc., through GUIs by way of a user device 1320 that connects by way of a network (local area network (LAN) and/or wide area network (WAN)) with the management entity 110. The user device 1320 may be a personal computer (laptop, desktop), tablet computer, SmartPhone, etc.

Security Policy Classification

As mentioned above, management entity 110 imports network security policies from multiple distributed network security devices 130. Each network security policy may include a combination of policy features that collectively define the policy and control the security behavior of the network security device from which the policy was imported. The policy features include network security rules, and may also include one or more of configuration, interface, object, and object content features. According to an embodiment presented below, management entity 110 classifies or categorizes the imported network security policies into different network security policy classifications based on commonality between the policy features included in the network security policies. The different network security policy classifications or categories include (1) identical, (2) similar, (3) unique, and (4) investigate further.

Figure 14:
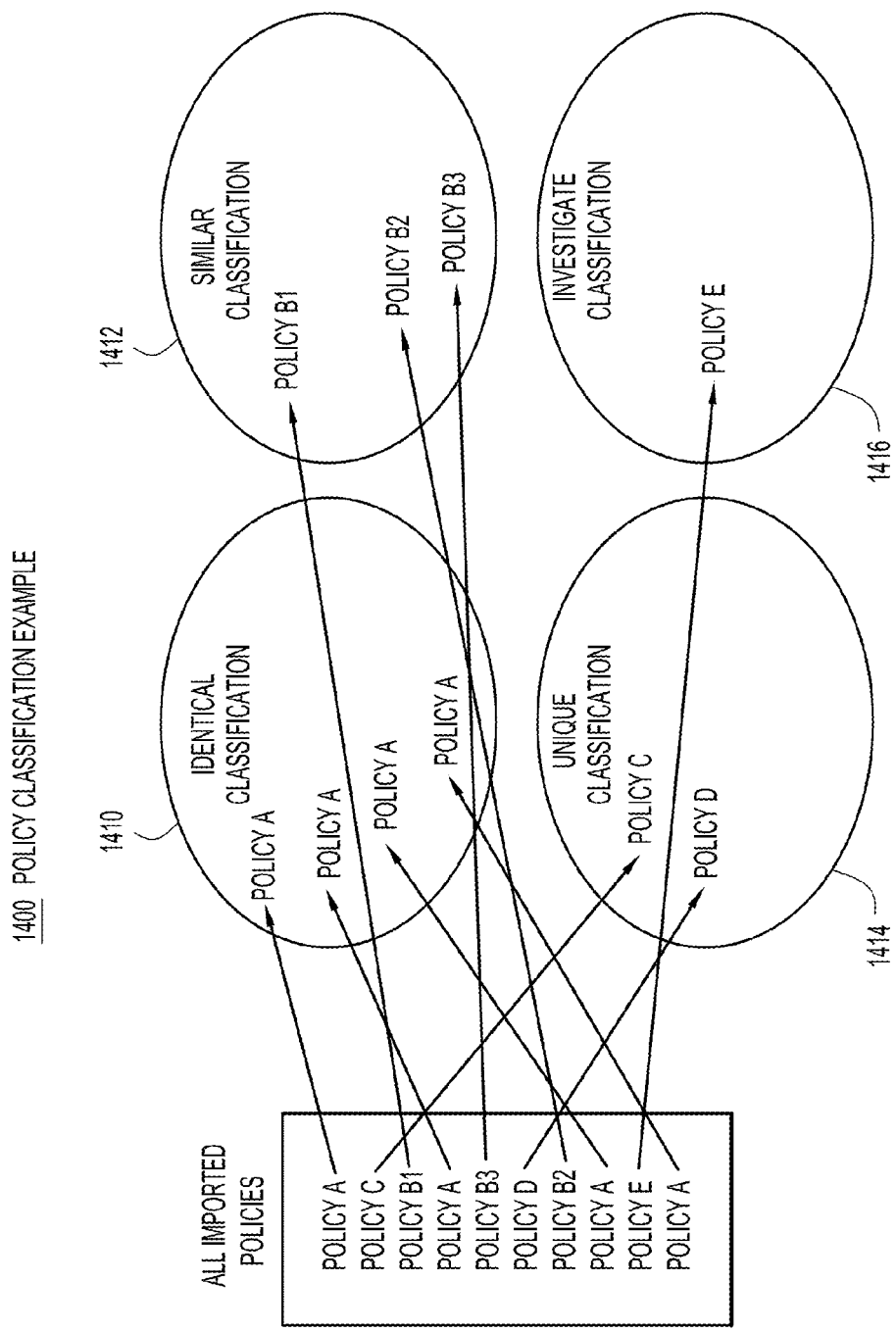
FIG. 14 is an illustration of a classification operation performed by the management entity, according to an example embodiment.

With reference to FIG. 14, there is an illustration of an example classification operation 1400 performed by management entity 110. In the example of FIG. 14, management entity 110 determines commonality between policies A (multiple instances of policy A associated with multiple network security devices), B1, B2, B3, C, D, and E imported from different network security devices based on comparisons between the respective policy features of the imported policies. Such commonality may indicate imported policies which are related, linked, and the like, across security devices, and indications of commonality to a user by management entity 110 may help the user to manage such policies across the devices. The commonality determination indicates that the instances of policy A are identical, policies B1, B2 and B3 are similar to each other, policies C and D are unique (i.e., different from each other and all of the other imported policies), and policy E needs further investigation. Accordingly, management entity 110 groups the instances of policy A into an identical bucket or classification 1410, policies B1, B2 and B3 into a similar classification 1412, policies C and D into a unique classification 1414, and policy E into an investigate (further) classification 1416.

Figure 15B:
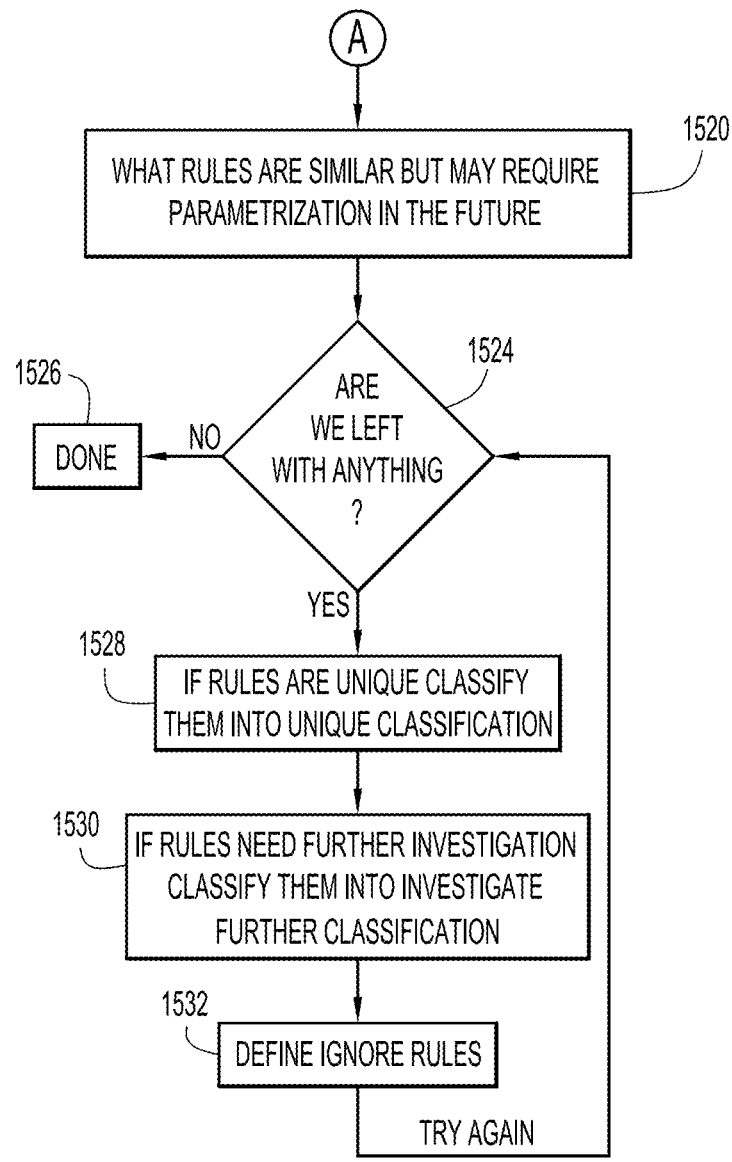

With reference to FIGS. 15A and 15B, there is a flowchart of an example overview method 1500 of importing and classifying network policies from network security devices 130.

At 1502, 1504, and 1506, management entity 110 connects to a network, and then to network security devices 130 over the network, using URLs that direct the management entity to the devices, for example.

At 1510, 1512, and 1514, management entity 110 respectively imports network security policies from security devices 130 over the network, detects any failures that may occur while importing the policies, and whether the importing should continue if any such failures are detected. The importation of policies in 1510-1514 results in a policy importation report, a number of network policy rules that are imported, basic definitions associated with the imported policies such as a number of Network Address Translation (NAT) objects and other metrics, and a number of failed connections and imports.

At 1518, management entity 110 determines which of the imported network security polices are identical to each other based on a comparison between the imported policies, and classifies those policies determined to be identical into an identical classification.

At 1520, management entity 110 determines which of the imported network security policies are similar to each other based on a comparison between the imported policies and classifies those policies determined to be similar into a similar classification.

At 1524-1532, management entity 110 determines whether imported network security policies not previously classified as either identical or similar should be classified into either unique or investigate further classifications. Based on that determination, management entity 110 classifies the remaining network security policies as either unique or investigate further. More specifically, at 1528, management entity 110 determines whether any remaining network security policies should be classified as unique and, if it is determined that any remaining network security policies should be classified as unique, classifies those policies into the unique classification. At 1530, management entity 110 determines which of the network security policies require further investigation and classifies those policies, if any, into the investigate further classification. At 1532, management entity determines if any remaining network security policies should be ignored, i.e., not classified as described above. Operations 1528 and 1530 will be described further below in connection with FIGS. 18 and 20B.

Figure 16:
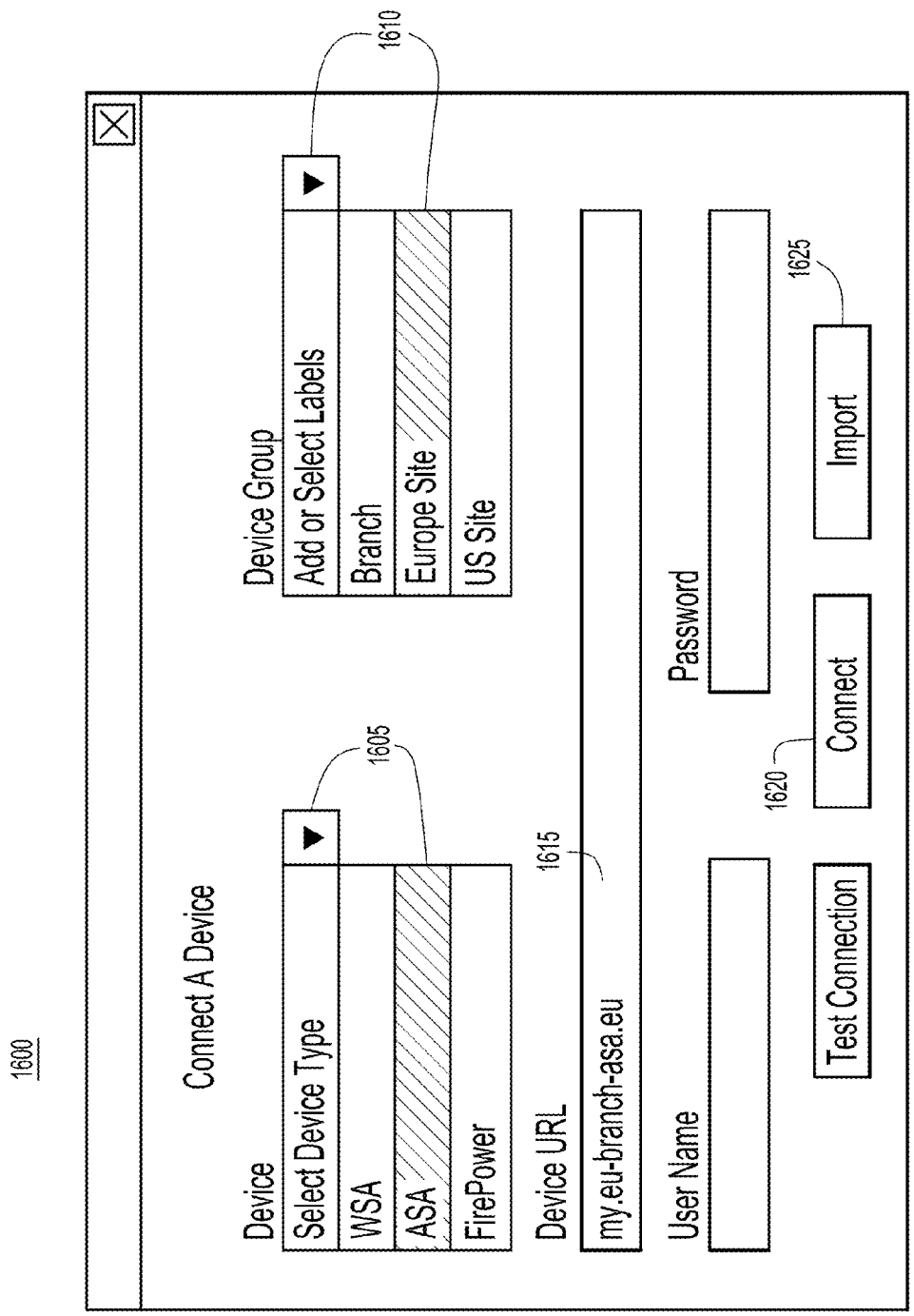
FIG. 16 is an illustration of user interface screen displayed by the management entity and through which a user may identify/select, connect to, and then import security policies from one or more security devices, according to an example embodiment.

With reference to FIG. 16, there is an illustration of an example Graphical User Interface (GUI) 1600 displayed on management entity 110 and through which a user may identify/select, connect to, and then import network security policies from one or more network security devices. At 1605 and 1610, the user selects a type of network security device, e.g., ASA, in a "device" portion of GUI 1600 and selects a tag or label to be associated with a network security policy imported from the selected device type in a "device group" portion of the GUI. At 1615, the user enters a URL for the selected device type into a "device URL" portion of GUI 1600. At 1620, the use selects a "connect" icon to connect with the selected device type using the entered URL. At 1625, the user selects an "import" icon to import network security policies from the connected device type.

Figure 17:
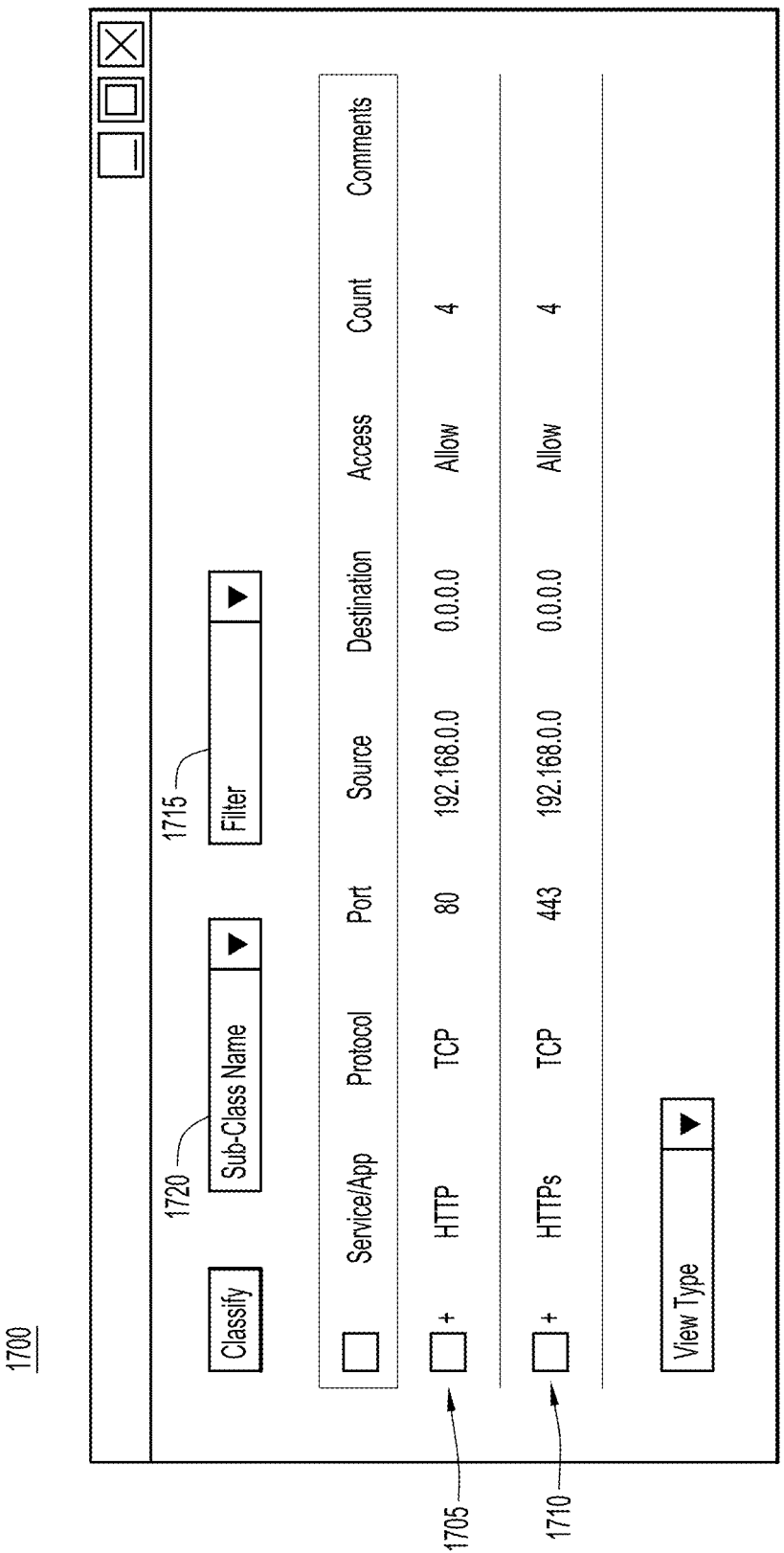
FIG. 17 is an illustration of a user interface screen that may used to initiate policy classification of imported security policies and also displaying resulting security policy classifications, according to an example embodiment.

With reference to FIG. 17, there is an illustration of an example GUI 1700 displayed by management entity 110 that may be used to initiate policy classification of imported security policies and shows resulting security policy classifications. GUI 1700 includes a "classify" icon that, when selected by a user, initiates policy classification of imported security policies by management entity 110. GUI 1700 also shows first and second example policy classifications at rows 1705 and 1710 that result from the policy classification. In the example of FIG. 17, policy classifications 1705 and 1710 each represent an identical classification, as described below.

Policy classification 1705 shows a network security rule that is formatted according to an access list (ACL) extended rule model. The ACL extended rule includes the following rule parameters: service/app (e.g., HTTP); a protocol (e.g., TCP); a port (e.g., 80); a source (address) 192.168.0.0; a destination (address) 0.0.0.0; and an access (e.g., allow). Policy classification 1705 also includes a count (e.g., 4) that indicates that 4 network security policies imported from four security devices share the indicated security rule (the ACL extended rule). In other words, policy classification 1705 represents an identical policy classification for the indicated security rule, across the 4 security policies/devices. Policy classification 1710 similarly represents an identical policy classification across four security policies/devices.

GUI 1700 includes a "filter" option/field 1715 through which the user may specify a policy/rule parameter that, once specified, causes the GUI to shows only those classified policies (e.g., rules therein) that include the specified parameter. Thus, the specified parameter operates as a filter of what classified policies (e.g., rules therein) GUI 1700 shows. In an example, the filter parameter may be HTTP, TCP, or any other parameter.

GUI 1700 also includes a "sub-class name" field/option 1720 through which the user may select and/or enter a sub-class name that is to be assigned to a combination of selected ones of the policy classifications presented by the GUI (e.g., policy classifications 1705 and 1710). This feature is described below in connection with FIGS. 27-33.

In the example of FIG. 17, GUI 1700 shows policy classifications 1705 and 1710 in unexpanded views. GUI 1700 also includes expand icons "+" associated with each of policy classifications 1705 and 1710 that, when selected, causes the GUI to expand on the associated policy classification (e.g., identical rule) to reveal identities/names of the different security devices from which the identical rules were imported, as shown in FIG. 18.

Figure 18:
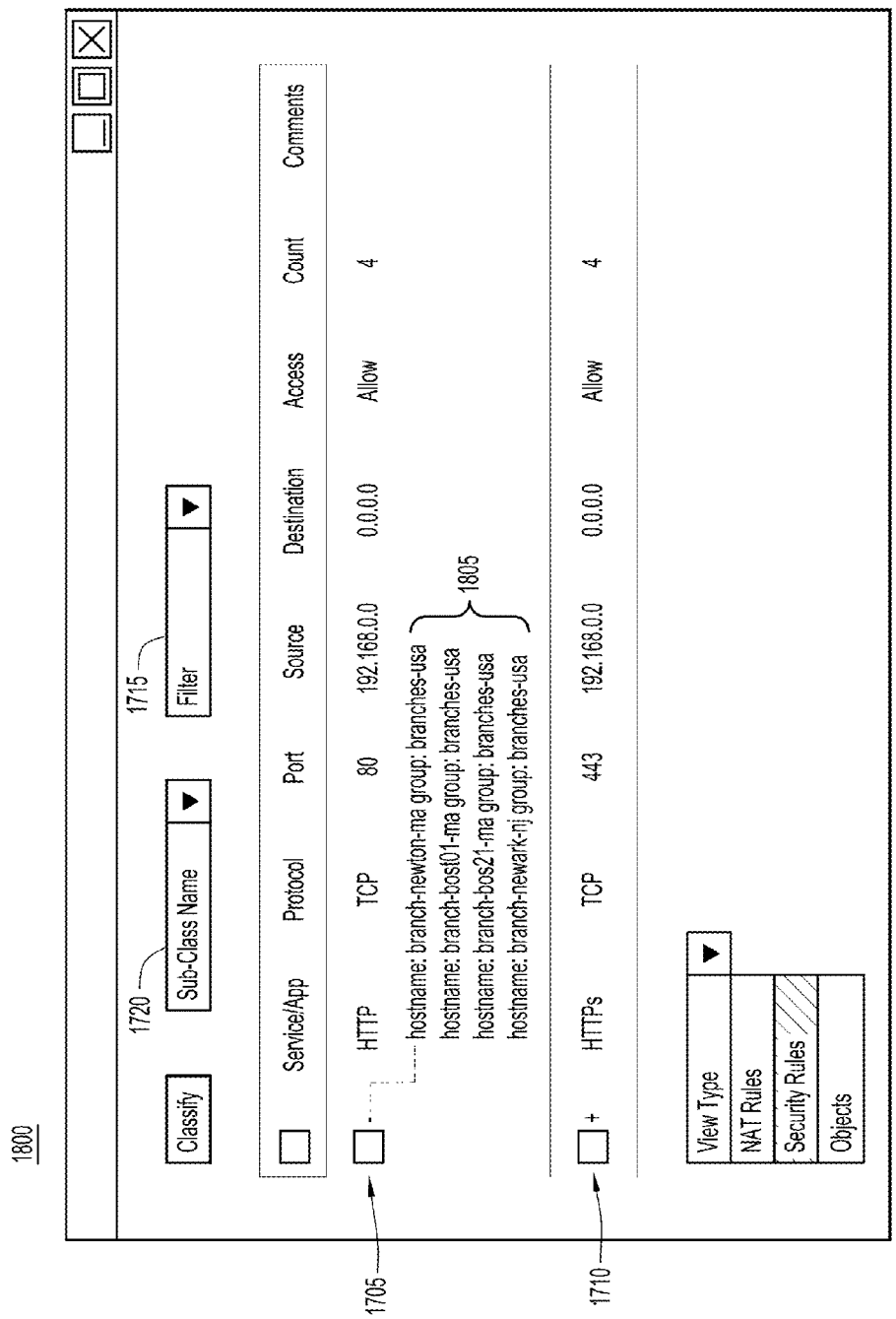
FIG. 18 is an illustration of a user interface screen that shows an expanded view of a policy classification after an expand icon associated with policy classification has been selected by a user, according to an example embodiment.

With reference to FIG. 18, there is an illustration of GUI 1700 with an expanded view 1805 after the expand icon "+" associated with policy classification 1705 has been selected. Expanded view 1805 reveals identities of 4 security devices from which the identical rules in policy classification 1705 were imported.

Returning to method 1500 of FIG. 15, management entity 110 generates identical, similar, and unique/investigate policy classifications of imported policies in operations 1518, 1520, and 1524-1532, respectively, based on comparisons between corresponding features or "points of comparison" of the imported security policies. For example, management entity 110 compares security rules from different policies against each other as a point of comparison. Management entity 110 may also compare one or more corresponding ones of the other policy features against each other, such as the configurations, interfaces, objects, and object content of the different security policies.

Each of the above mentioned security policy features (e.g., security rules, configuration, interface, object and object content.) includes local parameters, and each of the local parameters may form the basis of a point of comparison between security policies. The local parameters of the different network security features that may serve as points of comparison for similarity tests during classification are now described.

A security rule typically permits or denies network access based on, e.g., source and destination addresses, network protocols, device ports, time of day, and the like. Thus, the network security rule may include the following parameters/points of comparison: name of rule group (e.g. "inside-in" vs. "inside-out"); permit/deny; protocol (e.g., IP, TCP, UDP, ICMP); source (address) vs. source (address); destination (address) vs. destination (address); source vs. destination; device/service ports; interfaces; context (e.g. a deny rule surrounded by other deny rules); and config context (e.g. the rule appears on a branch config).

A configuration may include: a type of site at which the network policy is employed, e.g., branch or hub; a location of the site (e.g., Europe vs. Asia); a proximity to "outside," e.g., presence of an outside interface; and a number of interfaces, e.g., ports, in use.

An interface may include a security level (e.g., as an ordinal variable); a name (e.g., what beyond specific word presence e.g. inside, outside, DMZ, VLAN, and the like); an interface classification/context; and an IP address.

An object may include a name; object contents; and an object count (e.g. a group that lists 1000 specific objects).

Object content may include a percent of intersection or ratio; an amount of intersection; a size (e.g. large vs. small IP range); a ratio of covered IP ranges; a type (e.g., internal vs external IP addresses, generic range vs. specific addresses, email-related ports vs. VPN); a contained hierarchy (e.g., number of nodes); and contained nodes (how many levels down the nodes are layered).

Management entity 110 employs network security policy matching algorithms in method 1500 to determine a level of likeness or commonality between network security policies based on comparisons of the above listed feature parameters/points of comparison.

At operation 1518, management entity 110 determines different network security policies to be identical if, for example, the corresponding point(s) of comparison are identical or resolve to the same value. For example, if a point of comparison includes network security rules of the different network security policies, management entity 110 determines the network security rules to be identical if the rules represent identical strings or resolve to the same value. For example, a comparison between two firewall security rules that each follow the "source-destination-protocol-port-result" format may resolve corresponding rule parameters across the two rules to ascertain identity. Consider the following two example network security rules for an ASA formatted in an access list—extended form:

a. Access-list inside_in extended permit TCP object-group InsideNet object-group GenRec eq 8080; and
b. Access-list inside_in extended permit TCP object-group InsideNet object-group GenRec object tomcat.

The two rules above are not identical by literal string comparison, but it may be assumed that the name object "tomcat" in the second rule will resolve to "8080" and thus the first rule/string, when resolved, will be identical to the second rule/string. In an example that compares network security rules for an NGFW, the comparison may include "user" and "action" as additional rule parameters.

Figure 19:
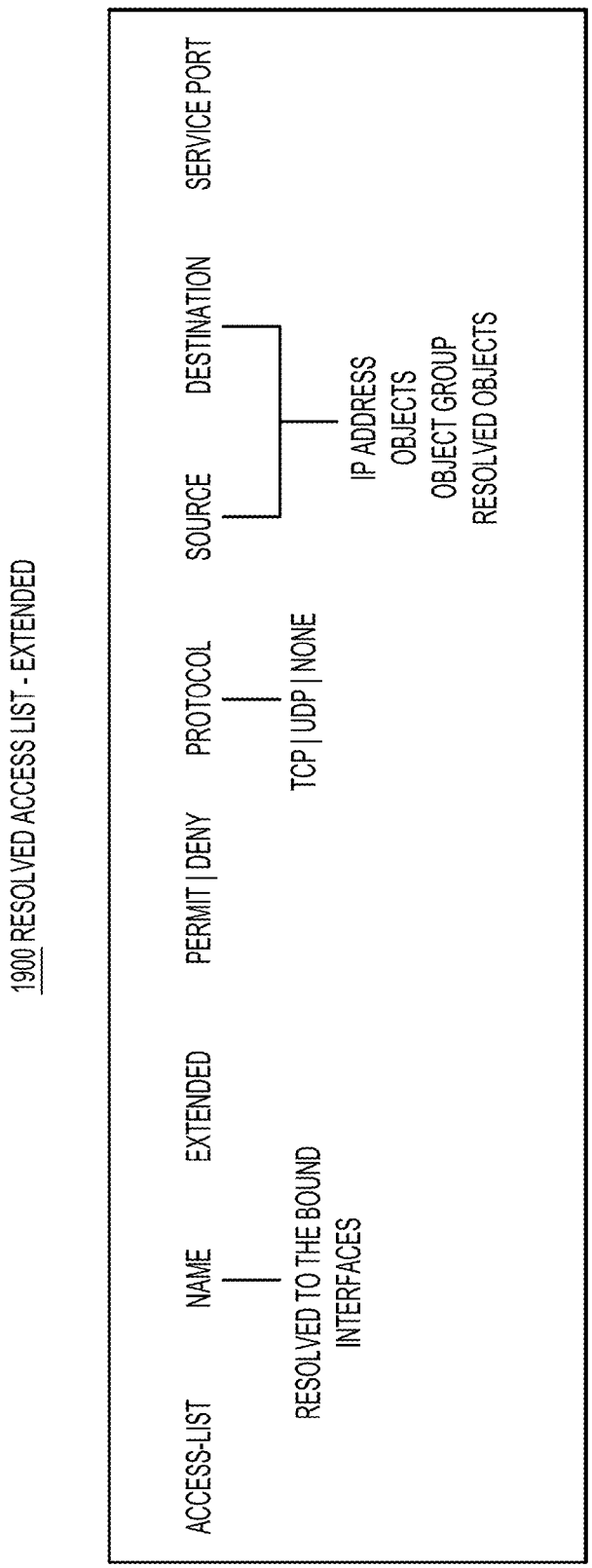
FIG. 19 is an illustration of an example access list in extended rule format in which a "name" referenced by the rule has been resolved to a bound interface, according to an example embodiment.

Thus, it is desirable to determine whether a point of comparison in the form of security rules compares rules in their resolved form, as illustrated in FIG. 19, for example. With reference to FIG. 19, there is an illustration of an example access list—extended rule 1900 in which the "name" is resolved to a bound interface.

At operations 1520 and 1524-1532, management entity 110 determines whether different network security policies are similar, unique, or need further investigation based on commonality between the policies, if any.

Figure 20A:
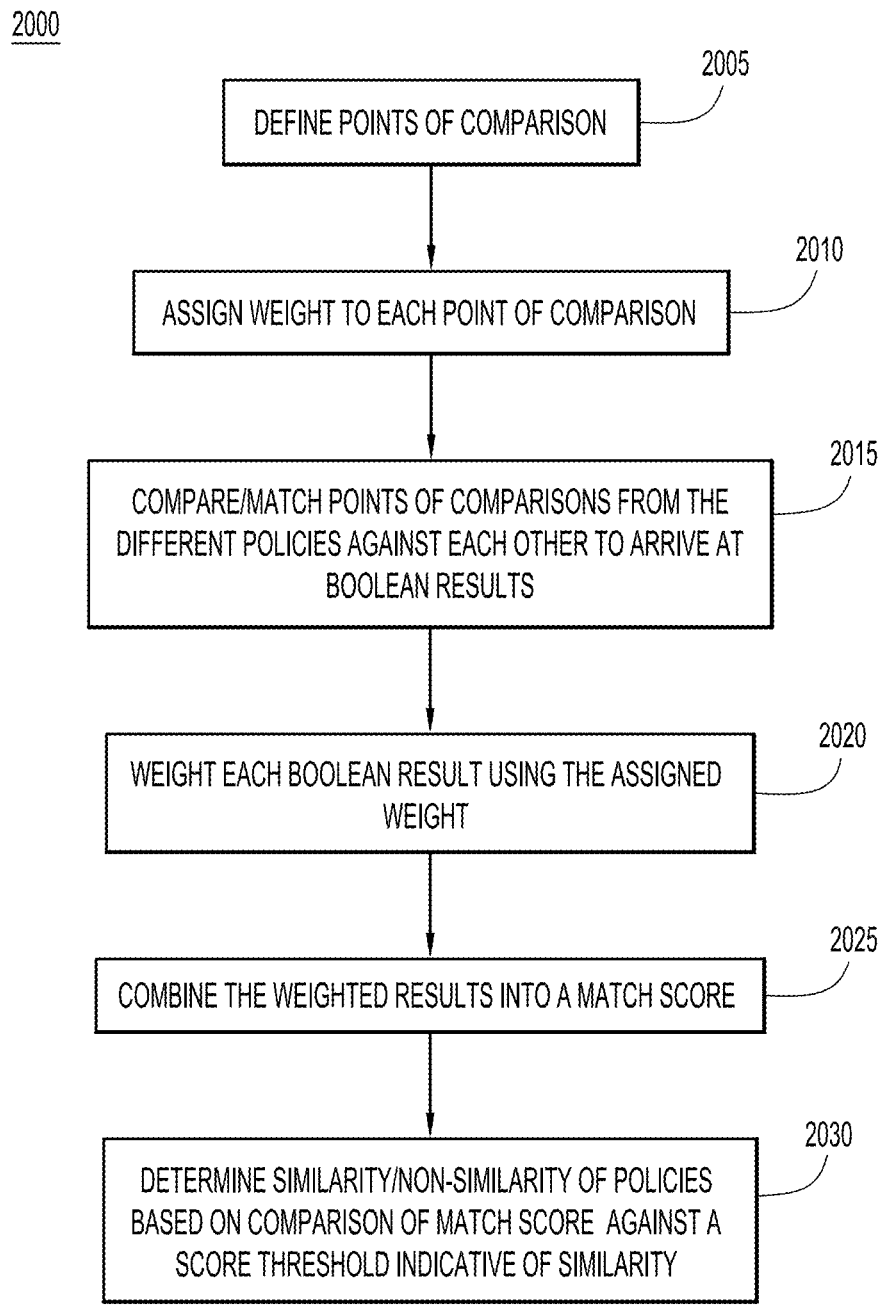
FIG. 20A is a flowchart of a method of determining commonality/similarity between different security policies based on matching points of comparison (i.e., corresponding feature parameters of the network security policies), according to an example embodiment.

With reference to FIG. 20A, there is a flowchart of an example method 2000 of determining commonality/similarity between different network security policies based on matching points of comparison (i.e., corresponding feature parameters of the network security policies). Method 2000 may be used in operations 1520 and 1524-1532.

At 2005, different points of comparison (i.e., policy feature parameters) are defined. These points of comparison will form a basis for a determination as to whether the different security policies are sufficiently similar as to be placed into the similar policy classification or sufficiently dissimilar as to be placed into the unique policy classification.

At 2010, a weight or coefficient $w_i$ is assigned to each point of comparison.

At 2015, corresponding ones of the points of comparison from different network security policies being compared are compared to each other to arrive at a Boolean result, e.g., match=1, no match=0.

At 2020, each Boolean result is multiplied by the corresponding assigned weight to produce weighted Boolean results.

At 2025, the Boolean results are combined into a match score according to a predetermined expression/equation.

At 2030, the match score is compared to a score threshold. If the compare indicates the match score is equal to or greater than the score threshold, the different network security policies are deemed similar to each other and thus classified into the similar classification. If the compare indicates the match score is below the score threshold, the different network security policies are deemed dissimilar to each other and thus classified into either the unique classification or the investigate classification.

In an example in which operation 2005 of method 2000 defines as the points of comparison various rule parameters used in the access list—extended model, operation 2025 may evaluate the following expression, in which "|match on <point of comparison>?|" defines a match/comparison test that evaluates to a Boolean result:

match score=$w_1$|match on name?|*$w_2$|match on permit/deny?|*$w_3$|match on protocol?|*$w_4$|match on source address?|*$w_5$|match on destination address?|+[$w_6$|match on service ports?|+$w_7$|match on rule context?|]

In the above equation for match score, both a multiplicative combination and an additive combination of tests results are used. The multiplicative combination is used for points of comparison deemed of higher importance, while the additive combination is used for points of comparison deemed of lower importance. Also, weights $w_i$ may be initially set to 1, but other values may be used. In addition, the score threshold may be set to 2, for example, so that if the match score evaluates to 2 or greater, the network security policies being compared are deemed similar, otherwise the policies are deemed unique.

Figure 20B:
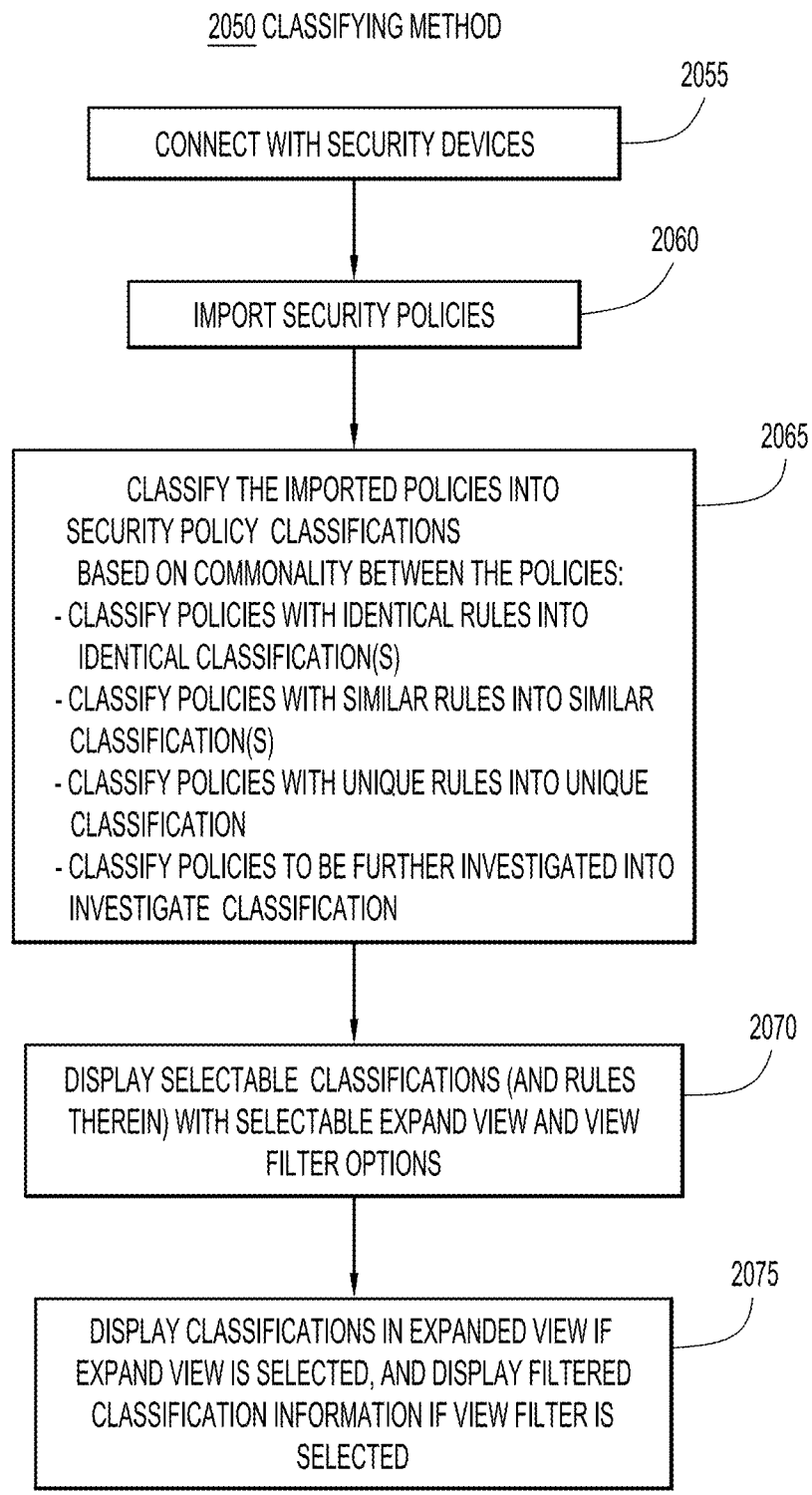
FIG. 20B is a flowchart of a high-level method of classifying security policies, according to an example embodiment.

With reference to FIG. 20B, there is a flowchart of an example summary method 2050 of classifying network security policies.

At 2055 and 2060, management entity 110 connects with and imports network security policies from network security devices 130. Each network security policy includes network security rules. Each rule includes rule parameters to cause the corresponding network security device to permit or deny network access based on a network protocol, source and destination addresses, and a device port, for example.

At 2065, management entity 110 automatically classifies the network security policies into network security policy (NSP) classifications based on commonality between the network security rules across devices 130 associated with the network security policies (see, e.g., FIG. 14). To do this, management entity 110 compares the rule parameters of each rule of each network security policy and, based on the comparison results:

a. Classifies network security policies into one or more identical NSP classifications if all of their associated rule parameters are identical to each other;
b. Classifies network security policies into one or more similar NSP classifications if only some of their associated rule parameters are equivalent to each other;
c. Classifies network security policies into a unique NSP classification if none of the associated rule parameters are equivalent to each other; and
d. Classifies network security policies into an investigate classification if the policies require further investigation.

At 2070, management entity 110 displays selectable ones of the NSP classifications, including network security rules therein, along with selectable expand view and view filter options (see, e.g., FIG. 17).

At 2075, management entity 110 displays NSP classifications in an expanded view if a selection of the expand view is received. Also, management entity 110 displays filtered NSP classifications (and rules therein) if "filter on" parameters are received through the view filter option (see, e.g., FIG. 18).

Security Policy Unification

Embodiments directed to normalizing imported rules are now described in the context of security policies for illustrative purposes. As used herein, the terms "normalize" and "unify" and their corresponding derivatives (e.g., normalization and unification) are synonymous and may be used interchangeably.

Referring again to FIG. 1 (and FIGS. 3-8), management entity 110 imports different security policies from different types of security devices over a network, as described above. Each imported security policy is considered to be "native" to the security device from which the policy is imported in that the policy is based on a native policy model associated with that security device. Each of the security devices controls network access by devices associated therewith according to the corresponding native network security policy.

Management entity 110 normalizes the imported native security policies across security devices based on a generic policy model, to produce a normalized network security policy generally representative of all of the native network security polices. Management entity 110 may also modify the normalized security policy to suit further generalized security goals, translate the modified normalized security policy to corresponding native security policies representative of the modified normalized policy, and then push the resulting native policies to corresponding ones of security devices. In addition, a normalized policy may be created by a user, automatically translated to suitable native policies, and pushed to multiple security devices (e.g., devices 130). A normalized network security policy is also referred to herein as a 'generic" or "unified" policy network security policy.

As mentioned above, management entity 110 normalizes native security policies that are based on corresponding native policy models to a generic security policy that is based on a generic policy model. In one embodiment, the generic policy model, referred to as the Principal-Action-Resource-Context-Result (PARCR) model, is defined as follows:

If {principal} tries to perform an {action} on {resource} within {context} then {result}.

Figure 21:
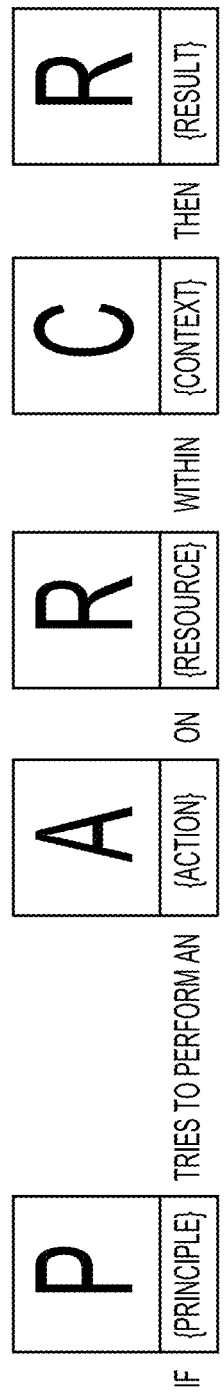
FIG. 21 illustrates a depiction of a security policy model that follows an "if {Principal} tries to perform an {Action} on {Resource} within {Context} then {Result}" format, referred to herein as a "PARCR" model, according to an example embodiment.

With reference to FIG. 21, there is an illustration of a PARCR model 2100 (also referred to as a "PARCR policy model"). The PARCR model 2100 includes basic PARCR model components, i.e., principal (P), action (A), resource (R), context (C), and result (R), expressed in the "if-then-result" syntax. A normalized or generic network security policy based on the PARCR model 2100 includes generic security rules based on the PARCR model. The generic security rules include the PARCR model components (referred to as PARCR "rule components") expressed in the if-then-result syntax. Thus, normalizing a native security policy includes mapping native features such as native security rules (and their respective rule parameters) expressed according to the native policy model to corresponding PARCR rule components expressed in the PARCR model syntax (i.e., the if-then-result form).

The examples below show mappings between native security policies and normalized or generic network security policies based on the PARCR model 2100, at the rule level. In other words, in the examples, the native rule parameters of native security rules are mapped to corresponding PARCR rule components.

Example 1 a. Simple ASA Rule (in access list—extended form):
   Access-list left-to-right extended permit ip host 172.16.1.10 host 192.168.1.100; and
b. PARCR Rule Components and Rule:
   Principal=172.16.1.10 (source)
   Resource=192.168.1.100 (destination)
   Context=ip (protocol)
   Result=permit
   Action=implied anything
   if 172.16.1.10 tries to perform anything on 192.168.1.100 within ip then permit.

Example 2 a. More Complex ASA Rule:
   Access-list someName extended permit tcp 172.19.103.0 255.255.255.0 object-group ApplicationServers object-group DM_INLINE_TCP_443; and
b. PARCR Rule Components and Rule:
   Principal=address range 172.19.103.x
   Resource=ApplicationServers (group of resources)
   Context=tcp+port group DM_INLINE_TCP_443
   Result=permit
   Action=implied anything
   if 172.19.103.x tries to perform anything on Application-Servers within tcp and DM_INLINE_TCP443 then permit.

Example 3 a. Simple WSA Rule:
   Block all users from using facebook messaging; and
b. PARCR Rule Component and Rule:
   Principal=all users (anyone)
   Resource=facebook messaging
   Context=any
   Result=block
   Action=any
   if anyone tries to perform anything on facebook messaging within any then block.

Example 4 a. More Complex WSA Rule:
   Allow all users to use Linkedin but only allow HR to post jobs on Linkedin, allow all users to use Linkedin; and
b. PARCR Rule Components and Rule:
   Principal=address range 172.19.103.x
   Resource=ApplicationServers (group of resources)
   Context=tcp+port group DM_INLINE_TCP_443
   Result=permit
   Action=implied anything
   if 172.19.103.x tries to perform anything on Application-Servers within tcp and DM_INLINE_TCP443 then permit.

Example 5 a. Simple WSA Rule:
   Block all users from using facebook messaging; and
b. PARCR Rule Components and Rule:
   Principal=all users (anyone)
   Resource=facebook messaging
   Context=any
   Result=block
   Action=any
   if anyone tries to perform anything on facebook messaging within any then block.

Figure 22:
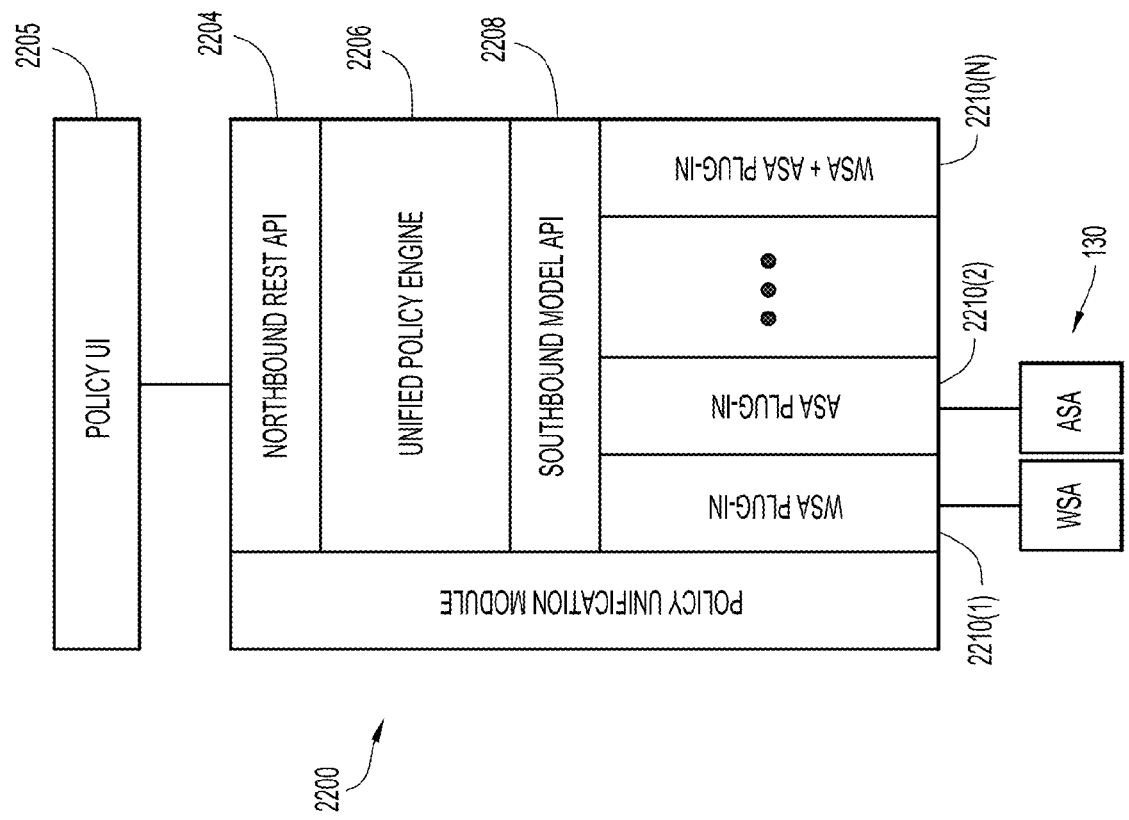
FIG. 22 is a block diagram of a policy unification module that may be implemented in the management entity to convert or map between native security policies expressed according to native policy models and normalized or generic policies expressed according to the PARCR model, according to an example embodiment.

With reference to FIG. 22, there is a block diagram of an example policy unification module 2200 that may be implemented in management entity 110 to convert or map between the native network security policies expressed according to native policy models and normalized or generic policies expressed according to the PARCR model (e.g., PARCR model 2100). Module 2200 includes a Northbound Application Programming Interface (API) 2204 (which may be a Representational State Transfer (REST) API) that interfaces with a policy user interface (UI) 2205, a unified policy engine 2206, a Southbound model API 2208, and multiple, network security device specific, network security device plug-ins 2210(1)-2210(N) that interface to corresponding ones of network security devices 130.

Northbound API 2204 allows services or applications such a generalized network security UI or a policy orchestrator (e.g., policy UI 2205) to communicate with unified policy engine 2206. API 2204 allows such services/applications to perform operations such as move policy from one network security device (e.g., one of devices 130) to another or perform operations that traverse the devices and that require policies in more than one network security device type. One example is to block all IP addresses from a geo-location. Another example is to set up access blocking based on the IP being used in the access and a service such as (Secure Shell) SSH over HTTP.

Southbound model API 2208 perform actions on a network security device specific (i.e., native) network security policy. API 2208 receives native network security policies and rules imported via corresponding plug-ins 2210 (from the corresponding network security devices). API 2208 also pushes native network security policies down to network security devices 130 via the corresponding plug-ins 2208. API 2210 may also perform some of the mapping or translating between imported native network security policies and normalized/generic network security policies as mentioned above.

Device plug-ins 2210 read and write network security policy information directly from and to network security devices 130 (e.g. WSAs). Plug-ins 2210 may also include portions of mapping logic to assist with translating native network security policies into the generic/normalized network security policy format. In an example, WSA network access policy rules would define "Block, Monitor, Allow, Warn" as the rule actions. Other WSA network access policy rules, such as WSA time definitions (e.g. "Core Business hours") may be mapped to the "{context}" generic rule component.

Policy engine 2206 may implement a policy object model layer to tie network security device specific policies (i.e., native policies) into the generic policy model, e.g., the PARCR model. This may be implemented as a JavaScript Object Notation (JSON) file that ties generic network security policy and rule components/objects (e.g. principal, context, action) to Java classes that can enumerate the supported components/objects and validate the generic network security rules. The policy object model layer may also allow network security device plug-ins 2210 to attach network security device specific attributes to object definitions. For example, WSA plug-in 2210(1) may indicate that there is an immutable Boolean on the policy called "Is Global Policy" and a mutable integer called "Policy Order," whose legal values are between n and m. In another embodiment, the policy object model layer may be implemented in Southbound model API 2208.

In an embodiment, aggregated plug-ins may be used in an environment in which policies are to be defined to cross network security devices. For example, a policy definition may require sub-policies in an ASA and a WSA. Such policies may be defined by higher level plug-ins, which, instead of talking to network security device plug-ins directly, would talk to network security device plug-ins and build policies on top of the generic policy definitions exposed by the device plug-ins.

Figure 23:
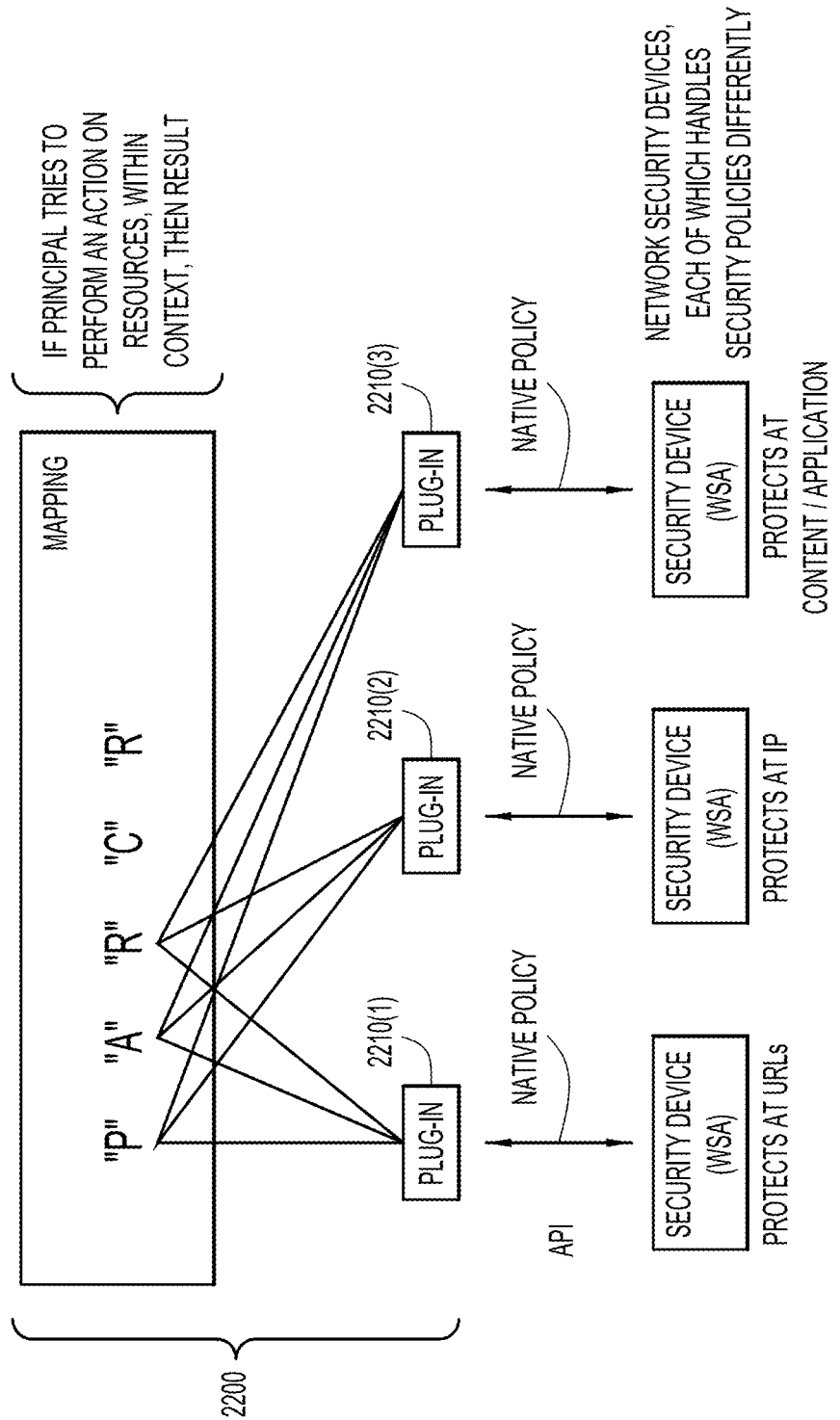
FIG. 23 is an illustration of a PARCR mapping performed in part by security device plug-ins of the policy unification module, according to an example embodiment.

With reference to FIG. 23, there is an illustration of example PARCR mapping 2300 performed in part by plug-ins 2210 of policy unification module 2200. According to mapping 2300, native ASA policies including corresponding native rule parameters which protect based IP protocols, native WSA policies including corresponding native rule parameters which protect based on URLs, and native firewall policies including corresponding native rule parameters which protect based on content/applications are each mapped to corresponding generic rule components of the same generic policy model, i.e., the PARCR model.

Figure 24:
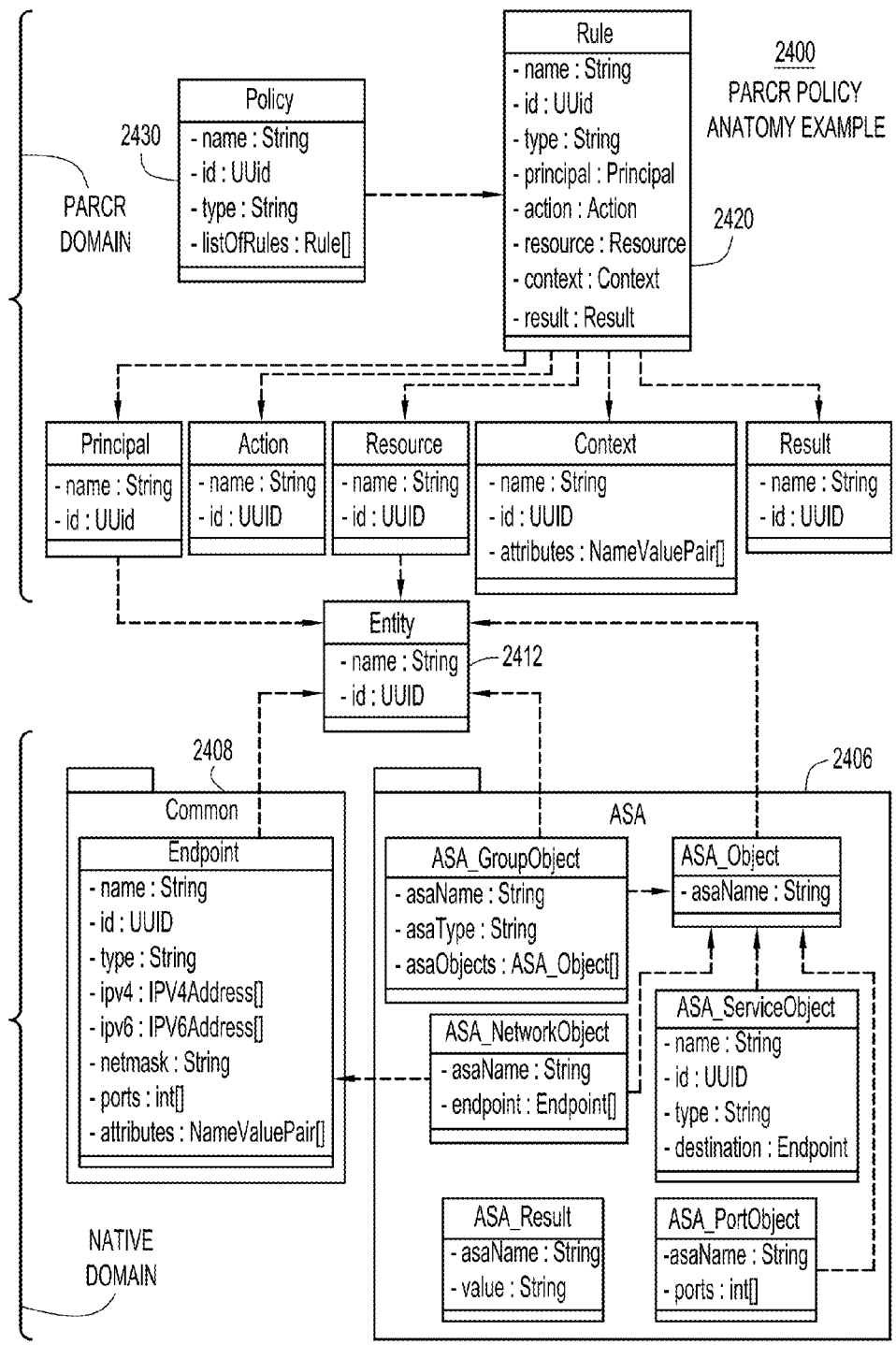
FIG. 24 is an illustration of a PARCR policy model anatomy, according to an example embodiment.

With reference to FIG. 24, there is an illustration of an example PARCR model anatomy or break down 2400 (referred to as "policy anatomy"). The example of FIG. 24 represents one possible data model corresponding to an ASA plug-in. It is understood that partitioning between objects in the anatomy may be varied and that other policy anatomies for other data models are possible. The PARCR policy anatomy is based on the following assumptions:

a. Policies are groups of rules;
b. All rules are if/then statements (see (c));
c. If {principal} attempts to perform {action} on {resource} when {context} then {result};
d. A policy is high level statement;
e. A policy contains a set of rules;
f. A rule is a mid-level statement;
g. An entity is an object to describe a person or thing, and may map to principal or resource rule components of the PARCR model;
h. Entities contain multiple attributes;
i. Attributes are static or dynamic states of an entity;
j. Context contains environmental attributes external to entities;
k. A result is a set of obligations to be performed if the conditions are met; and
l. Obligations can be just about any process including simple allow or deny, logging, or complex code launching.

Going from bottom-to-top in FIG. 24, policy anatomy 2400 depicts a mapping of predefined native policy/rule objects in the native domain (bottom of FIG. 24) to PARCR rule components in the PARCR domain (top of FIG. 24). In the native domain, an ASA construct 2406 (for an ASA device) operates on a variety of objects depicted as boxes inside the box ASA 2406. The ASA (construct) 2406 may be implemented in ASA plug-in 2210(2), for example. Each of the objects depicted in ASA 2406 represents a definition of something that the ASA may control. For example: the ASA_GroupObject may define a range of IP addresses protected by firewall 2406, or a group of other objects; the ASA_Object may define or point to all of the other objects defined in the ASA; the ASA_ServiceObject may be a combination of a IP addresses, a service/device port, and a protocol; the ASA_NetworkObject may be an endpoint; and the ASA_Result includes a permit or deny.

Common object 2408 is also depicted in the native domain. Common object 2408 is common across multiple security device plug-ins 2210, and may include, for example, objects similar to any of the example objects described above in connection with ASA 2406.

As depicted in policy anatomy 2400, various objects in the native domain may represent an entity 2412 accessible to the PARCR model. Entity 2412 maps to either or both the principal and the resource rule components of the PARCR model, as depicted in FIG. 24. Each of the PARCR rule components depicted in FIG. 24 as boxes labeled principal, action, resource, context, and result includes a name represented as a string, and a universally unique identifier (UUID).

Also as depicted in policy anatomy 2400, the PARCR rule components are combined into a generic/PARCR rule 2420 according to the if-then-result syntax. Generic rule 2420 forms part of a generic network security policy 2430.

The following example shows a mapping between a native network security policy expressed in terms of predefined objects and a generic network security policy based on the PARCR model:

a. ASA Acl-List Using Above Object Model:
  Access-list executive_access_to_finance extended permit ip object-group Executive_Network object-group Finance_Network
b. PARCR Rule Components:
  Principal=ASA_GroupObject named Executive_Network (see definition below)
  Action=any
  Resource=ASA_GroupObject named Finance_Network (see below)
  Context=Context object with namevalue type:ip
  Result=ASA_Result with value "permit"
  ASAGroupObject.name=Executive_Network
  ASAGroupObject.asaObjects={ASA_NetworkObject.endpoint, . . . }.

In normalizing native security policies (based on native policy models) to generic security policies (based on a common generic policy model) as described above, it is desirable to "bridge" between the generic (e.g., PARCR) and native (e.g., WSA) models through corresponding data elements associated with the native and generic policies (as opposed to code). Accordingly, a policy data-driven "policy model bridge" that describes or defines native policies in terms of the PARCR model may be used to map the native policies to PARCR rule components. As described above in connection with policy anatomy 2400, objects that are not strictly security policies but are referenced by the policies are modeled as entities. An example policy model bridge is described below in connection with FIG. 25.

With reference to FIG. 25, there is shown an example of a policy model bridge 2500 that may be used to map a simplified WSA access policy to the PARCR model. Other policy model bridges may be used corresponding to other security devices. Policy model bridge 2500 may also map native entity objects directed time ranges over which a native rule is to be active and URLs that may need to be blocked or allowed to corresponding PARCR rule components. In the example of FIG. 25, policy model bridge 2500 operates to perform the WSA to PARCR rule mapping shown above in Example 1. In that example, policy model bridge 2500 may be implemented as a JSON file that represents a contract between the PARCR model and WSA plug-in 2210(1), and may be implemented in the WSA plug-in.

Policy model bridge 2500 (referred to as simply "bridge 2500") includes a "header" 2505 that provides basic information about the corresponding plug-in. Header 2505 indicates a name of bridge 2500 (e.g., "WSA"), which is unique across all plug-ins 2210. Header 2505 also includes a version (e.g., "1") to indicate a schema of the policy bridge JSON file being used. Header 2505 includes a service definition that indicates an actual implementation of the service as well as a mock implementation. Running a mock implementation simplifies, for example, automated testing of generic policy UI 2205. The exposed service retrieves concrete instances of native policies and entities.

After header 2505, bridge 2500 includes "policies" 2510, which enumerates substantially all of the policies supported by the bridge 2500. Different types of network security devices, such as the WSA, will typically expose network security policies of many different types. Some of these network security policies may be complex and may take advantage of many of the features available in the PARCR model, while other policies may be very simplistic. Policies 2510 define the following:

a. "Type"—The type of a policy may be unique within the JSON file. Each plug-in can expose multiple policies, which are differentiated by type.
b. "Preferences"—A set of generic preferences that govern the behavior of the policy. For example, "readonly" would be used to indicate that the policy can only be read and cannot be modified.
c. "Rule mapper"—This object expresses native policy rules in the PARCR model by mapping native objects (e.g., native rule parameters) to the {principal}, {action}, {resource}, {context}, and {result} components of a PARCR rule. Not all of the PARCR components will be applicable to all native rules. It is therefore legal to omit PARCR rule components to indicate that they aren't used by the underlying device.

Bridge 2500 also describes what types of entities 2515 can be referenced inside of network security policies. In other words, the network security policy is a set of rules composed of references to external entities. Sometimes the types of these entities will be defined within a namespace (e.g. plug-in), which means the entity is specific to the native device. For example, if WSAs have the notion of URL categories, but other devices do not, it makes sense to the URL category entity to be scoped to the WSA plug-in. In other cases an entity may be something much more generic and may apply across multiple devices. For example, a principal definition that indicates a user was authenticated by Active Directory may be applicable to WSA and a particular type of firewall and therefore might be defined in a non device-specific plug-in. Thus, a policy model bridge, such as bridge 2500, may include a reference mechanism or section used to refer to types within the current namespace and within other namespaces. An example reference section is provided below:

Namespace": "identity",
"Type": "ACTIVE_DIRECTORY_AUTHENTICATED"

In entities 2515, bridge 2500 includes a "URL Category" entity that is expressed through a list of resources. Two types of resources are accepted. A user may pick a type and enter a free form string. Then, depending on type, the string would be validated using one of two validators—the first ensures a string is a valid URL and the second that the string is a valid regular expression. As the user enters the string, policy UI 2205 may call the validators and give a visual indication if the string is incorrect. Types that start with a hash ('#') are build-in types.

In entities 2515, bridge 2500 also includes a time range entity, which indicates a time range to be mapped to the resources rule component of PARCR. For example, a WSA policy may express two custom time ranges. The first one is "Extended Business Hours" and is defined as being Monday through Friday 7 am to 6 pm and Saturday 10 am to 4 pm. The second one is "Core Business Hours" and is defined as being Monday through Friday 10 am to 2 pm. Bridge 2500 maps such time ranges into the PARCR rule.

A policy model bridge, such as bridge 2500, may also include an access policy action, which is a simple entity that does not include any components. A "hidden" flag may be used to indicate that this entity is not exposed to an end user as a first class object and that it can only be referenced in the context of policy definitions. Enumerating this entity class would return three instances, for example, "Block", "Monitor", and "Warn."

Figure 26:
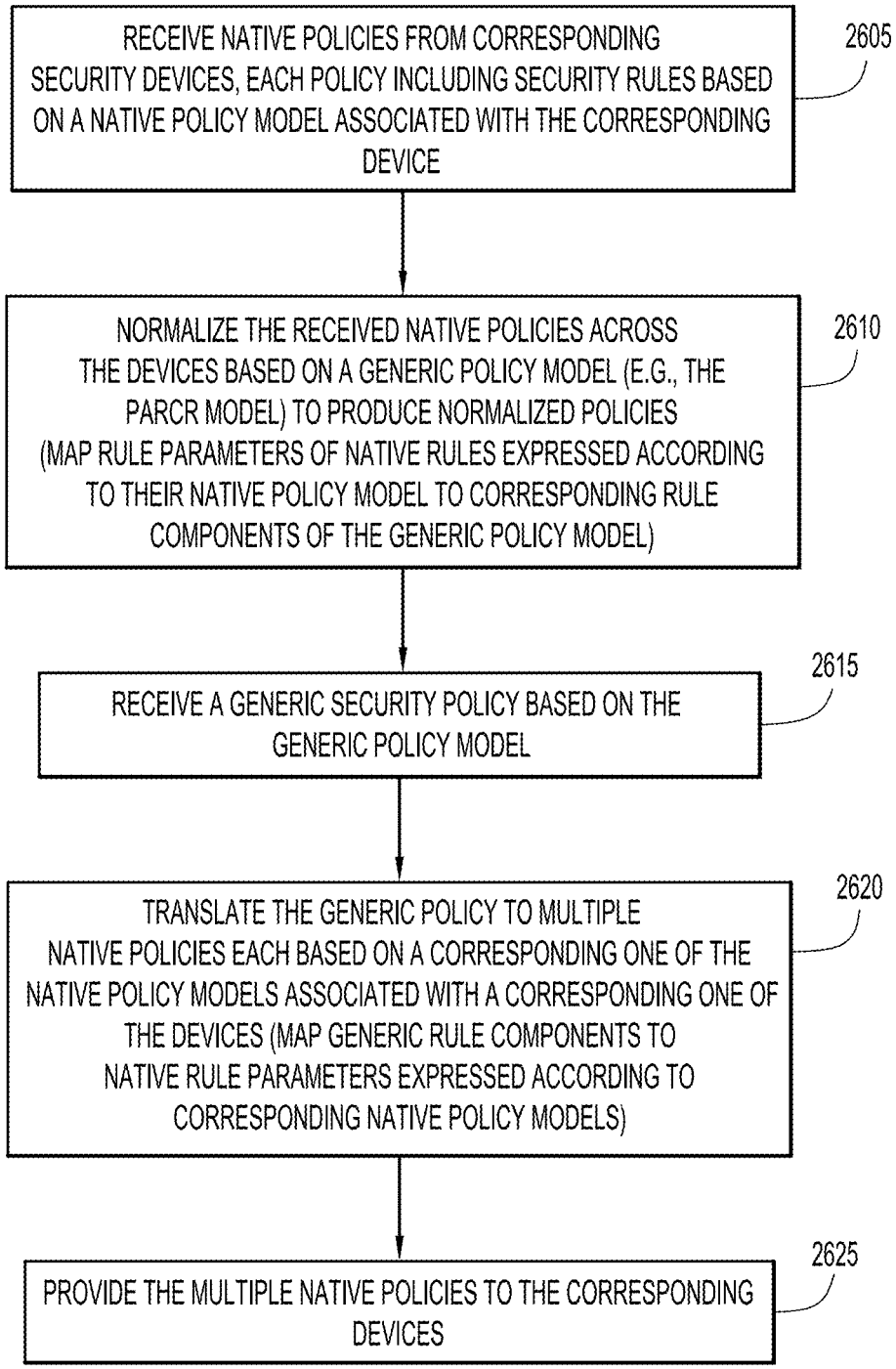
FIG. 26 is a flowchart of a method of converting between normalized security policies based on the PARCR model and native security policies based on native security policy models, according to an example embodiment.

With reference to FIG. 26, there is shown a flowchart of an example method 2600 of converting between normalized network security policies and native network security policies as described above. Reference can be made to FIG. 1 in connection with the description of FIG. 26.

At 2605, management entity 110 receives from security devices corresponding native security policies each based on a native policy model associated with the corresponding network security device. Each of the security devices controls access to resources by other devices according to the corresponding native security policy. Each native network security policy includes a set of one or more native network security rules, each native network security rule including native rule parameters expressed according to the corresponding native policy model.

At 2610, management entity 110 normalizes the received native network security policies across the network security devices based on a generic policy model (e.g., the PARCR model), to produce normalized network security policies that are based on the generic policy model and representative of the native network security polices. To do this, for each received native network security policy, management entity 110 maps the native rule parameters expressed according to the corresponding native policy model to corresponding generic rule components of the generic policy model to form a generic security rule. For example, management entity 110 maps the native rule parameters to PARCR rule components according to the PARCR model in the form: if {principal} tries to perform an {action} on {resource} within {context} then {result}, to generate the generic rule.

At 2615, management entity 110 receives a generic security policy (e.g., PARCR rules) based on the generic policy model (e.g. the PARCR model).

At 2620, management entity 110 translates the generic security policy to multiple native security policies each based on a corresponding one of the native policy models associated with the corresponding one of the network security devices. To do this, management entity 110 maps the generic rule components to native rule parameters expressed according to the corresponding native policy model to form native rules representative of the one or more generic network rules.

At 2625, management entity 110 provides the multiple native security policies to the corresponding security devices to enable the security devices to implement the native security policies.

Security Policy Template Creation and Deployment

As discussed above in connection with FIGS. 14-20B, management entity 110 classifies security policies into identical, similar, unique, and investigate NSP classifications as appropriate, and displays selectable ones of the NSP classifications (and their corresponding rules) on a GUI. For example, with reference again to FIG. 17, GUI 1700 displays two selectable NSP classifications 1705 and 1710, each which groups together identical network security policies/rules. According to embodiments presented below, a user may interact with management entity 110 to create a security policy template that combines multiple selected ones of the displayed NSP classifications (and their corresponding network security rules). The user may then build a new security policy based on at least that security policy template, and commit that new network policy to a security device, which may reside in a new site at which the user wishes to control access to a resource.

The process of creating and using a security policy template is described below in connection with FIGS. 27-33. Reference is also made to FIG. 1 for purpose of these descriptions.

Figure 27:
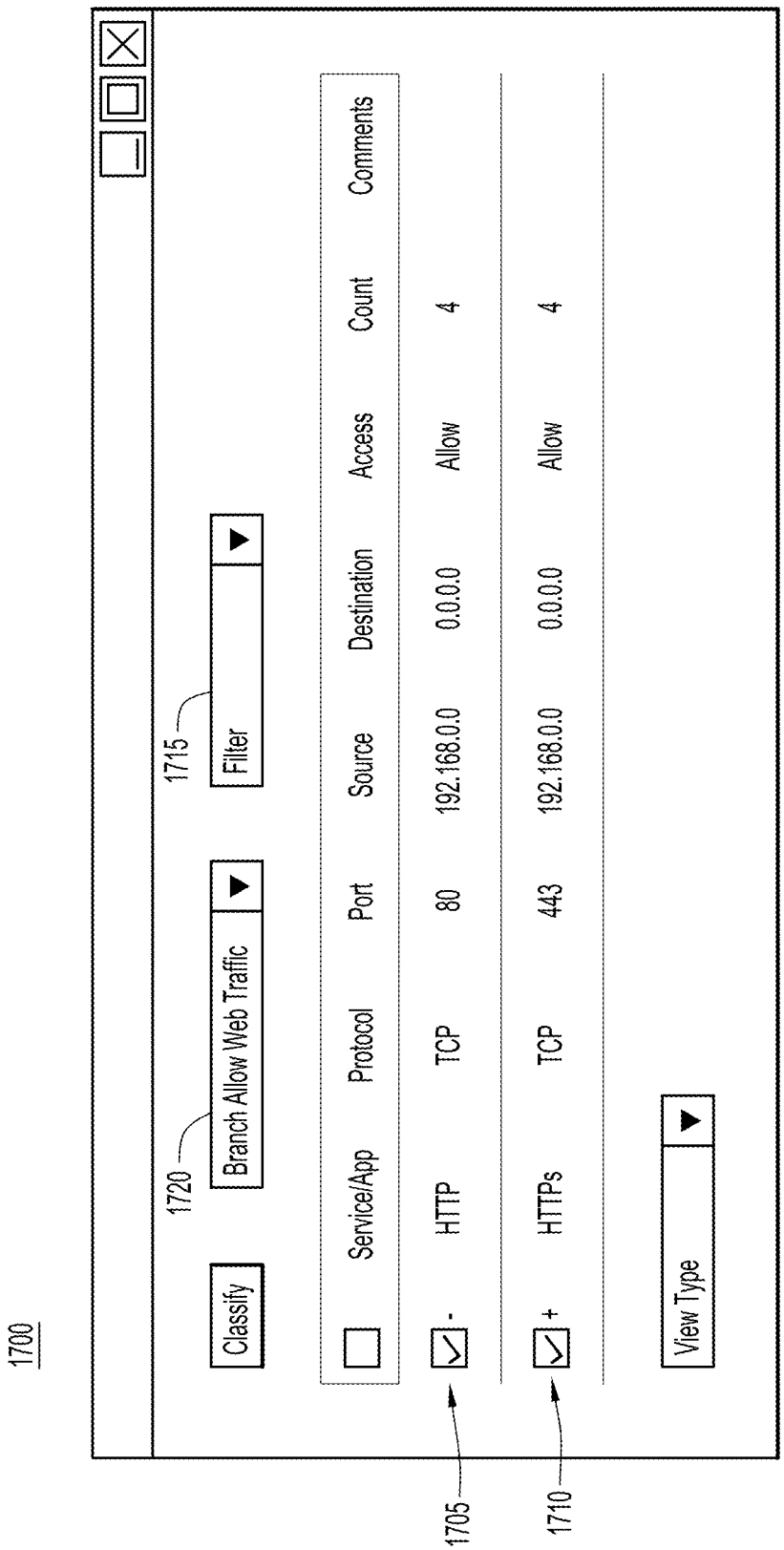
FIG. 27 is an illustration of a user interface screen displayed by the management entity and through which the user has entered a policy sub-class name "Branch Allow Web Traffic" into a sub-class name field/option, and which also allows for selection of identical network security policy (NSP) classifications, according to an example embodiment.

With reference to FIG. 27, there is an illustration of GUI 1700 in which the user has entered a policy sub-class name "Branch Allow Web Traffic" into sub-class name field/option 1720, and selected both of identical NSP classifications 1705 and 1710. In response, management entity 110 assigns the combination of selected NSP classifications 1705 and 1710 and the rules contained in those NSP classifications to the policy sub-class "Branch Allow Web Traffic." These actions create the policy sub-class "Branch Allow Web Traffic" that combines all of the network policy rules of NSP classification 1705 and 1710, and stores the policy sub-class with other previously created and stored policy sub-classes. A security policy template may be conveniently created based on all of the previously created and stored policy sub-classes (which essentially represent policy sub-templates), as will be described below in connection with FIG. 28. In another embodiment, policy sub-class field 1720 may be replaced with a policy template option/field through which the user enters or selects a policy template name, in which case the above described creation process directly results in the creation of a policy template, i.e., the process of creating policy sub-classes is skipped.

Figure 28:
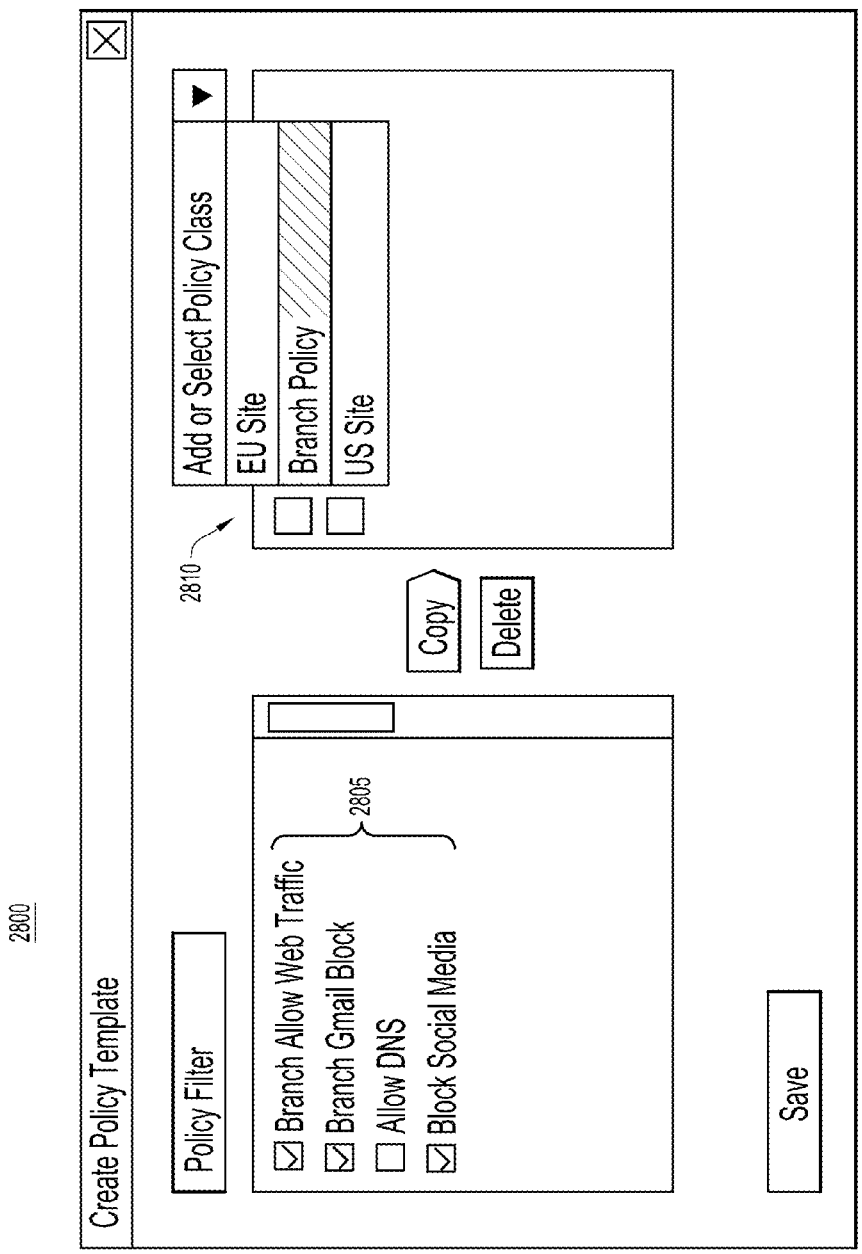
FIG. 28 is an illustration of a user interface screen that may be used to create a security policy template (referred to as a "policy template") based on previously created policy sub-classes or sub-templates, according to an example embodiment.

With reference to FIG. 28, there is an illustration of a GUI 2800 displayed by management entity 110 and that may be used to create a security policy template (referred to simply as a policy template) based on previously created policy sub-classes or sub-templates. GUI 2800 displays selectable previously created policy sub-classes 2805 in a sub-class display box. In the example of FIG. 28, GUI 2800 displays policy sub-class "Branch Allow Web traffic" created previously in the manner described above in connection with FIG. 27, along with other previously created policy sub-classes "Branch Gmail Block," "Allow DNS," and "Block Social Media." Each of policy sub-classes 2805 contains combined NSP classifications (and the rules therein). In the example of FIG. 28, the user has selected three of the previously created policy sub-classes, e.g., "Branch Allow Web traffic," "Branch Gmail Block," and "Block Social Media."

GUI 2800 also displays a policy template field/option 2810 through which a user may either select an existing policy template name through a drop down menu or add/ enter a new policy template name. In the example of FIG. 28, the user has selected/entered "Branch Policy" as a policy template name to which the three selected policy sub-classes are to be assigned. In response, management entity 110 assigns the three selected policy sub-classes to the policy template name "Branch Policy." These action creates a new policy template named "Branch Policy" that combines all of the network security policies (and rules) of the three selected policy sub-classes. The new policy template "Branch Policy" may be conveniently used to commit new security policies similar to previous security policies (i.e., the security policies in the policy template "Branch Policy") to security devices in a new deployment site to be managed by management entity 110, as will be described below in connection with FIG. 29-32.

Figure 29:
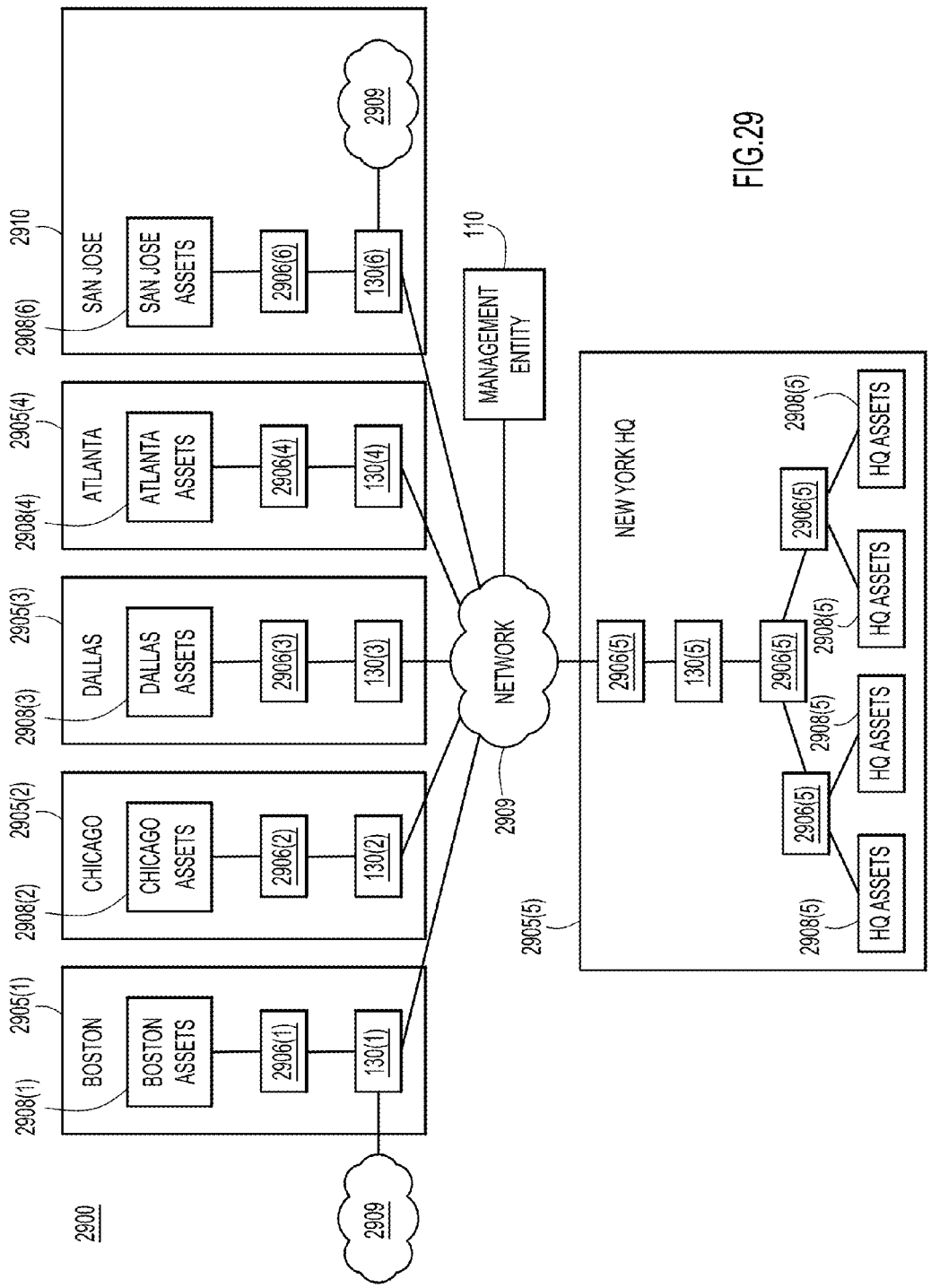
FIG. 29 is an illustration of a network environment including existing geographically distributed data centers or branch sites (referred to as "branches") operating under control of the management entity, according to an example embodiment.

With reference to FIG. 29, there is an illustration of an example network environment 2900 including existing geographically distributed data centers or branch sites 2905(1)-

2905(5) (referred to simply as "branches") operating under control of management entity 110. Management entity 110 has previously deployed similar security policies across all of existing branches 2905.

Each of branches 2905(1)-2905(5) includes corresponding switches 2906(1)-2906(5) connecting corresponding assets 2908(1)-2908(5) (e.g., Boston Assets, Chicago Assets, Dallas Assets, Atlanta Assets, and Headquarter (HQ) assets) to corresponding ones of network security devices 130(1)-130(5). Each security device 130(i) controls access to and between corresponding assets 2908(i) and other resources in the corresponding branch 2905(i), and access to and from a network 2909, such as the Internet.

A geographically distributed new branch 2910 ("San Jose") needs to be added to existing branches 2905 and needs to operate under network security policies similar to those deployed to the existing branches 2905. Similar to existing branches 2905, new branch 2910 includes a corresponding switch 2906(6) and a corresponding security device 130(6) to control access to and between corresponding assets 2908(6) and other resources based on security policies available to the security device 130(6). As described below, management entity 110 may use policy templates to deploy the existing similar network security policies already in place and used across branches 2905 to security device 130(6) in new branch 2910.

Figure 30:
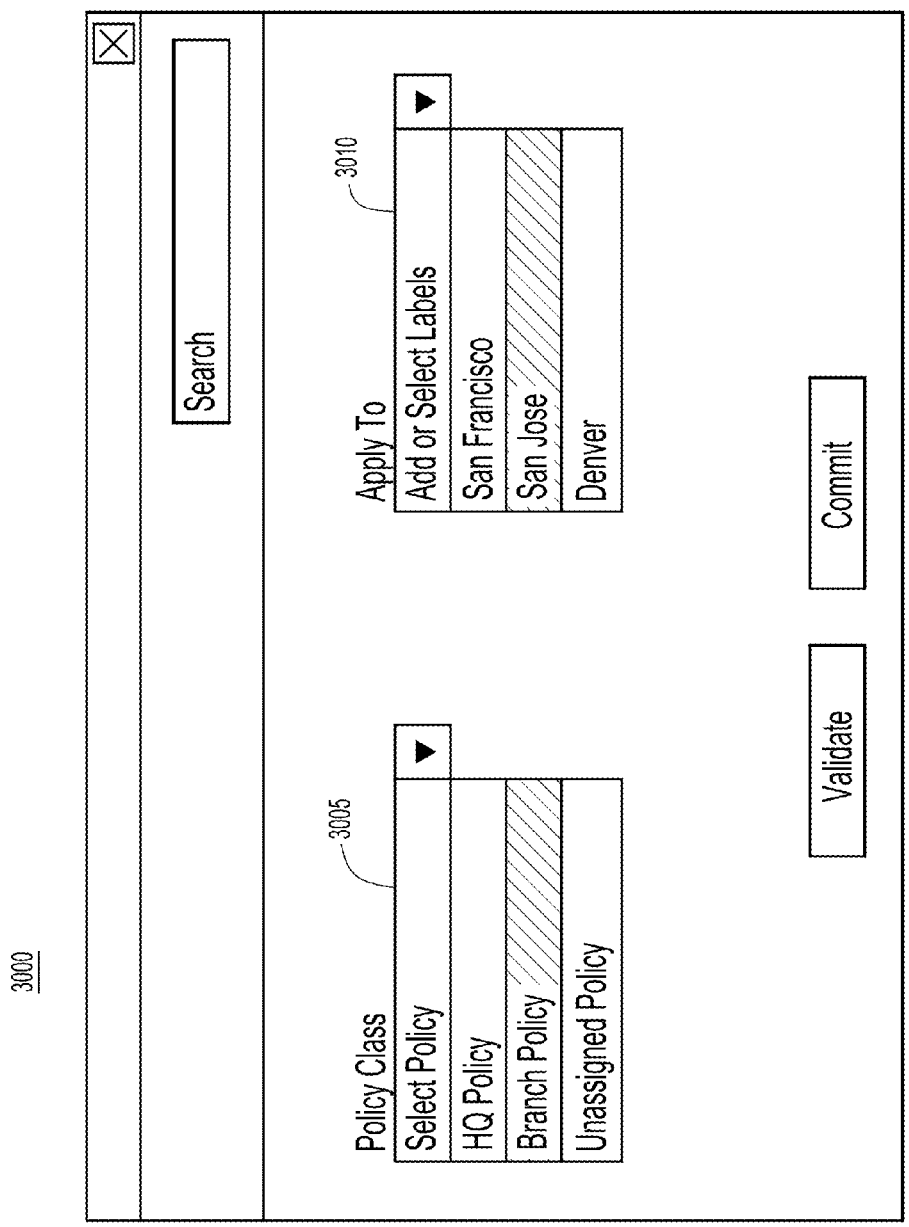
FIG. 30 is an illustration of a user interface screen displayed by the management entity that may be used to create a new security policy based on one or more previously created policy templates, according to an example embodiment.

With reference to FIG. 30, there is an illustration of a GUI 3000 displayed by management entity 110 and that may be used to create a new network security policy based on one or more previously created policy templates. GUI 3000 includes a "select policy" field/option 3005 through which the user may either select or enter a name of a previously created policy template, and an "add or select labels" field/option 3010 through which the user may either select or enter a name of a new branch to which the selected/entered policy template is to be assigned. In the example of FIG. 30, the user has selected the "Branch Policy" policy template for assignment to the new site "San Jose" (branch 2910 in FIG. 29). In response, management entity 110 assigns the "Branch Policy" policy template to the label "San Jose" associated with the new branch. Once the "Branch Policy" policy template has been assigned, it becomes a new security policy that may be committed (i.e., downloaded or deployed) to the new branch "San Jose." An underlying assumption here is that management system 110 has knowledge of a URL or other connection identity associated with security device 130(6) at the new branch "San Jose" (see FIG. 29) so that the management system is able to communicate with the new branch.

GUI 3000 also includes a selectable "Validate" icon that, when selected by the user, causes management system 110 to display another GUI that presents all of the network security rules of the selected policy template (e.g., the "Branch Policy" policy template) in editable form, as seen in FIG. 31, described below.

With reference to FIG. 31, there is an illustration of a GUI 3100 displayed by management system 110 in response to a user selection of the "Validate" icon in GUI 3000. GUI 3100 presents in an editable form all of the security rules included in the selected policy template "Branch Policy," so that the user may review and edit the "Branch Policy." To this end, GUI 3100 also includes edit icons 3110 (e.g., add rule and delete rule icons) through which the user may select to edit the presented network security rules.

Figure 32:
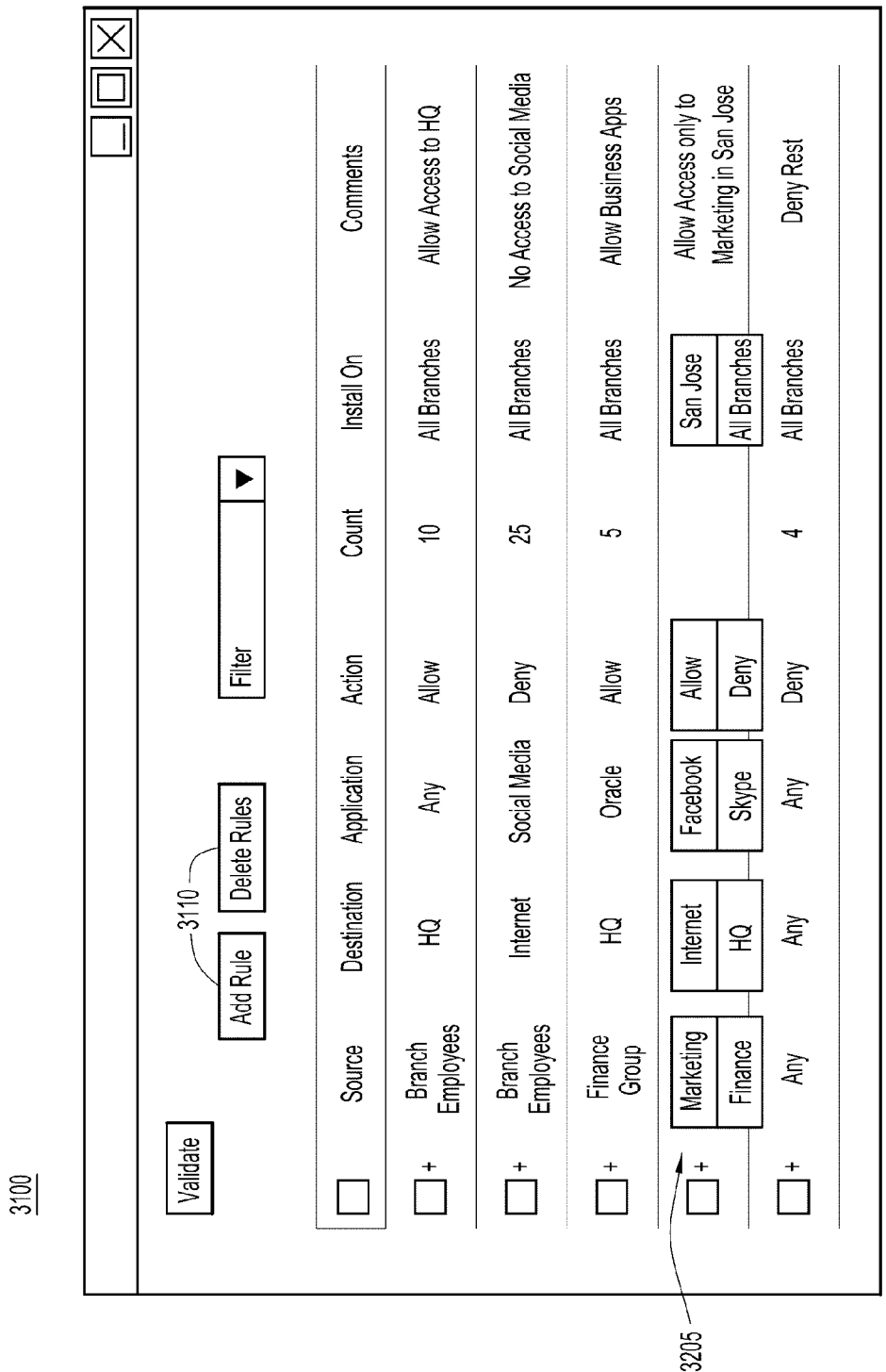
FIG. 32 is an illustration of a user interface screen displayed by the management system after a user has selected an "add rule" icon and also inserted a new rule via the user interface screen to be added to a new branch in the network environment shown in FIG. 29, according to an example embodiment.

With reference to FIG. 32, there is an illustration of GUI 3100 displayed by management system 110 after the user has selected the add rule icon and also inserted a new rule 3205 that allows "Marketing Users" to access "Facebook" application only for the "San Jose" branch. In response, management system 110 updates the new "Branch Policy" to include the added rule.

Once the new "Branch Policy" has been edited to include the added rule, the user may return to GUI 3000 of FIG. 30, and select the "Commit" icon. In response, management system 110 commits (or downloads) the new "Branch Policy" to the security device 130(6) at the "San Jose" branch (FIG. 29), which will implement the downloaded policy at that branch. Because the new "Branch Policy" encompasses security rules classified as identical across existing branches 2905, the new branch "San Jose" implements security policies similar, and in some cases identical, to those security policies that the existing branches 2905 implement. The new rule added in connection with GUI 3100 represents an exception to the similar security rules that pertains substantially only to the "San Jose" branch.

Figure 33:
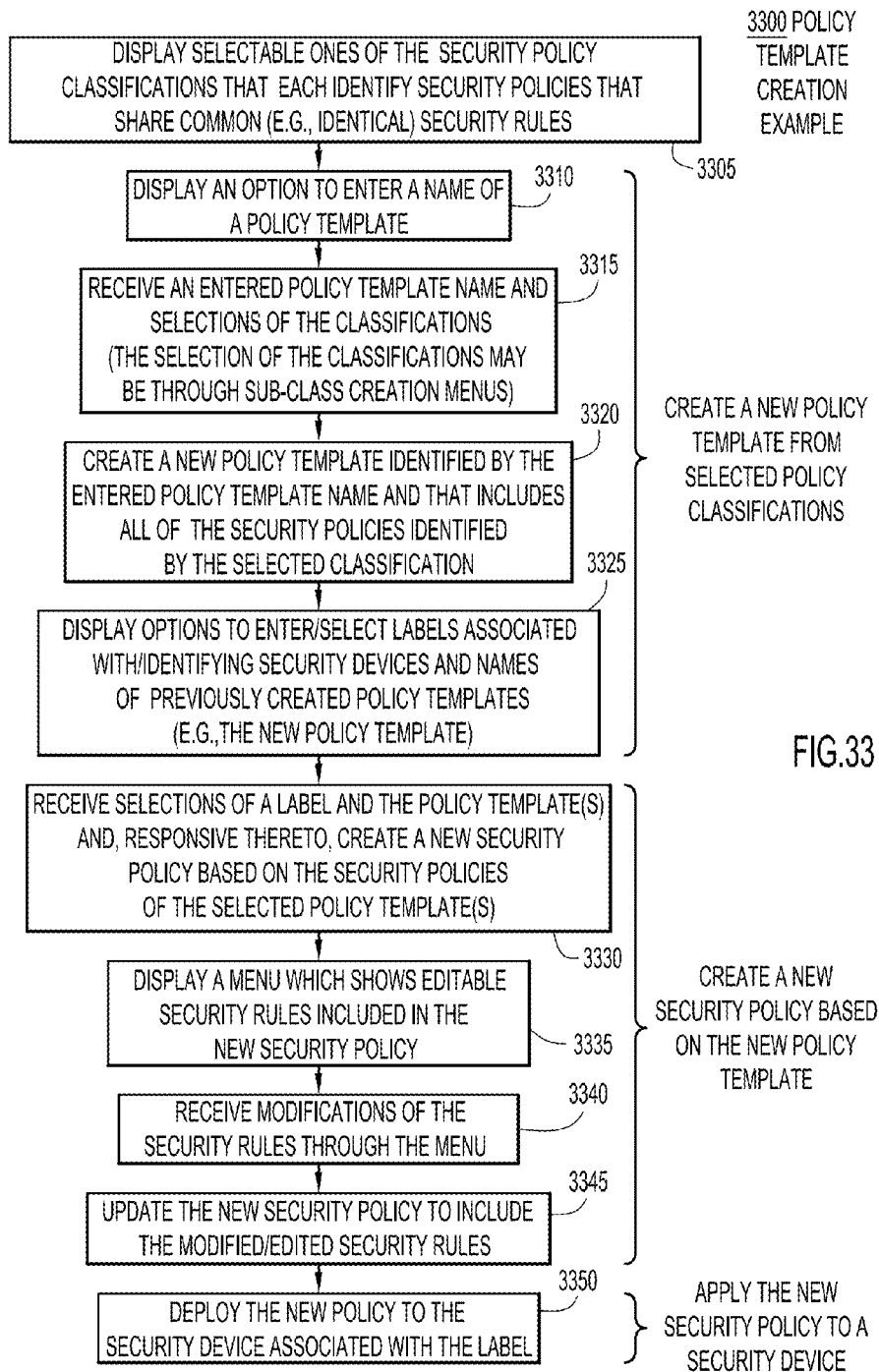
FIG. 33 is a flowchart of an example method of creating and deploying security policies based on policy templates, performed by the management entity through interactions with a user, according to an example embodiment.

With reference to FIG. 33, there is a flowchart of an example method 3300 of creating and deploying security policies based on policy templates, performed by a management entity 110 through interactions with a user. Initially, and as described above in detail, management entity 110 generates NSP classifications. To do this, management entity 110 connects with security devices and imports corresponding security policies from the security devices. Each imported policy includes corresponding security rules. Management entity 110 classifies the imported security policies across the security devices into identical, similar, unique, and investigate classifications. As used herein, the terms "GUI" and "menu" are synonymous and may be used interchangeably.

At 3305, management entity 110 displays selectable ones of the NSP classifications that identify security policies having shared or common (e.g., identical) security rules (see, e.g., GUI 1700 of FIG. 17).

Operations 3310-3325 described below represent an example by which a new policy template may be created based on selected NSP classifications.

At 3310, management entity 110 displays an option to select/enter a name of a policy template (see, e.g., GUI 2800 of FIG. 28).

At 3315, management entity 110 receives an entered/selected policy template name (see, e.g., GUI 2800) and selections of the NSP classifications (see, e.g., GUI 1700 of FIG. 27). The selections of the NSP classifications may be through policy sub-class or sub-template creation menus (see, e.g., GUI 1700 of FIG. 28). Sub-classes/sub-templates combine NSP classifications prior to template creation in operation 3320.

At 3320, management entity 110 creates a new policy template identified by the entered/selected policy template name and that includes all of the security policies identified by the selected NSP classifications (see, e.g., GUI 2800). As mentioned above, the policy template may include one or more previously created policy sub-classes/sub-templates that each combine multiple selected ones of the selectable NSP classifications. The user may create the policy sub-classes/sub-templates in a precursor operation to operation 3320 (see, e.g., GUI 1700 of FIG. 27 and GUI 2800).

At 3325, management entity 110 displays options to enter/select (i) labels associated with or identifying security devices, and (ii) names of previously created policy templates, such as the new policy template (see, e.g., GUI 3000 of FIG. 30).

Operations 3330-3345 described below represent an example by which a new user policy may be created based on the new policy template.

At 3330, management entity 110 receives entries/selections of a label and one or more of the previously created policy templates and, responsive thereto, creates a new security policy based on the security policies in the selected policy template(s) (see, e.g., GUI 3000).

At 3335, management entity 110 displays a menu which shows editable network security rules included in the new security policy (see, e.g., GUI 3100 of FIG. 31).

At 3340, management entity 110 receives modifications of the network security rules through the menu (see, e.g., GUI 3100 of FIG. 32).

At 3345, management entity 110 updates the new security policy to include the modified/edited network security rules.

At 3350, management entity 110 deploys or applies the new security policy to the security device associated with the selected/entered label.

Generalized Security Policy User Interface

Generating and deploying security policy can be a laborious process. The Policy UI is a graphical user interface tool that allows a user to set network policy using relatively simple graphical actions.

Figure 34:
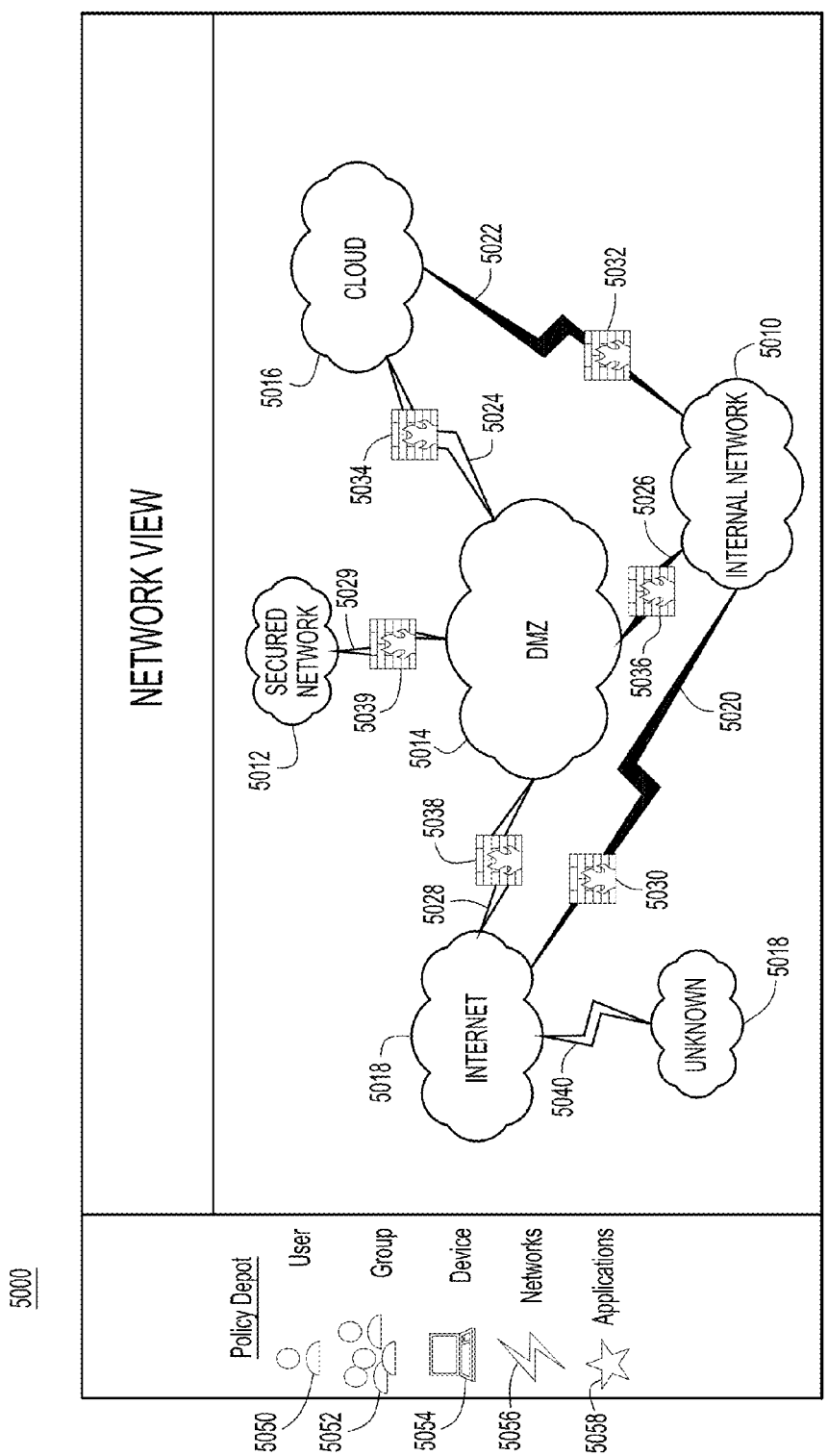
FIG. 34 is a diagram illustrating a user interface screen through which a user may view security topology, according to an example embodiment.

Referring to FIG. 34, a representation is shown of a graphical user interface screen display 5000 showing a visualization of a network topology. In this view, each cloud icon/graphical element represents a network domain. For example, there are cloud icons 5010, 5012, 5014, 5016 and 5018 each representing a location, network or level of security, with names as shown in the figure. The outline color or other characteristic of a cloud icon may be used to denote a security risk.

Connectivity between the network domains is represented by arrow graphical elements, in some cases through a firewall icon. For example, arrow icon 5020 and firewall icon 5030 illustrate connectivity between the internal network 5010 and the internet 5018. Arrow icon 5022 and firewall icon 5032 illustrate connectivity between internal network 5010 and cloud 5016. Arrow icon 5024 and firewall icon 5034 illustrate connectivity between DMZ 5014 and cloud 5016. A DMZ or demilitarized zone (sometimes referred to as a perimeter network) is a physical or logical subnetwork that contains and exposes an organization's external-facing services to a larger and untrusted network, usually the Internet. Arrow icon 5026 and firewall icon 5036 illustrate connectivity between internal network 5010 and DMZ 5016. Arrow icon 5028 and firewall icon 5038 illustrate connectivity between DMZ 5014 and internet 5018. Arrow icon 5029 and firewall icon 5039 illustrate connectivity between secure network 5012 and DMZ 5014. Finally, arrow icon 5040 illustrates connectivity between the internet 5018 and some unknown network 5018. The outline color or other characteristic of a connectivity arrow may be used to denote a type or level of a security risk.

An arrow denotes a connection. Some arrows may state an explicit "allow" or "block" policy, while outlines may indicate default connection type. For example, a circle may be created indicating an explicit policy to block all but the arrow. In another example, a user may define that in a particular zone, traffic between one zone and another zone is always allowed unless indicated otherwise by an arrow. Color schemes will typically indicate security levels.

Figure 37:
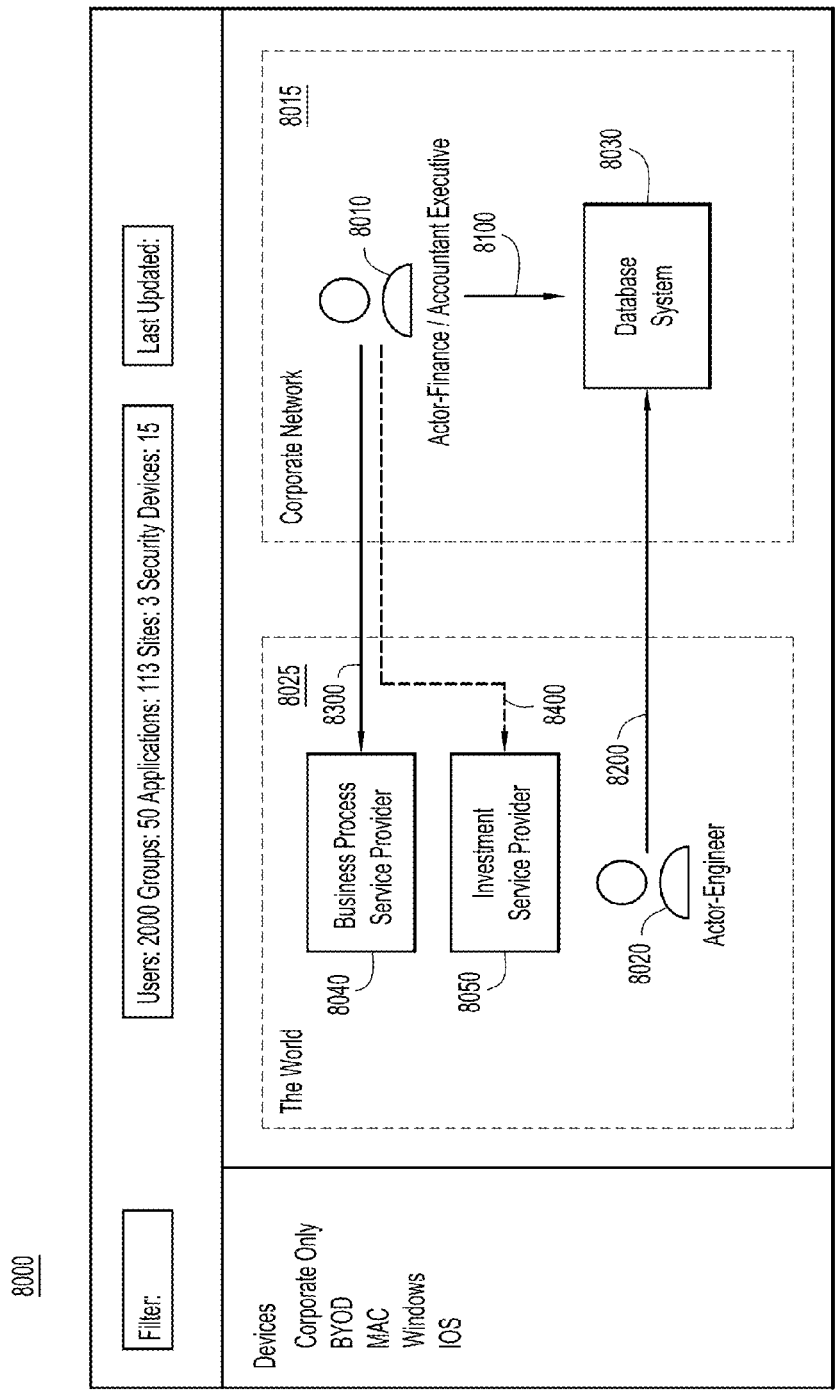
FIG. 37 is a diagram illustrating still another user interface screen through which a user may invoke security policy changes, according to an example embodiment.

When a user selects (clicks or double clicks on) a cloud icon shown in FIG. 34, another display screen is presented that shows more details of the security topology for that network domain. An example of such a display screen is shown in FIG. 37, described below. When a user double-clicks on an icon, e.g., an icon for a network security device, status information about that device is displayed.

On one side of the display screen 5000 is a space allocated to display icons representing actors and resources. This may be called, for example, the "Policy Depot". For example, icon 5050 represents a user, icon 5052 represents a group of users of a particular type, icon 5054 represents a device, icon 5056 represents a network and icon 5058 represents an application. These icons are referred to below in connection with a description of subsequent figures.

In addition, when rules from the "Policy Depot" may be dragged and dropped onto a relevant object in the network view in order to deploy the security policy rules onto the that network security device. The network is abstracted away as much as possible focusing on perimeter, inside and out, on zones.

Figure 35:
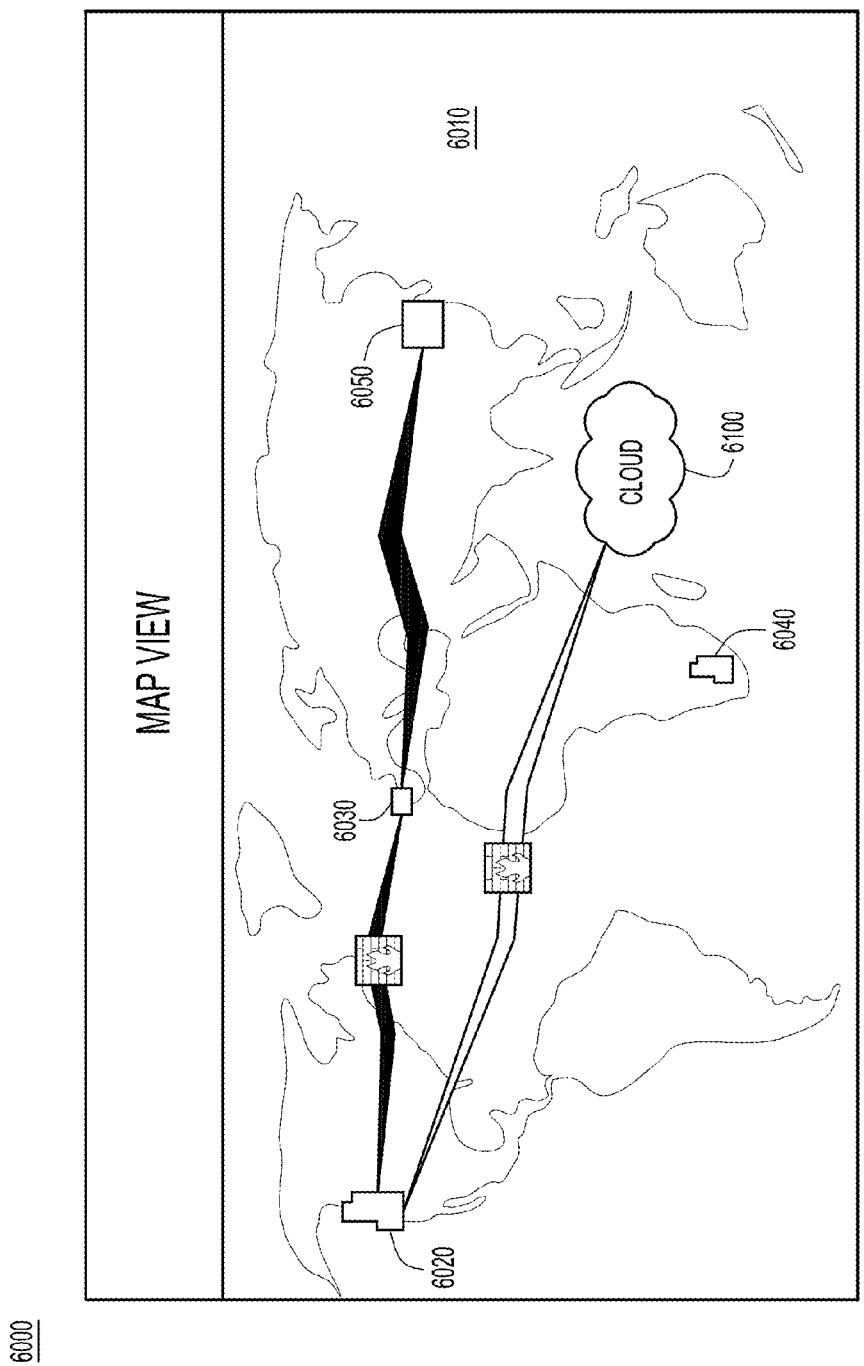
FIG. 35 is a diagram illustrating a user interface screen through which a user may view security topology overlaid on a geographical map, according to an example embodiment.

Turning now to FIG. 35, a graphical user interface screen 6000 is shown in which the icons depicted in FIG. 34 are overlaid on a geographical map 6010 to indicate the locations of each of the networks or devices in the network. For example, in FIG. 35, there is a shown a cloud icon resource icon 6020 in the western U.S, a resource icon 6030 in western Europe, a resource icon 6040 in South Africa, and a resource icon 6050 in China, as well as cloud icon 6100 for a network domain. In addition, arrow and firewall icons are shown to indicate the connectivity between resources and network domains, as described above in connection with FIG. 34.

Figure 36:
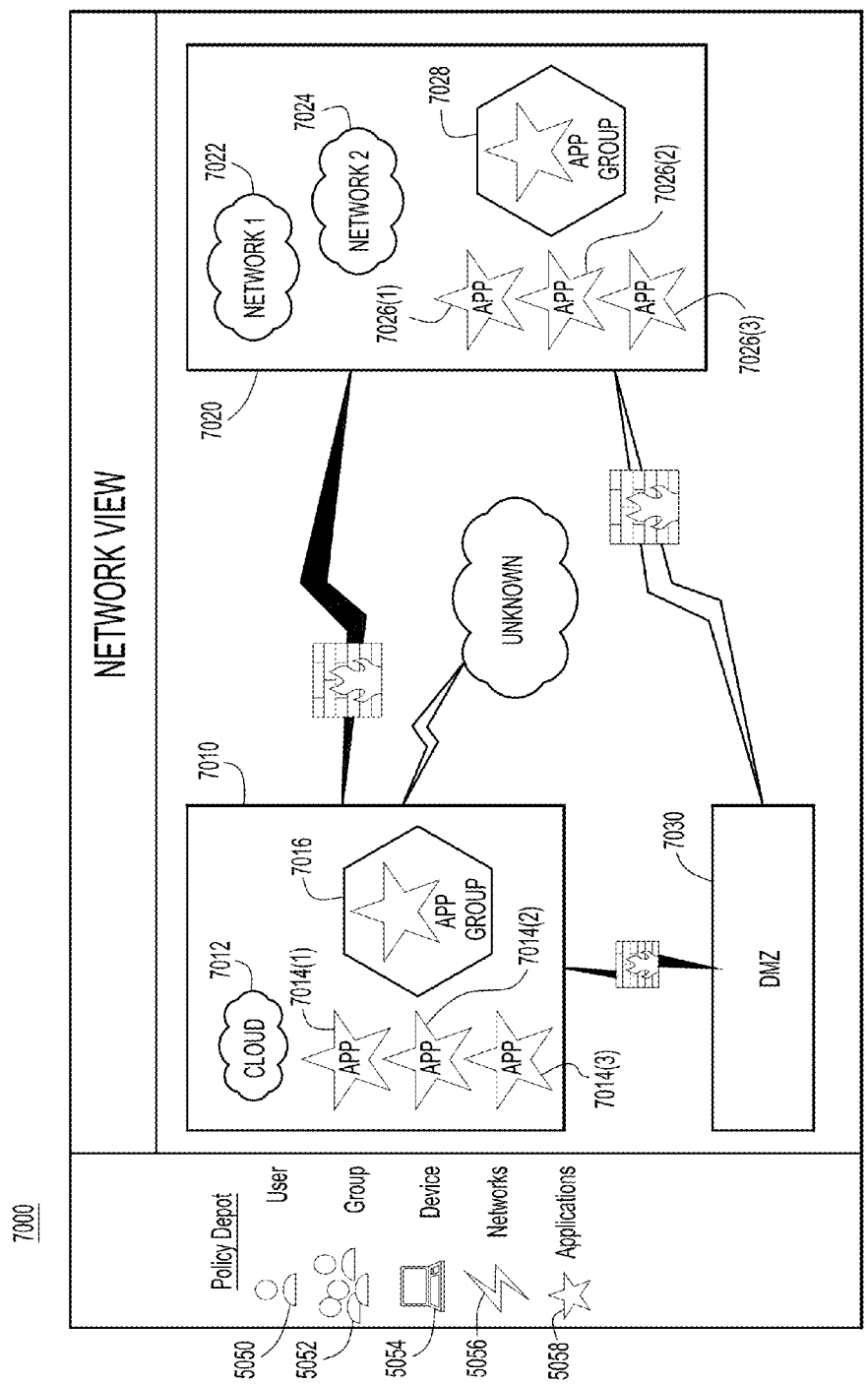
FIG. 36 is a diagram illustrating another user interface screen which a user may view security topology and invoke security policy changes, according to an example embodiment.

Referring now to FIG. 36, still another example of a graphical user interface screen 7000 is shown. In this example different network zones are shown, such as network zones 7010, 7020 and 7030. Icons are shown to indicate resources within a given network zone. For example, network zone 7010 includes cloud icon 7012, application icons 7014(1), 7014(2) and 7014(3) and an application group icon 7016. Similarly, network zone 7020 includes cloud icon 7022 for network 1, cloud icon 7024 for network 2, application icons 7026(1), 7026(2) and 7026(3) and an application group icon 7028. Arrow and firewall icons are shown between elements in FIG. 35 in a similar manner to that described above in connection with FIG. 34.

FIG. 37 illustrates still another example graphical user interface screen 8000. In this example user interface screen, a plurality of icons are displayed. Each icon represents an actor or a resource in a networking environment. Network security policy is defined by receiving user input in the form of lines drawn between icons representing actors and resources to control abilities between actors and resources.

For example, in FIG. 37, icons 8010 and 8020 represent actors, that is, users or a class of users in a corporation or enterprise. Icon 8010 represents a finance or accountant executive and icon 8020 represents an engineer. Icon 8010 is located within a region or space 8015 that is intended to represent a corporate network zone. Icon 8020 is located within a region or space 8025 that is intended an network zone external to the corporate network.

Icons 8030, 8040 and 8050 represent resources, such as applications, databases, etc. Icon 8030 represents a database system and is shown within space 8015 because the database system is internal to the corporate network. Icons 8040 and 8050 are in space 8025 because they are external to the corporate network. As an example, icon 8040 represents the website resources of a business process service provider (software-as-a-service provider) that is frequently used by personnel in the corporate network. Thus, there is an ongoing business relationship between the business process service provider and actors in the corporate network. Icon 8050 represents website resources of an investment service provider who does not have an ongoing business relationship with the corporation.

A network administrator may utilize arrows in the user interface display 8000 between actors and resources in order to define network security policy that permits, denies or controls abilities between actors and resources. Characteristics of an arrow, such as the color of the arrow, whether the arrow is dashed or solid, and the weight/thickness of the arrow, etc., may be used to further define network policy.

For example, arrow 8100 may be drawn between icon 8010 and the icon 8030. By drawing this arrow 8100 (using any arrow drawing tool in a graphical user interface tool set) in the manner shown in FIG. 37, the network security policy is set to allow the finance/accountant executive to access the database system. Again, this is within the corporate network. If no arrow is drawn between the icon 8010 and icon 8030, then the indication is that no network policy has been set to permit the finance/accountant executive to access the database system. Drawing of the arrow 8100 is translated by processing resources of the management entity (FIG. 1) to appropriate rules that are delivered to the one or more security devices that are in the path(s) of traffic flow between the finance/accountant executive and the database system.

Similarly, by drawing an arrow 8200 between the icon 8020 and the icon 8030, a network security policy is defined to enable the engineer, who is outside the corporate network, to access the database system inside the corporate network.

By drawing an arrow 8300 between the icon 8010 and the icon 8040, a security policy is defined to enable the finance/accountant executive who is inside the corporate network to access capabilities of the business process service provider who is outside the corporate network. Moreover, it may be desired, in defining this policy, to further require that the traffic between the actor and resource is monitored for indications of network security breaches. To achieve this, the color of the arrow 8300 may be set to a particular color (e.g., blue) to indicate that monitoring of traffic and reporting to a network administrator or network management entity will occur for traffic between the actor and resource. If the arrow is drawn with the characteristic to set the policy to monitor traffic between an actor and a resource, a notification may be sent to the actor so that the actor is aware that the traffic will be monitored for indications of security breaches. Moreover, if a security breach is detected from the monitoring of the traffic, an alert notification is sent to a network administrator or other destination.

Arrow 8400 drawn between icon 8010 and icon 8050 results in a security policy being defined to enable the finance/accountant executive who is inside the corporate network to access capabilities of the investment service provider, which is outside of the corporate network. Since the investment service provider does not have a business relationship with the corporation, a characteristic of the arrow 8400 may be chosen (e.g., color green or dashed line) to set a network security policy by which the traffic between the actor and resource is ignored, meaning it is not monitored for security breaches. The actor is "on its own". For example, the actor may be connecting to the resource outside the corporate network for his/her own personal financial reasons, and not for official business of the corporation.

It is also possible to expressly deny abilities between an actor and a resource by drawing a line of a particular color (e.g., red) or characteristic (blinking).

To reiterate, the user interface techniques depicted in FIG. 37 involve drawing arrows between icons that represent actors and resources to set network policy in a networking environment. Characteristics of the arrows, such as color, type, line weight, etc., may be used to further define network policy. Drawing of arrows results in generation of one or more rules that are delivered to security devices to achieve the desired policy associated with the arrow. This in turn involves converting between one or more rules of a generic network policy model to one or more rules of a native rule set associated with one or more security devices, as described above in the section under the heading "Security Policy Unification." While these examples are described in terms of drawing an arrow between icons, it is not meant to be limiting. It is to be understood that any other suitable directional/positional relationship may be represented between icons to achieve the same function as drawing an arrow.

Figure 38:
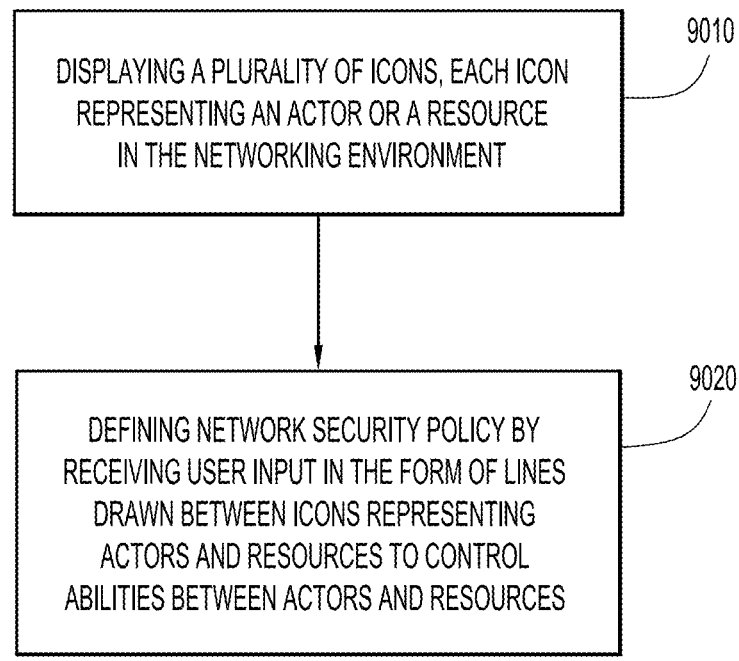
FIG. 38 is a flow chart of a process for performing user interface operations in connection with the user interface screen of FIG. 37, according to an example embodiment.

Reference is now made to FIG. 38. FIG. 38 shows a flow chart for a graphical user interface process 9000 to set security policy in accordance with an example embodiment. At 9010, a plurality of icons are displayed. Each icon represents an actor or a resource in the networking environment. Delineated regions may be displayed in which icons may reside to indicate whether an actor or a resource within or outside a network zone.

At 9020, security policy is defined by receiving user input in the form of lines drawn between icons representing actors and resources to control abilities (e.g., permit access/connectivity, deny access/connectivity, monitor traffic, etc.) between actors and resources.

In other words, and as shown in FIG. 37, at step 9020, security policy is defined by receiving user input in the form of a line drawn between a first icon representing an actor and a second icon representing a resource to control abilities between the actor and the resource. The first icon is an arbitrary icon representing an actor and the second icon is an arbitrary icon representing a resource.

An arrow on a line between the first icon representing the actor and the second icon representing the resource determines whether access between the actor and the resource is permitted. A line drawn or not drawn between the first icon representing the actor and the second icon representing the resource determines whether to allow or block abilities between the actor and the resource. A characteristic of the line between the first icon and the second icon further indicates whether traffic between the actor and the resource is to be monitored. As explained above, the characteristic may be color. Moreover, an icon may represent a group of a plurality of actors of a particular type within the networking environment. Also as shown in FIG. 37, delineated regions may be displayed in which the plurality of icons may reside to indicate whether an actor or a resource is located within or outside a network zone.

Defining security policy thus involves interpreting between the first icon representing the actor and the second icon representing the resource so as to generate one or more security rules for configuring one or more security devices in a path between the actor and the resource. Interpreting a line drawn may involve generating the one or more security rules in accordance with a generic policy model that is applicable across a plurality of security device types. In this case, an additional step is performed when configuring the security devices, of converting the one or more security rules in accordance with the generic policy model to one or more rules of a native rule set associated with one or more security devices. In summary, a graphical user interface that allows a user to set security policy using simple graphical actions.

Techniques described herein can be embodied in method, apparatus, non-transitory tangible computer readable, and system forms.

In summary, in one form, a method is provided comprising: displaying a plurality of icons, each icon representing an actor or a resource in a networking environment; and defining security policy by receiving user input in the form of a line drawn between a first icon representing an actor and a second icon representing a resource to control abilities between the actor and the resource.

In another form, an apparatus is provided comprising: a network interface unit to connect with a network; a processor coupled to the network interface unit to: generate for display a plurality of icons, each icon representing an actor or a resource in a networking environment; and define security policy by receiving user input in the form of a line drawn between a first icon representing an actor and a second icon representing a resource to control abilities between the actor and the resource.

In yet another form, a non-transitory tangible computer readable storage media encoded with instructions is provided. The instructions, when executed by a processor, cause the processor to: display a plurality of icons, each icon representing an actor or a resource in a networking environment; and define security policy by receiving user input in the form of a line drawn between a first icon representing an actor and a second icon representing a resource to control abilities between the actor and the resource.

The above description is intended by way of example only. Various modifications and structural changes may be made therein without departing from the scope of the concepts described herein and within the scope and range of equivalents of the claims.

What is claimed is:

1. A method comprising:
   at a management entity to communicate with security devices over a network:
      displaying a visualization of a network environment including network icons representing respective network zones at corresponding locations, and device icons representing one or more actors and one or more resources in corresponding ones of the visualized network domains, and one or more network security devices;
      receiving user input in the form of a line drawn between a first icon representing an actor in a first visualized network zone and a second icon representing a resource in a second visualized network zone, the line intersecting a third icon representing a network security device between the actor and the resource, wherein the line represents: whether to allow or block abilities between the actor and the resource; whether traffic between the actor and the resource is to be monitored; or whether access between the actor and the resource is permitted;
      interpreting the line as a definition of a security policy that controls access between the actor and the resource and, based on the interpreting, generating one or more security rules for configuring the network security device to control the access according to the security policy, each security rule including rule parameters to control the access based on a network protocol and at least one of a source address and a destination address; and
      delivering the one or more security rules to the security device to implement the security policy.

2. The method of claim 1, wherein a color of the line between the first icon and the second icon indicates whether the traffic between the actor and the resource is to be monitored.

3. The method of claim 1, wherein an icon represents a group of a plurality of actors of a particular type within the networking environment.

4. The method of claim 1, further comprising:
   displaying delineated regions in which the plurality of icons may reside to indicate whether an actor or a resource is located within or outside a network zone.

5. The method of claim 1, wherein an arrow on the line drawn between the first icon representing the actor and the second icon representing the resource determines whether access between the actor and the resource is permitted.

6. The method of claim 1, wherein the interpreting comprises generating the one or more security rules in accordance with a generic policy model that is applicable across a plurality of security device types, and further comprising:
   converting the one or more security rules in accordance with the generic policy model to one or more rules of a native rule set based on a native rule policy model associated with one or more security devices.

7. An apparatus comprising:
   a network interface unit to connect with a network and to communicate with security devices over the network; and
   a processor coupled to the network interface unit to:
      generate for display a visualization of a network environment including network icons representing respective network zones at corresponding locations, and device icons representing one or more actors and one or more resources in corresponding ones of the visualized network domains, and one or more network security devices;
      receive user input in the form of a line drawn between a first icon representing an actor in a first visualized network zone and a second icon representing a resource in a second visualized network zone, the line intersecting a third icon representing a network security device between the actor and the resource, wherein the line represents: whether to allow or block abilities between the actor and the resource; whether traffic between the actor and the resource is to be monitored; or whether access between the actor and the resource is permitted;
      interpret the line as a definition of a security policy that controls access between the actor and the resource and, based on the interpreting, generate one or more security rules for configuring the network security device to control the access according to the security policy, each security rule including rule parameters to control the access based on a network protocol and at least one of a source address and a destination address; and
      deliver the one or more security rules to the security device to implement the security policy.

8. The apparatus of claim 7, wherein a color of the line between the first icon representing the actor and the second icon representing the resource indicates whether the traffic between the actor and the resource is to be monitored.

9. The apparatus of claim 7, wherein an icon represents a group of a plurality of actors of a particular type within the networking environment.

10. The apparatus of claim 7, wherein the processor further:
  causes display of delineated regions in which the plurality of icons may reside to indicate whether an actor or a resource within or outside a network zone.

11. The apparatus of claim 7, wherein an arrow on the line between the first icon representing the actor and the second icon representing the resource determines whether access between the actor and the resource is permitted.

12. The apparatus of claim 7, wherein the processor interprets by generating the one or more security rules in accordance with a generic policy model that is applicable across a plurality of security device types, and wherein the processor further:
  converts the one or more security rules in accordance with the generic policy model to one or more rules of a native rule set based on a native rule policy model associated with one or more security devices.

13. A non-transitory tangible computer readable storage media encoded with instructions that, when executed by a processor of a management entity to communicate with security devices over a network, cause the processor to:
  generate for display a visualization of a network environment including network icons representing respective network zones at corresponding locations, and device icons representing one or more actors and one or more resources in corresponding ones of the visualized network domains, and one or more network security devices;
  receive user input in the form of a line drawn between a first icon representing an actor in a first visualized network zone and a second icon representing a resource in a second visualized network zone, the line intersecting a third icon representing a network security device between the actor and the resource, wherein the line represents: whether to allow or block abilities between the actor and the resource; whether traffic between the actor and the resource is to be monitored; or whether access between the actor and the resource is permitted;
  interpret the line as a definition of a security policy that controls access between the actor and the resource and, based on the interpreting, generate one or more security rules for configuring the network security device to control the access according to the security policy, each security rule including rule parameters to control the access based on a network protocol and at least one of a source address and a destination address; and
  deliver the one or more security rules to the security device to implement the security policy.

14. The computer readable storage media of claim 13, wherein a color of the line between the first icon representing the actor and the second icon representing the resource indicates whether the traffic between the actor and the resource is to be monitored.

15. The computer readable storage media of claim 13, wherein an icon represents a group of a plurality of actors of a particular type within the networking environment.

16. The computer readable storage media of claim 13, further comprising instructions to cause the processor to:
  display delineated regions in which the plurality of icons may reside to indicate whether an actor or a resource within or outside a network zone.

17. The computer readable storage media of claim 13, wherein an arrow on the line between the first icon representing the actor and the second icon representing the resource determines whether access between the actor and the resource is permitted.

18. The computer readable storage media of claim 13, wherein the instructions to cause the processor to interpret include instructions to cause the processor to generate the one or more security rules in accordance with a generic policy model that is applicable across a plurality of security device types, and further comprising instructions to cause the processor to:
  convert the one or more security rules in accordance with the generic policy model to one or more rules of a native rule set based on a native rule policy model associated with one or more security devices.

19. The method of claim 1, further comprising receiving a selection of a network icon for a network zone and responsive thereto displaying details of a security topology of the selected network zone.

* * * * *